(12) United States Patent
Fesbinder

(10) Patent No.: US 12,462,116 B2
(45) Date of Patent: Nov. 4, 2025

(54) SYSTEM AND METHOD TO RENDER TRANSLATED PAIRS HAVING ENHANCED STRUCTURAL COMPREHENSION

(71) Applicant: READ TWOGETHER LTD., Jerusalem (IL)

(72) Inventor: David Allen Fesbinder, Jerusalem (IL)

(*) Notice: Subject to any disclaimer, the term of this patent is extended or adjusted under 35 U.S.C. 154(b) by 0 days.

(21) Appl. No.: 19/094,939

(22) Filed: Mar. 30, 2025

(65) Prior Publication Data

US 2025/0259023 A1 Aug. 14, 2025

Related U.S. Application Data

(63) Continuation-in-part of application No. 19/011,578, filed on Jan. 6, 2025, which is a continuation-in-part of application No. 18/815,510, filed on Aug. 26, 2024, now Pat. No. 12,229,492, application No. 19/094,939 is a continuation-in-part of application No. 18/732,461, filed on Jun. 3, 2024, said application No. 18/815,510 is a continuation-in-part of application No. 18/062,503, filed on Dec. 6, 2022, now Pat. No. 12,001,507, said application No.
(Continued)

(51) Int. Cl.
*G06T 11/00* (2006.01)
*G06F 40/58* (2020.01)

(52) U.S. Cl.
CPC ............ *G06F 40/58* (2020.01); *G06T 11/001* (2013.01)

(58) Field of Classification Search
CPC .... G06F 40/106; G06F 40/109; G06F 40/205; G06F 3/0482–0486; G06F 3/04842; G06F 3/04883; G06F 3/04886; G06F 3/0237; G06F 40/42–58; G06F 40/169; G06T 11/001; G06T 11/60; G09G 5/373; G09G 5/377

See application file for complete search history.

(56) References Cited

U.S. PATENT DOCUMENTS 7,576,756 B1 * 8/2009 Good ..................... G06F 3/0481
345/635
8,001,465 B2 * 8/2011 Kudrolli ................. G06F 40/18
715/261

(Continued)

FOREIGN PATENT DOCUMENTS

WO WO-2010091674 A2 * 8/2010 ........... G06F 17/248
WO WO-2014066398 A1 * 5/2014 ........... G06F 3/0237

*Primary Examiner* — Wesner Sajous
(74) *Attorney, Agent, or Firm* — Alexander Postnikov

(57) ABSTRACT

A rendering engine designed to enhance the structural comprehension of bilingual texts. Using natural language processing (NLP) algorithms, the rendering engine can identify structural components within the first text string. Demarcations, in combination with other visual techniques such as spacing or position adjustments, are used to define the structural components, improving readability. The system can also optimize text layout based on container width and text ordering, ensuring clarity. Multiple demarcation sets can be used to represent different structural levels, visually linking related elements. The invention can be implemented as software or a non-transitory computer-readable medium for translation interfaces, multilingual documents, and structured text rendering.

30 Claims, 42 Drawing Sheets

Related U.S. Application Data

18/732,461 is a continuation-in-part of application No. 18/062,503, filed on Dec. 6, 2022, now Pat. No. 12,001,507.

(60) Provisional application No. 63/350,636, filed on Jun. 9, 2022, provisional application No. 63/286,378, filed on Dec. 6, 2021.

(56) References Cited

U.S. PATENT DOCUMENTS

| | | | | |
|---|---|---|---|---|
| 8,775,165 | B1 * | 7/2014 | Oikawa | G06F 40/169 |
| | | | | 704/10 |
| 2003/0061022 | A1 * | 3/2003 | Reinders | G06F 40/58 |
| | | | | 704/2 |
| 2011/0202836 | A1 * | 8/2011 | Badger | G06F 40/274 |
| | | | | 715/825 |
| 2013/0229489 | A1 * | 9/2013 | Ozawa | H04N 13/183 |
| | | | | 348/43 |
| 2014/0019117 | A1 * | 1/2014 | Ravi | G06F 40/40 |
| | | | | 704/9 |
| 2016/0070441 | A1 * | 3/2016 | Paek | G06F 3/0485 |
| | | | | 715/773 |
| 2017/0308290 | A1 * | 10/2017 | Patel | G06F 3/04817 |
| 2017/0357640 | A1 * | 12/2017 | Bellegarda | G06F 40/58 |
| 2019/0087772 | A1 * | 3/2019 | Medina | G05D 1/106 |

* cited by examiner

På den tiden, då kung Fredrik den andre av Danmark regerade över Bohuslän,
At the time, when king Fredrik the second of Denmark ruled over Bohuslän, bodde i Marstrand en fattig fiskmånglare, som hette Torarin. Han var en svag
dwelt in Marstrand a poor fish hawker, who was called Torarin. He was a poor och ringa man. Hans ena arm var lam, så att han dög varken till fiske
and little man. His one arm was palsied, so that he was good enough neither for fishing

⟨ Adhere ⟨ let my right ⟨ [then] forget ⟨ O Jerusalem, ⟨ If I forget you,
let my tongue         hand [its skill].

תִּדְבַּק־לְשׁוֹנִי לְחִכִּי, אִם־לֹא אֶזְכְּרֵכִי׃ אִם־לֹא אַעֲלֶה

⟨ to my palate, ⟨ if ⟨ I fail to remember you, ⟨ if ⟨ I fail to elevate
Jerusalem

אֶת־יְרוּשָׁלִַם, עַל רֹאשׁ שִׂמְחָתִי׃ זְכֹר יְהוָה לִבְנֵי אֱדוֹם, אֵת יוֹם

⟨ HASHEM, ⟨ Remember, ⟨ of my joys. ⟨ the ⟨ above
[to repay] the                foremost
offspring of Edom,    ⟨ the day

FIG. 1B

201 — I am from New York.    I'm studying    Spanish Literature    but I have been living in Barcelona,    Spain for six months.
202 — Jeg kommer fra New York.    Jeg studerer    spansk litteratur    men har boet i Barcelona i    Spanien i seks måneder.

But sometimes...    crazy and funny things happen    and I'm very lucky to enjoy    this experience in Spain.
Men fra tid til anden...    sker der skøre og sjove begivenheder    og føler mig heldig at kunne nyde    denne oplevelse i Spanien.

| I am from New York. | but I have been living in Barcelona, | Spain for six months. |
| Jeg kommer fra New York. | men har boet i Barcelona i | Spanien i seks måneder. |

| I'm studying | Spanish Literature | |
| Jeg studerer | spansk litteratur | |

| and I'm very lucky to enjoy | this experience in Spain. |
| og føler mig heldig at kunne nyde — 207 | denne oplevelse i Spanien. |

| But sometimes... | crazy and funny things happen |
| Men fra tid til anden... | sker der skøre og sjove begivenheder |

FIG. 2B

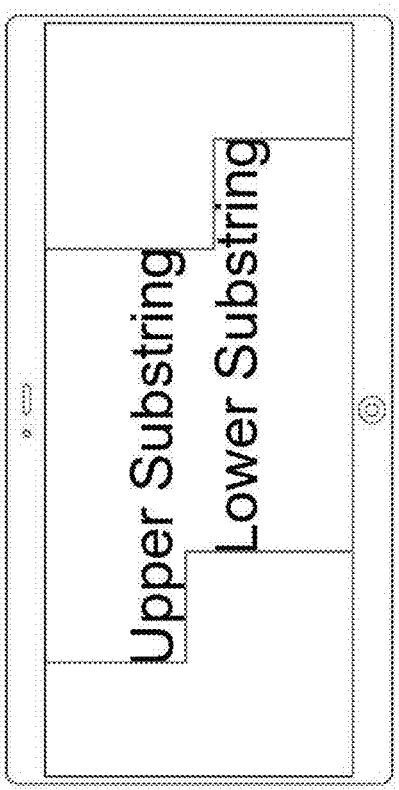
FIG. 2Q
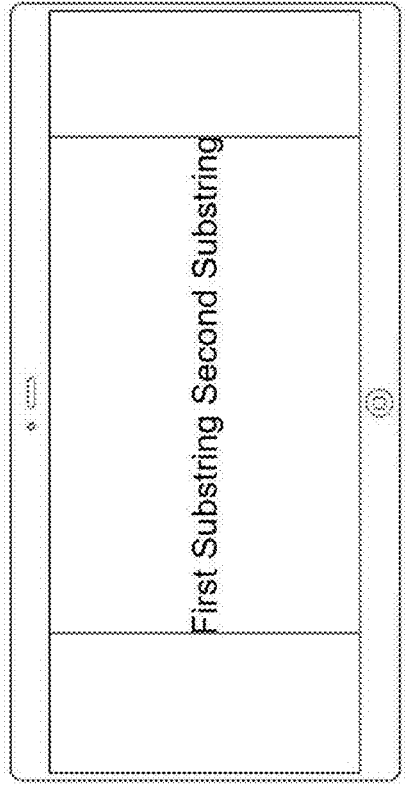
FIG. 2R
FIG. 2S
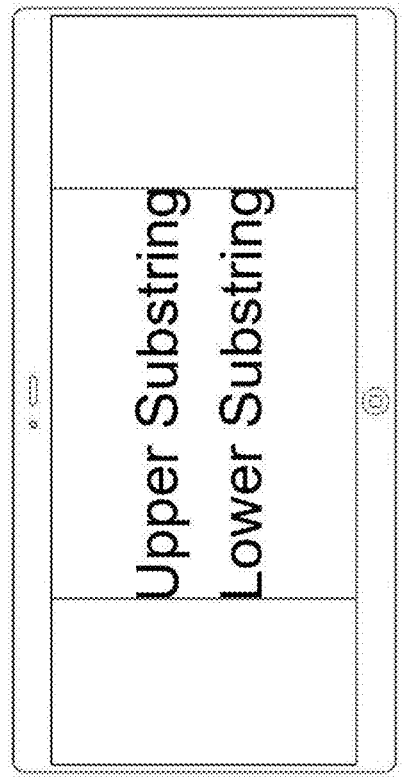
FIG. 2T

¿ Para qué alinear traducciones con texto? Para facilitar la comparación entre los dos.

¿Para qué alinear traducciones con texto? Para facilitar la comparación entre los dos.

¿Para qué alinear  traducciones con texto?  Para facilitar  la comparación  entre los dos.

¿Para qué alinear  traducciones con texto?  Para facilitar  la comparación  entre los dos.

¿Para qué alinear  traducciones con texto?  Para facilitar  la comparación  entre los dos.

¿Para qué alinear   traducciones con texto?   Para facilitar   la comparación   entre los dos.
  For   what   line up          translations with text?        To make it easier    the comparison     between   both

FIG. 3W

¿Para qué alinear   traducciones con texto?   Para facilitar   la comparación   entre los dos.
  For   what   line up          translations with text?        To make it easier    the comparison     between   both

FIG. 3X

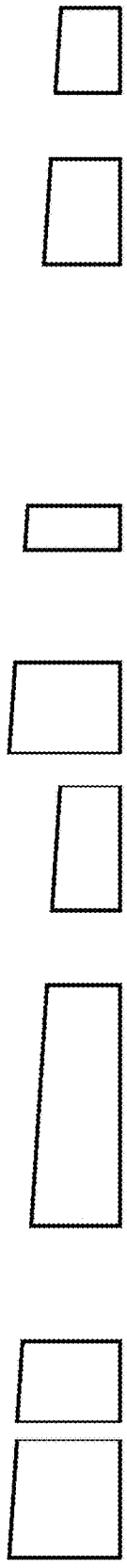
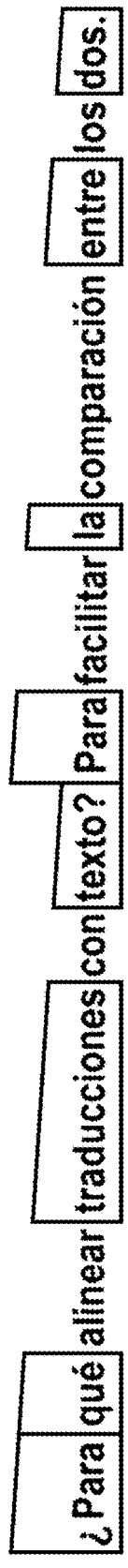

¿Para qué | alinear | traducciones | con | texto? | Para | facilitar | la | comparación | entre | los | dos.

FIG. 3Y

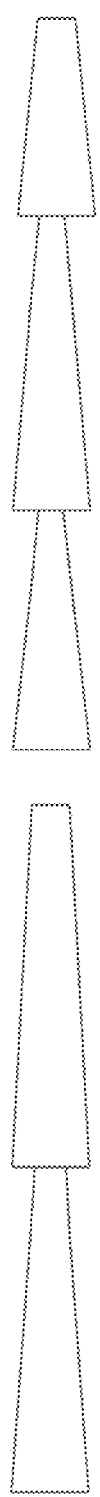
FIG. 4C
FIG. 4D
FIG. 4E

Why align ⇧ translations with text? To facilitate ⇧ comparison between the two.
¿Para qué alinear ⇧ traducciones con texto? ⬥ Para facilitar ⇧ la comparación ⇧ entre los dos.

FIG. 5A

Why align ⇧ translations with text? To facilitate ⇧ comparison between the two.
¿Para qué alinear ⇧ traducciones con texto? ▨ Para facilitar ⇧ la comparación ⇧ entre los dos.

FIG. 5B

| Why align | translations with text? | To facilitate | comparison | between the two. |
|---|---|---|---|---|
| ¿Para qué alinear | traducciones con texto? | Para facilitar | la comparación | entre los dos. |

FIG. 5C

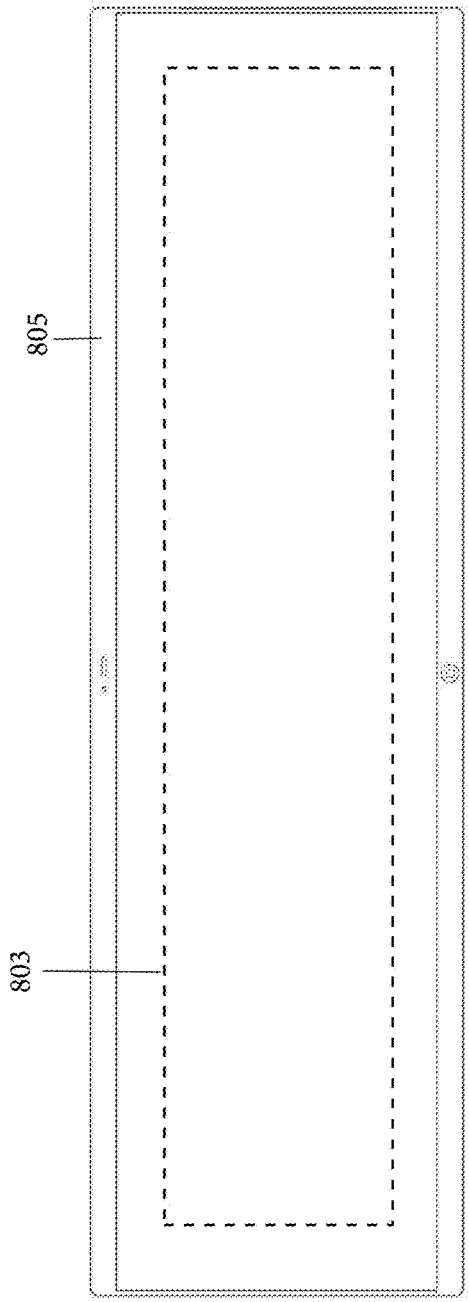
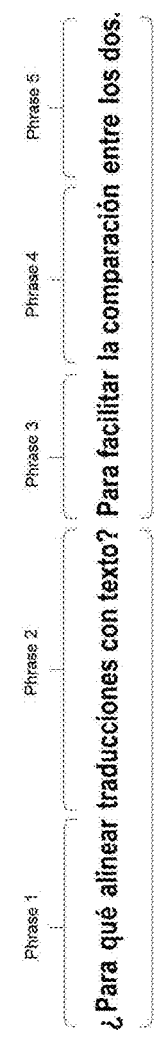
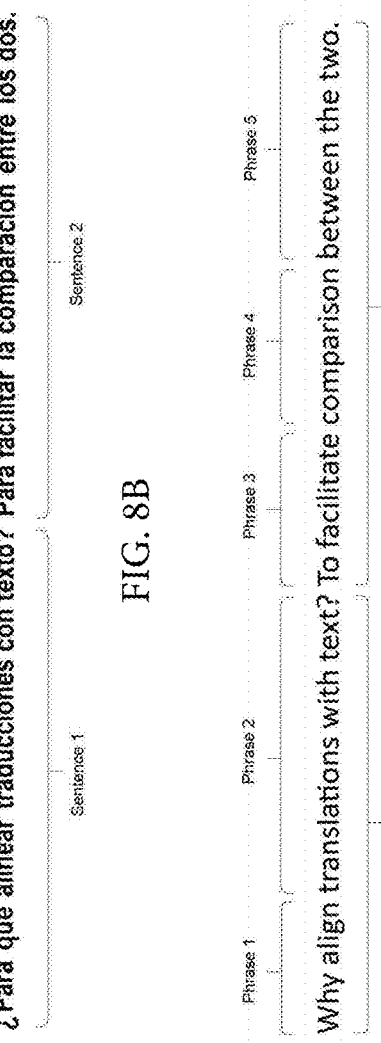
FIG. 8A
FIG. 8B
FIG. 8C

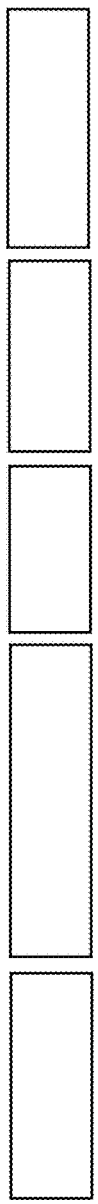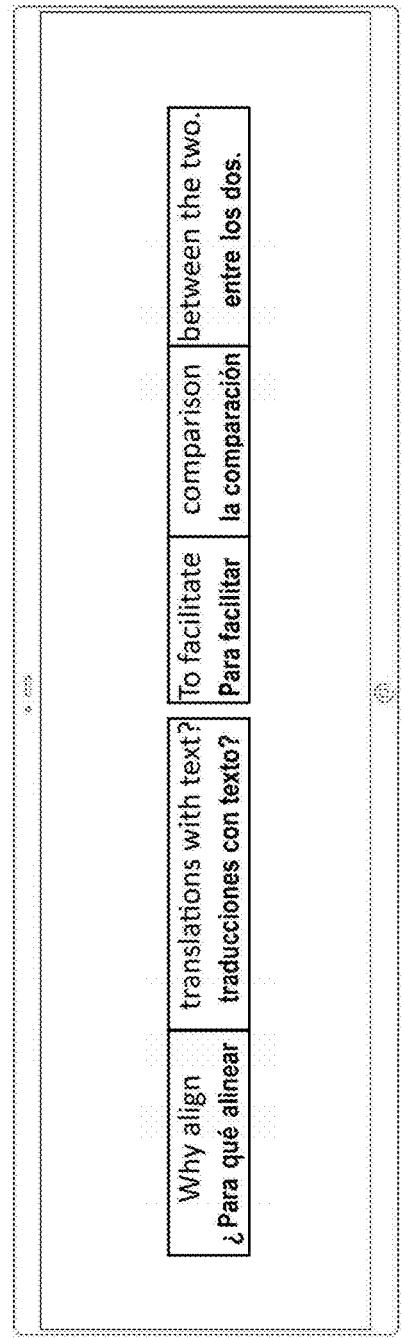

Why align translations with text? To facilitate comparison between the two.
¿Para qué alinear traducciones con texto? Para facilitar la comparación entre los dos.

FIG. 9D

Why align translations with text To facilitate comparison between the two
¿Para qué alinear traducciones con texto Para facilitar la comparación entre los dos

FIG. 9E

Why align translations with text? To facilitate the comparison between the two.
¿Para qué alinear traducciones con texto? Para facilitar la comparación entre los dos.

FIG. 9F

Why align translations with text? To facilitate comparison between the two.
¿Para qué alinear traducciones con texto? Para facilitar la comparación entre los dos.

FIG. 9I

Why align    translations with text?    To facilitate   comparison   between the two.
¿Para qué alinear ⊛ traducciones con texto? ⊛ Para facilitar ⊛ la comparación ⊛ entre los dos. ⊛

FIG. 9J

Why align    translations with text?    To facilitate   comparison   between the two.
¿Para qué alinear ~traducciones con texto?¡¡¡Para facilitar ~la comparación ~entre los dos.¡¡¡

FIG. 9K

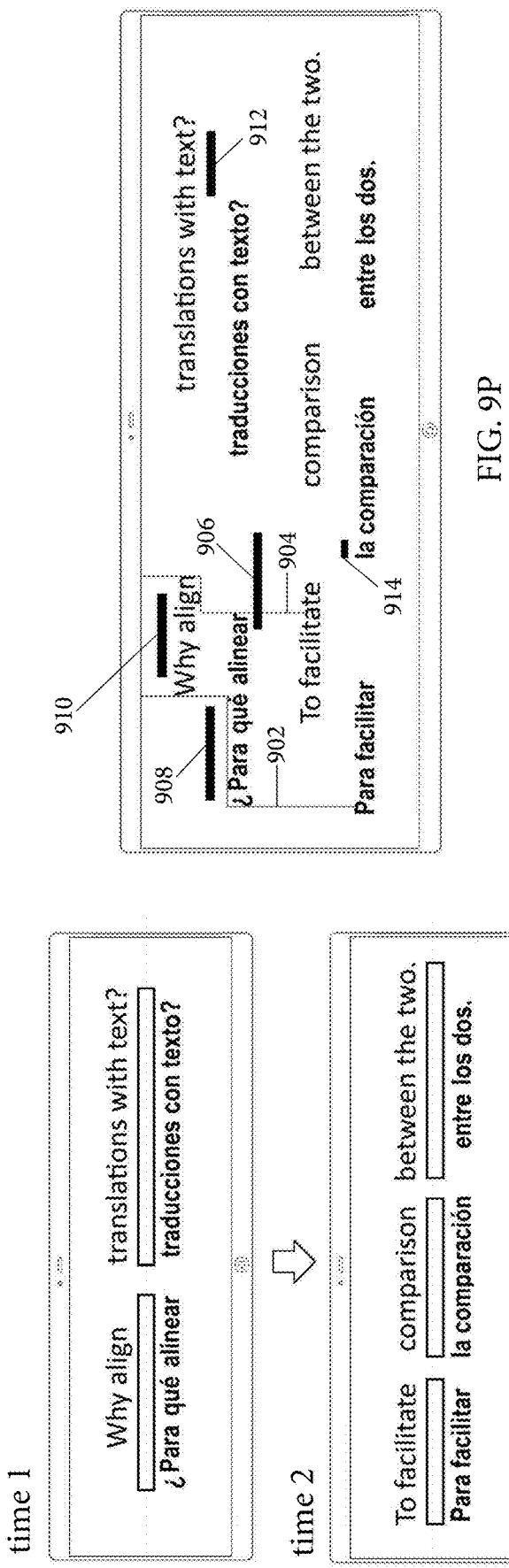

A strong focus on digital transformation drove a 23% boost in overall productivity, with particular attention to automation and data analytics. ~~Customer satisfaction improved~~ by 34%, thanks to better service delivery *To mechanisation and data analytics. Enhanced client satisfaction by 34%, thanks to better service delivery* and ~~tailored engagement strategies~~. *The company's Commitment to sustainability fulfilled a 31% cut in carbon* The company's dedication to sustainability ~~achieved~~ a 31% cut in carbon emissions, aligning with top industry standards. Looking ahead, plans are in place to broaden market presence by targeting emerging markets and diversifying ~~product lines to address shifting consumer needs~~. *Presence by targeting developing economies and broadening the portfolio approaches to adapt to changing trends end-user needs.* *The report also Emphasizes the organization's dedication to employee growth and fostering a positive* The report also highlights ~~the organization's commitment~~ to employee growth and fostering a positive workplace environment. ~~This past year saw the launch of comprehensive training programs~~, resulting in a *workplace environment. This past year marked the introduction of extensive training initiatives, resulting in a* *45% advancement in employee skill metrics. These initiatives have boosted morale and increased retention* 45% improvement in employee skill metrics. These efforts have ~~enhanced morale~~ and increased retention.

FIG. 12B

Un fuerte enfoque en la transformación digital impulsó un aumento del 23% en la productividad general, con
*A strong focus on digital transformation drove a 23% boost in overall productivity, with*
especial atención a la automatización y el análisis de datos.
*with particular attention to automation and data analytics.*

La satisfacción del cliente mejoró en un 34%, gracias a una mejor prestación de servicios y a estrategias de
*Customer satisfaction improved by 34%, thanks to better service delivery and*
interacción personalizadas.
*engagement strategies.*

La dedicación de la empresa a la sostenibilidad logró una reducción del 31% en las emisiones de carbono,
*The company's dedication to sustainability achieved a 31% cut in carbon emissions,*
alineándose con los estándares más altos de la industria.
*with particular attention to automation and data analytics.*

De cara al futuro, se han establecido planes para ampliar la presencia en el mercado, enfocándose en
*Looking ahead, plans are in place to broaden market presence by targeting emerging*
mercados emergentes y diversificando las líneas de.
*with particular attention to automation and data analytics.*

FIG. 12C

SYSTEM AND METHOD TO RENDER TRANSLATED PAIRS HAVING ENHANCED STRUCTURAL COMPREHENSION

CROSS-REFERENCE TO RELATED APPLICATIONS

This application is a continuation-in-part of U.S. non-provisional patent application Ser. No. 19/011,578, filed on Jan. 6, 2025, which is a continuation-in-part of U.S. non-provisional patent application Ser. No. 18/815,510, filed on Jun. 3, 2024, now U.S. Pat. No. 12,229,492, which is a continuation-in-part of U.S. non-provisional patent application Ser. No. 18/062,503, filed on Dec. 6, 2022, now U.S. Pat. No. 12,001,507, which claims priority to U.S. provisional patent application No. 63/286,378, filed on Dec. 6, 2021, and U.S. provisional patent application No. 63/350,636, filed on Jun. 9, 2022. This application is a continuation-in-part of U.S. non-provisional patent application Ser. No. 18/732,461, filed on Jun. 3, 2024, which is a continuation-in-part of U.S. non-provisional patent application Ser. No. 18/062,503, filed on Dec. 6, 2022, now U.S. Pat. No. 12,001,507, which claims priority to U.S. provisional patent application No. 63/286,378, filed on Dec. 6, 2021, and U.S. provisional patent application No. 63/350,636, filed on Jun. 9, 2022. The contents of the above-referenced applications are hereby incorporated by reference in their entirety.

BACKGROUND

Field of the Invention

The present invention relates generally to rendering text, and, in particular, to rendering translated pairs.

Scope of the Prior Art

One of the best ways to learn a new language is through reading a foreign text. However, a reader may not understand every word in the foreign text. Thus, to aid readers, language learning programs often display a native language translation of the foreign text immediately above or below the foreign text. For example, as shown in FIG. 1A, an English translation is placed immediately below a Danish foreign text. The proximity of these texts improves a reader's learning experience as he or she may quickly reference the English text to improve his or her understanding of the Danish text. However, the structural composition of the Danish text foreign text is not immediately obvious.

In FIG. 1B, English substrings are placed immediately below their corresponding Hebrew substrings to form translated pairs. Demarcations (the arrows) are positioned entirely in between adjacent English substrings. However, this demarcation placement does not result in a visual association between the English substrings and their corresponding Hebrew substrings.

SUMMARY

An aspect of the present invention is directed at a rendering engine configured to render translated pairs having improved structure comprehension. The system includes a processing device executing stored instructions to render translated pairs such that the demarcations define substructures and/or superstructures within the first text string. These demarcations facilitate the structured display of the first and second text strings, enhancing readability and comprehension.

A second aspect of the present invention is directed at a method to render translated pairs having improved structure comprehension. The method can start with receiving a first text string comprised of a plurality of first substrings where a structure of the first substring includes at least two superstructures, at least one of the superstructures including at least one substructure. In an embodiment, the structure of the first text string is determined using natural language processing (NLP).

Additionally, a second text string is received, where each second substring is a translation of its corresponding first substring. Demarcations can then be received or generated. The first substrings, second substrings, and demarcations are rendered such that the substructures and superstructures of the first text string are defined via the demarcations and various visual techniques such as spacing schemes, placement schemes, or ordinary punctuation.

In some embodiments, the rendering engine optimizes text layout by adjusting row placements based on the width of the text container and the ordering of the text pairs. Demarcations may include multiple sets, each corresponding to different structural levels of the text, and these demarcations can be visually linked for improved readability. The invention can be implemented as a non-transitory computer-readable medium containing executable instructions for displaying structured text translations.

By providing a systematic approach to structuring and displaying bilingual text, this invention reduces visual clutter while defining structural relationships at a glance. It is particularly useful for translation interfaces, multilingual document rendering, and applications requiring clear differentiation of linguistic structures.

BRIEF DESCRIPTION OF THE DRAWINGS

The foregoing summary, as well as the following detailed description of preferred variations of the invention, will be better understood when read in conjunction with the appended drawings. For the purpose of illustrating the invention, there is shown in the drawings variations that are presently preferred. It should be understood, however, that the invention is not limited to the precise arrangements shown. In the drawings, where:

FIGS. 1A-1B show examples of prior art.

FIGS. 4A-4E show sets of demarcations (top) and demarcated text strings (bottom) with defined associations among text substrings, according to various embodiments.

FIGS. 5A-5C show translated pairs, according to various embodiments.

FIGS. 8A-8F show the method of FIG. 7, according to an embodiment.

FIGS. 10A-10E show translated pairs, according to various embodiments.

FIGS. 12A-12C show a text display, according to various embodiments.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to any single implementation or implementations. Wherever convenient, the same reference numbers will be used throughout the drawings to refer to same or like parts.

Moreover, while variations described herein are primarily discussed in the context of rendering text, it will be recognized by those of ordinary skill that the present disclosure is not so limited. In fact, the principles of the present disclosure described herein may be readily applied to prevent the rendering of other objects.

In the present specification, an implementation showing a singular component should not be considered limiting; rather, the disclosure is intended to encompass other implementations including a plurality of the same component, and vice-versa, unless explicitly stated otherwise herein. Further, the present disclosure encompasses present and future known equivalents to the components referred to herein by way of illustration.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

Figure 2C:
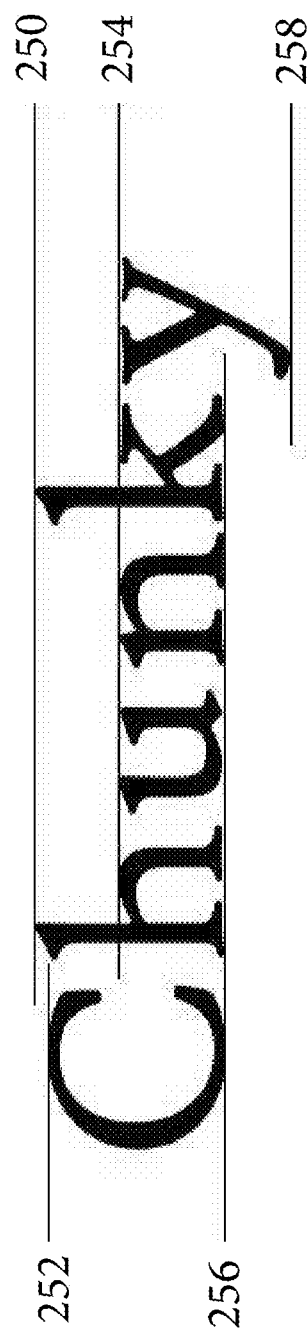
FIGS. 2A-2U show definitions used throughout the disclosure.
Figure 2D:
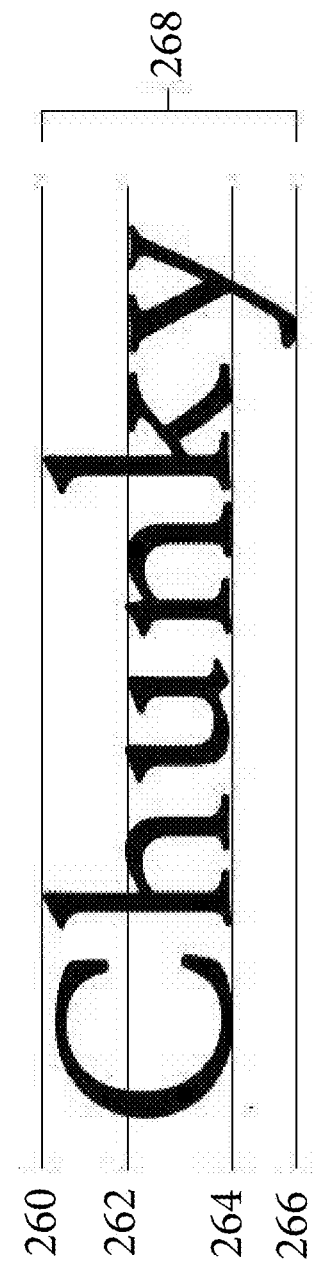
Figure 2E:
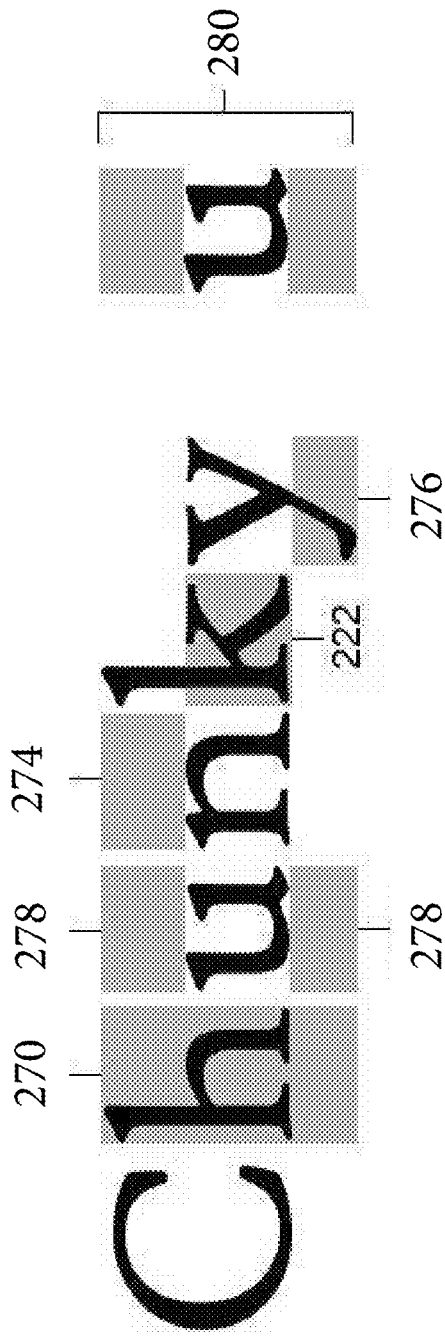
Figure 2F:
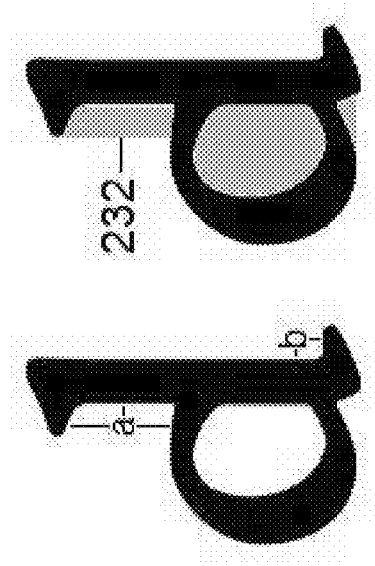
Figure 2G:
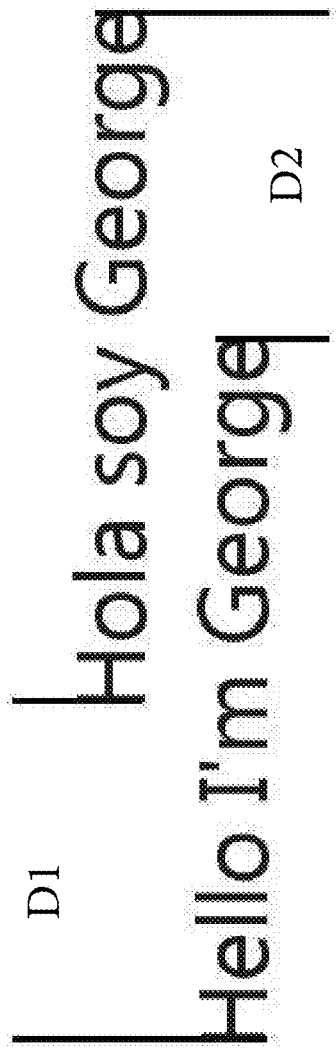
Figure 2H:
Figure 2I:
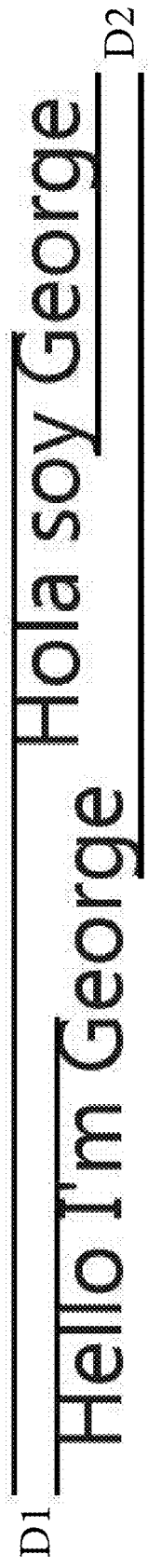
Figure 2J:
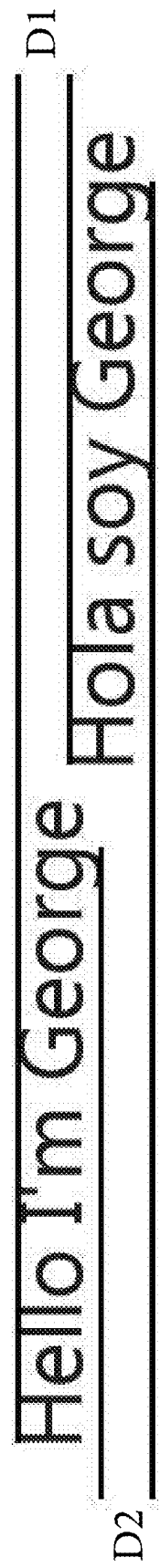
Figure 2K:
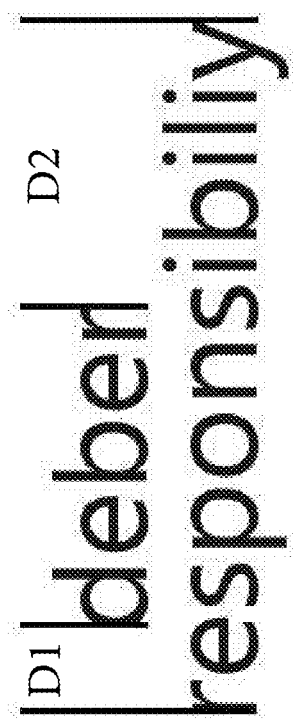
Figure 2L:
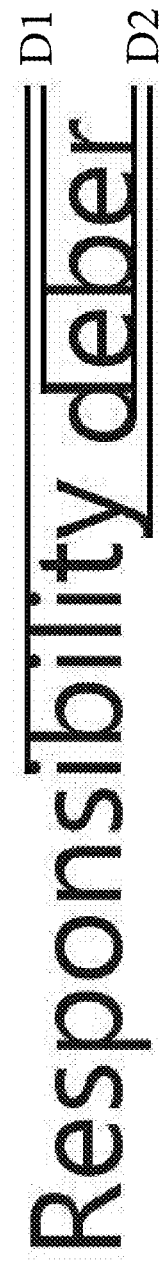
Figure 2M:
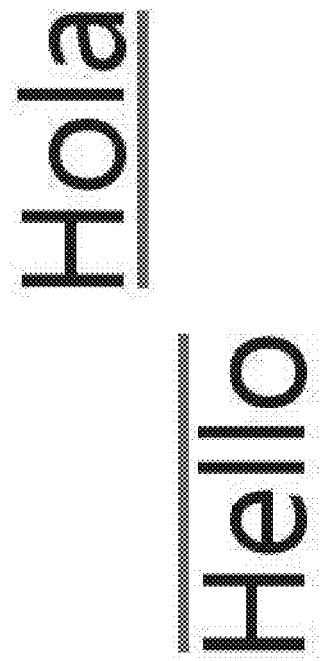
Figure 2N:
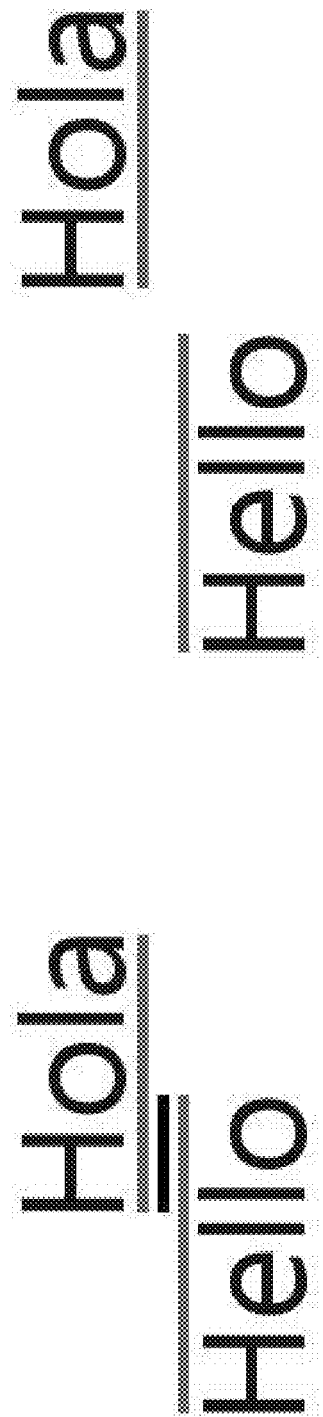

For the sake of convenience, the terms used to describe the prior art and various embodiments of the present invention are defined below. Some terms are illustrated in FIGS. 2A-2N for further clarification.

Display (verb): The verb "display," unless specified otherwise, refers to the act of presenting texts and/or content strings in any format that may be perceived by a reader of the texts and/or content strings, for example, but not limited to, presenting the texts and/or content strings on digital screens, printed medium, as holographs, and the like.

Display (noun): The noun "display," unless specified otherwise, refers to any sort of presentation of texts and/or content strings that may be perceived by a reader of the texts and/or content strings, for example, but not limited to, a presentation of the texts and/or content strings on digital screens, printed medium, as holographs, and the like.

Bordering: A text or object borders another text or object when an edge of the text or object is flush with the edge of another text or object.

Overlapping: A text or object overlaps another text or object when the body of the text or object occupies the same space as the body of another text or object.

Superimposing: A first text or object superimposes another text or object when only one of the texts or objects is visible in any overlapping portions.

Text string: A string of at least one character.

First text string (202): In FIG. 2A, the Danish text string is the first text string. It should be appreciated that while the 'string' has been exemplified in the instant disclosure in the form of a text, it could be any other form/representation of a string, for instance, of one or more numbers, alphanumeric representations, codes, written expressions, graphical symbols, or a combination thereof. This non-limiting definition of 'text' and scope thereof is therefore applicable to all the below texts. It should be appreciated that the first text string can be a primary text string. For example, for a reader learning Danish, the Danish text string is the primary text string (the Danish text string is the primary focus of the reader).

Second text string (201): In FIG. 2A, the English text string is the second text string. It should be appreciated that the second text string can be a secondary text string. For example, for a reader learning Danish, the English text string is the secondary text string (the English text string is the secondary focus of the reader).

Substrings (203, 204, 205): Unique portions of a text string. In FIG. 2A, the first and second text strings have been split into three first substrings and three second substrings.

Substring pair: A second substring placed proximate to its corresponding first substring, indicating a correspondence and/or association and/or mapping of any desired/defined nature between the two substrings. In FIG. 2A, the English substring "I'm studying" and its corresponding Danish substring "Jeg studerer" form a translated substring pair, where the English substring is a translation of its corresponding Danish substring. In some embodiments, each second substring can be a translation, a transliteration, or a transliteral translation (a transliteration of a translation) of its corresponding first substring.

Upper substring: The higher of the first substring and the second substring in a substring pair. For example, in FIG. 2A, the second substring of "I am from New York" is the upper substring of the substring pair.

Lower substring: The lower of the first substring and the second substring in a substring pair. For example, in FIG. 2A, the first substring of "Jeg studerer" is the lower substring of the substring pair.

Substructure: Substructures may be any smaller portion of a text string, including, but not limited to, a word, a group of words, or a phrase. One or more text string substructures can comprise a text string superstructure.

Superstructure: Superstructures can be any larger portion of a text string including, but not limited to, a group of words, a phrase, a sentence, or a group of sentences. Text string superstructures can be comprised of one or more text string substructures.

Structural Unit: A structural unit can be any portion of a text string or the entirety of the text string. For example, letters, words, phrases, sentences, paragraphs, etc, are all types of structural units that can comprise a text string.

Correspondence area (206): A rectangular area containing a single substring pair where the top edge of the correspondence area extends to, but does not border, an immediately above text or object, the bottom edge of the correspondence area extends to, but does not border, an immediately below text or object, the right edge of the correspondence area extends to, but does not border, an immediately right text or object, and the left edge of the correspondence area extends to, but does not border, an immediately left text or object. In FIG. 2A, a grey reference box 206 outlines the correspondence area of the substring pair comprised of the English substring "and I'm very lucky to enjoy" and its corresponding Danish substring "og foler mig heldig at kunne nyde." It would be appreciated that the visual demarcation can be of any desired shape, size, dimension or any other graphic representation that can encompass or create a boundary including dotted lines or dots or any other representation to help demarcate and separately display/identify the substring pair. It would further be appreciated that correspondence area may not be displayed per se to the reader, and can be computed for placement of demarcations using the instant method(s).

Reduced correspondence area (207): A rectangular area containing a single substring pair where the top edge of the reduced correspondence area extends halfway to an immediately above text or object, the bottom edge of the correspondence area extends halfway to an immediately below text or object, the right edge of the correspondence area extends halfway to an immediately right text or object, and the left edge of the correspondence area extends halfway to an immediately left text or object. In FIG. 2B, a grey reference box 207 outlines the reduced correspondence area of the substring pair comprised of the English substring "and I'm very lucky to enjoy" and its corresponding Danish substring "og foler mig heldig at kunne nyde." Alternatively, the reduced correspondence area is a rectangular area containing a single substring pair where the top edge of the reduced correspondence area extends less than halfway to an immediately above text or object, the bottom edge of the correspondence area extends less than halfway to an immediately below text or object, the right edge of the correspondence area extends less than halfway to an immediately right text or object, and the left edge of the correspondence area extends less than halfway to an immediately left text or object. Such reduced correspondence areas have an empty space in between adjacent substring pairs.

Ascender height 250: The height of the ascenders, considered characteristic of a given typeface, font, or script. As illustrated in FIG. 2C, the ascender height of "Chunky" would be the height of the topmost points of the "h" and "k." The ascender height is sometimes referred to throughout the detailed description as the topmost point of a text in cases where the ascender height of a text is greater than or equal to the cap height of a text.

Ascender line: A horizontal line at the ascender height of a given typeface, font, or script.

Cap height 252: The height of capital letters, considered characteristic of a given typeface, font, or script. As illustrated in FIG. 2C, the cap height of "Chunky" would be the height of the topmost point of the "C." The cap height is sometimes referred to throughout the detailed description as the topmost point of a text in cases where the cap height of a text is greater than or equal to the ascender height of a text.

Cap line: A horizontal line at the cap height of a given typeface, font, or script.

X-height 254: The height of a lower-case x, considered characteristic of a given typeface, font, or script. As illustrated in FIG. 2C, the x-height of "Chunky" would be the height of the topmost points of the "u," "n," and "y." It shall be appreciated that for typefaces that do not employ Latin characters, such as Hebrew, an equivalent mean-height concept is applicable.

X-height line: A horizontal line at the x-height of a given typeface, font, or script. It shall be appreciated that for typefaces that do not employ Latin characters, such as Hebrew, an equivalent mean-line concept is applicable.

Base height 256: The height of the base of most letters of a given typeface, font, or script, typically set to 0. As illustrated in FIG. 2C, the base height of "Chunky" would be the height of the bottommost points of the "C," "h," "u," "n," and "k."

Base line: A horizontal line at the base height of a given typeface, font, or script.

Descender height 258: The height of the descenders, considered characteristic of a given typeface, font, or script. As illustrated in FIG. 2C, the descender height of "Chunky" would be the height of the bottommost point of the "y." The descender height is sometimes referred to throughout the description as the bottommost point of a text.

Descender line: A horizontal line at the descender height of a given typeface, font, or script.

Text ceiling 260: The typical position of the topmost points of a text, considered characteristic of a given typeface, font, or script. As illustrated in FIG. 2D, the text ceiling of the characters in "Chunky" is the position of topmost points of the "h," and "k."

Text x-height 262: The typical position of the x-height line of a text, considered characteristic of a given typeface, font, or script. As illustrated in FIG. 2D, the text x-height of the characters in "Chunky" is near the topmost points of the "u," "n," and "y." It shall be appreciated that for typefaces that do not employ Latin characters, such as Hebrew, an equivalent text mean-height concept is applicable.

Text base line 264: The typical position of the base line of a text, considered characteristic of a given typeface, font, or script. As illustrated in FIG. 2D, the text base line the characters in "Chunky" is near the bottommost points of the "C," "h," "u," "n," "k", and "y."

Text floor 266: The typical position of the bottommost points of a text, considered characteristic of a given typeface, font, or script. As illustrated in FIG. 2D, the text floor of the characters in "Chunky" is the position of the bottommost point of the "y."

Text height 268: The typical distance from the text floor to the text ceiling, considered characteristic of a given typeface, font, or script. As illustrated in FIG. 2D, the text height of the characters in "Chunky" is the distance from the bottommost point of "y" to the topmost points of "h" and "k."

Footprint 270: A rectangular area for each character, the bottom edge of the footprint bounded by a horizontal line at the text floor, the top edge of the footprint bounded by a horizontal line at the text ceiling, the left edge of the footprint bounded by a vertical line at the leftmost point of the character, and the right edge of the footprint bounded by a vertical line at the rightmost point of the character. As illustrated in FIG. 2E, the footprint of the "h" in "Chunky"

is highlighted with a grey reference box behind the "h." The bottom edge of the footprint is bounded by a horizontal line at the text floor, the top edge of the footprint is bounded by a horizontal line at the text ceiling, the left edge of the footprint is bounded by a vertical line at the leftmost point of "k", and the right edge of the footprint is bounded by a vertical line at the rightmost point of "k".

Inner airspace 222: A rectangular area for each character, the bottom edge of the airspace bounded by the text base line, the top edge of the airspace bounded by the text x-height line, the left edge of the airspace bounded by a vertical line at the leftmost point of the character, and the right edge of the airspace bounded by a vertical line at the rightmost point of the character. As illustrated in FIG. 2E, the inner airspace of the "k" in "Chunky" is highlighted with a grey reference box behind the "k." The bottom edge of the airspace is bounded by the text base line of "k", the top edge of the airspace is bounded by the text x-height line of "k", the left edge of the airspace is bounded by a vertical line at the leftmost point of "k", and the right edge of the airspace is bounded by a vertical line at the rightmost point of "k".

Upper airspace 274: A rectangular area for each character, the bottom edge of the airspace bounded by the text x-height line, the top edge of the airspace bounded by a horizontal line at the text ceiling, the left edge of the airspace bounded by a vertical line at the leftmost point of the character, and the right edge of the airspace bounded by a vertical line at the rightmost point of the character. As illustrated in FIG. 2E, the upper airspace of the of the "n" in "Chunky" is highlighted with a grey reference box. The bottom edge of the airspace bounded by the text x-height line of "n", the top edge of the airspace is bounded by a horizontal line at the text ceiling, the left edge of the airspace is bounded by a vertical line at the leftmost point of "n", and the right edge of the airspace bounded by a vertical line at the rightmost point of "n".

Lower airspace 276: A rectangular area for each character, the bottom edge of the airspace bounded by a horizontal line at the text floor, the top edge of the airspace bounded by a horizontal line at the text base line, the left edge of the airspace bounded by a vertical line at the leftmost point of the character, and the right edge of the airspace bounded by a vertical line at the rightmost point of the character. As illustrated in FIG. 2E, the lower airspace of the of the "y" in "Chunky" is highlighted with a grey reference box. The bottom edge of the airspace is bounded by a horizontal line at the text floor, the top edge of the airspace is bounded by the text base line of "n", the left edge of the airspace is bounded by a vertical line at the leftmost point of "n", and the right edge of the airspace bounded by a vertical line at the rightmost point of "n".

Outer airspace 278: The combination of the upper airspace and the lower airspace of each character. As illustrated in FIG. 2E, the outer airspace of the "u" in "Chunky" is highlighted with grey reference boxes.

Character height 280: The distance from the bottommost point of the outer airspace to the topmost point of the outer airspace of a character. As illustrated in FIG. 2E, the character height of the "u" in "Chunky" would be the distance from the bottommost point of the outer airspace to the topmost point of the outer airspace of the "u."

Internal airspace 232: An area for each character, the area defined by the set of points that are surrounded by the character on at least three sides. As illustrated in FIG. 2F (left), point "a" falls within the internal airspace of the character "d" while point "b" falls outside of the internal airspace of the character "d". The internal airspace of the character "d" is highlighted in grey shading in FIG. 2D (right).

Horizontal offset: A second substring is horizontally offset from a first substring if 1) the rightmost point of the second substring is to the right of the rightmost point of the first substring and 2) the leftmost point of the second substring is to the right of the leftmost point of the first substring or 1) the rightmost point of the second substring is to the left of the rightmost point of the first substring and 2) the leftmost point of the second substring is to the left of the leftmost point of the first substring. For example, in FIG. 2G, the second substring "Hola soy George" is horizontally offset to the right of the first substring "Hello I'm George" where the leftmost point of "Hola soy George" is distance D1 to right of the leftmost point of "Hello I'm George" and the rightmost point of "Hola soy George" is distance D2 to the right of the rightmost point of "Hello I'm George. Likewise, in FIG. 2H, the second substring "Hola soy George" is horizontally offset to the left of the first substring "Hello I'm George" where the leftmost point of "Hola soy George" is distance D1 to left of the leftmost point of "Hello I'm George" and the rightmost point of "Hola soy George" is distance D2 to the left of the rightmost point of "Hello I'm George.

A second substring is also horizontally offset from a first substring if, when the reading direction of the first substring is left to right, the 1) the leftmost point of the second substring is to the right of the leftmost point of the first substring and 2) the majority of the width of the second substring is in between the center point of the first substring and the rightmost point of the first substring.

A second substring is also horizontally offset from a first substring if, when the reading direction of the first substring is right to left, the 1) the rightmost point of the second substring is to the left of the rightmost point of the first substring and 2) the majority of the width of the second substring is in between the center point of the first substring and the leftmost point of the first substring.

A second substring is also horizontally offset from a first substring if, when the reading direction of the first substring is left to right, the 1) the leftmost point of the second substring is to the right of the leftmost point of the first substring and 2) at least two thirds of the width of the second substring is in between the center point of the first substring and the rightmost point of the first substring.

A second substring is also horizontally offset from a first substring if, when the reading direction of the first substring is right to left, the 1) the rightmost point of the second substring is to the left of the rightmost point of the first substring and 2) at least two thirds of the width of the second substring is in between the center point of the first substring and the leftmost point of the first substring.

Vertical offset: A second substring is vertically offset from a first substring if 1) the topmost point of the second substring is above the topmost point of the first substring and 2) the bottommost point of the second substring is above the bottommost point of the first substring or 1) the topmost point of the second substring is below the topmost point of the first substring and 2) the bottommost point of the second substring is below the bottommost point of the first substring. For example, in FIG. 2I, the second substring "Hola soy George" is vertically offset above the first substring "Hello I'm George" where the topmost point of "Hola soy George" is distance D1 above the topmost point of "Hello I'm George" and the bottommost point of "Hola soy George" is distance D2 above the bottommost point of "Hello I'm George. Likewise, in FIG. 2j, the second substring "Hola soy George" is vertically offset below the first substring "Hello I'm George" where the topmost point of "Hola soy George" is distance D1 below the topmost point of "Hello I'm George" and the bottommost point of "Hola soy George" is distance D2 below the bottommost point of "Hello I'm George.

Horizontal indent: A second substring is horizontally indented from a first substring if 1) the rightmost point of the second substring is to the left of the rightmost point of the first substring or 2) the leftmost point of the second substring is to the right of the leftmost point of the first substring. For example, in FIG. 2K, the second substring "deber" is horizontally indented to the right of the first substring "responsibility" where the leftmost point of "deber" is distance D1 to right of the leftmost point of "responsibility". Likewise, the second substring "deber" is also horizontally indented to the left of the first substring "responsibility" where the rightmost point of "deber" is distance D2 to the left of the rightmost point of "responsibility".

Vertical indent: A second substring is vertically indented from a first substring if 1) the topmost point of the second substring is below the topmost point of the first substring or 2) the bottommost point of the second substring is above the bottommost point of the first substring. For example, in FIG. 2L, the second substring "deber" is vertically indented below the first substring "responsibility" where the topmostpoint of "deber" is distance D1 below the topmost point of "responsibility". Likewise, the second substring "deber" is also vertically indented above the first substring "responsibility" where the bottommost point of "deber" is distance D2 above the bottommost point of "responsibility".

Horizontal overlap: A first substring and a second substring horizontally overlap if 1) the width of the second substring is in the same column as the width of the first substring. For example, in FIG. 2M, the second substring "Hola" horizontally overlaps the first substring "Hello" where the grey line below "Hola" demarcates the width of "Hola", the grey line above "Hello" demarcates the width of "Hello" and the black line in between "Hola" and "Hello" demarcates the width of the horizontal overlap of "Hola" and "Hello". In contrast, the "Hola" and "Hello" of FIG. 2N do not horizontally overlap.

Figure 2O:
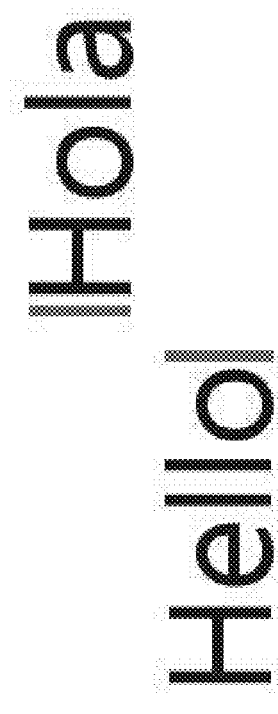
Figure 2P:
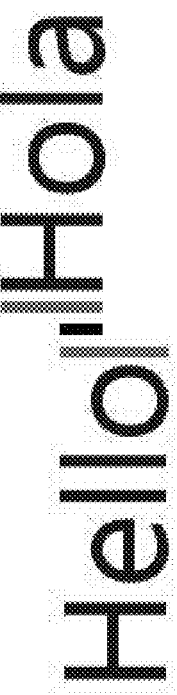

Vertical overlap: A first substring and a second substring vertically overlap if 1) the height of the second substring is in the same row as the height of the first substring. For example, in FIG. 2O, the second substring "Hola" vertically overlaps the first substring "Hello" where the grey line to the left of "Hola" demarcates the height of "Hola", the grey line to the right of "Hello" demarcates the height of "Hello" and the black line in between "Hola" and "Hello" demarcates the height of the horizontal overlap of "Hola" and "Hello". In contrast, the "Hola" and "Hello" of FIG. 2P do not vertically overlap.

The definitions for horizontal offset, vertical offset, horizontal indent, vertical indent, horizontal overlap, and vertical overlap are provided for texts strings with a generally left-to-right or right-to-left reading directionality. However, for these definitions to be applicable to text strings with a top-to-bottom or bottom-to-top reading directionality, positional terms in these definitions should be consistently rotated by 90 degrees. For example, the positional term "rightmost" should be replaced with "bottommost", the positional term "leftmost" should be replaced with "topmost", and so on. Alternatively, for these definitions to be application to text strings with a non-standard reading direction (e.g., any non-horizontal reading direction), the frame of reference needs to be adjusted such that the reading directionality of the text string becomes left-to-right or right-to-left. For example, if a reading directionality of the text string is bottom-left to top-right, the frame of reference is rotated 45 degrees such that the reading directionality of the text string becomes left-to-right. Such measures ensure that the methods described herein are applicable to text strings with any reading directionality.

Visual demarcation (herein referred to as a demarcation): A continuous non-background text or object. While the instant specification focuses on rectangular demarcations, demarcations can be of any shape, color, contour, boundary, or a combination thereof. For example, demarcations can be any marking such as numbers, letters, shapes, lines, pictures, symbols, emojis, underlining, words, etc. Demarcations do not include punctuation marks used according to their typical usage. However, any punctuation marks (e.g., periods (.), commas (,), semicolons (;), colons (:), question marks (?), exclamation points (!), apostrophes ('), quotation marks (" " and ' '), hyphens (-), en dashes (–), em dashes (—), parentheses (( )), brackets ([ ]), braces ({ }), ellipsis ( . . . ), slashes (/), bullet points (●), asterisks (*), number signs (Octothorpes) (#), ampersands (&), carets (^), tildes (~), pipes (|), and the like) not used according to their typical usage are considered demarcations. It should be appreciated that demarcations can be received as part of the first or second text string. The demarcations can be kept consistent in terms of its position and representation for each pair of substrings with other visual demarcations to enable smoother reading for the user.

Deemphasis: Any modification to text that makes the deemphasized text less prominent than nearby text. For example, deemphasizing a portion of a character or substring makes the deemphasized portion of the character or substring less prominent than a remainder of the character or substring. Types of deemphasis may include, but are not limited to, scaling down (e.g., reducing a width or height of text), shading (e.g., making text lighter), gradual shading (e.g., making text have a shading gradient), hollowing-out (e.g., removing an inside of a text, leaving only the edges of the text outlined), truncation (e.g, removing character strokes of a text), etc.

Emphasis: Any modification to text that makes the emphasized text more prominent than nearby text. For example, emphasizing a portion of a character or substring makes the emphasized portion of the character or substring stand out compared to the remainder of the character or substring. Types of emphasis may include, but are not limited to, scaling up (e.g., increasing the width or height of text), bolding (e.g., making text darker or thicker), color enhancement (e.g., applying vibrant colors to text), highlighting (e.g., adding a background color or underlining the text), shadowing (e.g., creating a shadow effect to add depth), embossing (e.g., making text appear raised), or applying animations (e.g., making text blink or change dynamically). These techniques draw attention to specific portions of the text, making them visually distinct and prominent.

The "Style" of a character or text includes, but is not limited to, its font, weight, thickness, size, spacing, alignment, color, pattern, highlights, emphasis, emphasized elements, deemphasis, deemphasized elements, and other typographic parameters that dictate the appearance of the character or text.

The "Style" of an object (e.g., a demarcation) refers to the set of visual attributes and parameters that define its appearance, including, but not limited to, its shape, dimensions, texture, pattern, color, opacity, alignment, rotation, emphasis, deemphasis, highlighted elements, shadows, gradients, borders, fills, and other design elements. Style encompasses all modifications and adjustments that influence the object's aesthetic and functional presentation, whether applied individually or in combination, to create a desired visual effect.

Receiving: Any method for a computing device to obtain data and/or metadata. For example, the computing device can receive character data from a user input (e.g., using a keyboard), from internal memory (e.g., a hard drive), from external memory (e.g., a database), from data generation (e.g., a translation module generates a translation of another text), and so on.

The right edge of a substring pair is defined by vertical lines and/or horizontal lines as follows:

For the vertical lines that define the right edge of a substring pair: Each substring or sub-substring in a substring pair is associated with a vertical line placed flush with the rightmost point of that substring or sub-substring.

When a substring or sub-substring is the topmost string in the substring pair, the topmost point of its associated vertical line is at the same height as an immediately above obstacle (e.g., another text string, picture, or a top edge of the container). When a substring or sub-substring is the topmost string in the substring pair and the rightmost point of that substring or sub-substring is further left than a rightmost point of an immediately below substring or sub-substring, the bottommost point of its associated vertical line is at the same height as the topmost point of that immediately below substring or sub-substring. When a substring or sub-substring is the topmost string in the substring pair and the rightmost point of that substring or sub-substring is as far right as a rightmost point of an immediately below substring or sub-substring, the bottommost point of its associated vertical line is at the same height as the topmost point of that immediately below substring or sub-substring. When a substring or sub-substring is the topmost string in the substring pair and the rightmost point of that substring or sub-substring is further right than a rightmost point of an immediately below substring or sub-substring, the bottommost point of its associated vertical line is at the same height as the bottommost point of that substring or sub-substring.

When a substring or sub-substring is neither the topmost string nor the bottommost string in the substring pair and the rightmost point of that substring or sub-substring is further left than a rightmost point of an immediately above substring or sub-substring, the topmost point of its associated vertical line is at the same height as the bottommost point of that immediately above substring or sub-substring. When a substring or sub-substring is neither the topmost string nor the bottommost string in the substring pair and the rightmost point of that substring or sub-substring is as far right as a rightmost point of an immediately above substring or sub-substring, the topmost point of its associated vertical line is at the same height as the bottommost point of that immediately above substring or sub-substring. When a substring or sub-substring is neither the topmost string nor the bottommost string in the substring pair and the rightmost point of that substring or sub-substring is further right than a rightmost point of an immediately above substring or sub-substring, the topmost point of its associated vertical line is at the same height as the topmost point of that substring or sub-substring.

When a substring or sub-substring is neither the topmost string nor the bottommost string in the substring pair and the rightmost point of that substring or sub-substring is further left than a rightmost point of an immediately above substring or sub-substring, the bottommost point of its associated vertical line is at the same height as the topmost point of that immediately below substring or sub-substring. When a substring or sub-substring is neither the topmost string nor the bottommost string in the substring pair and the rightmost point of that substring or sub-substring is as far right as a rightmost point of an immediately below substring or sub-substring, the bottommost point of its associated vertical line is at the same height as the topmost point of that immediately below substring or sub-substring. When a substring or sub-substring is neither the topmost string nor the bottommost string in the substring pair and the rightmost point of that substring or sub-substring is further right than a rightmost point of an immediately below substring or sub-substring, the bottommost point of its associated vertical line is at the same height as the bottommost point of that substring or sub-substring.

When a substring or sub-substring is the bottommost string in the substring pair, the bottommost point of its associated vertical line is at the same height as an immediately below obstacle (e.g., another text string, picture, or a top edge of the container). When a substring or sub-substring is the bottommost string in the substring pair and the rightmost point of that substring or sub-substring is further left than a rightmost point of an immediately above substring or sub-substring, the topmost point of its associated vertical line is at the same height as the bottommost point of that immediately above substring or sub-substring. When a substring or sub-substring is the bottommost string in the substring pair and the rightmost point of that substring or sub-substring is as far right as a rightmost point of an immediately above substring or sub-substring, the topmost point of its associated vertical line is at the same height as the bottommost point of that immediately above substring or sub-substring. When a substring or sub-substring is the bottommost string in the substring pair and the rightmost point of that substring or sub-substring is further right than a rightmost point of an immediately above substring or sub-substring, the topmost point of its associated vertical line is at the same height as the topmost point of that substring or sub-substring.

When a leftmost point of a substring or a sub-substring is further right than a rightmost point of all other substrings or sub-substrings in the same substring pair, the topmost point of its associated vertical line is at the same height as an immediately above obstacle (e.g., another text string, picture, or a top edge of the container) and the bottommost point of its associated vertical line is at the same height as an immediately below obstacle (e.g., another text string, picture, or a bottom edge of the container). In some embodiments, this limitation only applies when a substring or sub-substring is on the same line as all other substrings or sub-substrings in the same substring pair.

For the horizontal lines that define the right edge of a substring pair: Horizontal lines connect the bottommost point of a vertical line and the topmost point of an immediately below vertical line. When a vertical line is further right than an immediately below vertical line, the leftmost point of a horizontal line is at the topmost point of the immediately below vertical line and the rightmost point of the horizontal line is at the bottommost point of the vertical line. When a vertical line is as far right as an immediately below vertical line, there is no horizontal line connecting the bottommost point of the vertical line and the topmost point of the immediately below vertical line. When a vertical line is further left than an immediately below vertical line, the leftmost point of a horizontal line is at the bottommost point of the vertical line and the rightmost point of the horizontal line is at the topmost point of the immediately below vertical line.

The left edge of a substring pair is defined by vertical lines and/or horizontal lines as follows:

For the vertical lines that define the left edge of a substring pair: Each substring or sub-substring in a substring pair is associated with a vertical line placed flush with the leftmost point of that substring or sub-substring.

When a substring or sub-substring is the topmost string in the substring pair, the topmost point of its associated vertical line is at the same height as an immediately above obstacle (e.g., another text string, picture, or a top edge of the container). When a substring or sub-substring is the topmost string in the substring pair and the leftmost point of that substring or sub-substring is further right than a leftmost point of an immediately below substring or sub-substring, the bottommost point of its associated vertical line is at the same height as the topmost point of that immediately below substring or sub-substring. When a substring or sub-substring is the topmost string in the substring pair and the leftmost point of that substring or sub-substring is as far left as a leftmost point of an immediately below substring or sub-substring, the bottommost point of its associated vertical line is at the same height as the topmost point of that immediately below substring or sub-substring. When a substring or sub-substring is the topmost string in the substring pair and the leftmost point of that substring or sub-substring is further left than a leftmost point of an immediately below substring or sub-substring, the bottommost point of its associated vertical line is at the same height as the bottommost point of that substring or sub-substring.

When a substring or sub-substring is neither the topmost string nor the bottommost string in the substring pair and the leftmost point of that substring or sub-substring is further right than a leftmost point of an immediately above substring or sub-substring, the topmost point of its associated vertical line is at the same height as the bottommost point of that immediately above substring or sub-substring. When a substring or sub-substring is neither the topmost string nor the bottommost string in the substring pair and the leftmost point of that substring or sub-substring is as far left as a leftmost point of an immediately above substring or sub-substring, the topmost point of its associated vertical line is at the same height as the bottommost point of that immediately above substring or sub-substring. When a substring or sub-substring is neither the topmost string nor the bottommost string in the substring pair and the leftmost point of that substring or sub-substring is further left than a leftmost point of an immediately above substring or sub-substring, the topmost point of its associated vertical line is at the same height as the topmost point of that substring or sub-substring.

When a substring or sub-substring is neither the topmost string nor the bottommost string in the substring pair and the leftmost point of that substring or sub-substring is further right than a leftmost point of an immediately below substring or sub-substring, the bottommost point of its associated vertical line is at the same height as the topmost point of that immediately below substring or sub-substring. When a substring or sub-substring is neither the topmost string nor the bottommost string in the substring pair and the leftmost point of that substring or sub-substring is as far left as a leftmost point of an immediately below substring or sub-substring, the bottommost point of its associated vertical line is at the same height as the topmost point of that immediately below substring or sub-substring. When a substring or sub-substring is neither the topmost string nor the bottommost string in the substring pair and the leftmost point of that substring or sub-substring is further left than a leftmost point of an immediately below substring or sub-substring, the bottommost point of its associated vertical line is at the same height as the bottommost point of that substring or sub-substring.

When a substring or sub-substring is the bottommost string in the substring pair, the bottommost point of its associated vertical line is at the same height as an immediately below obstacle (e.g., another text string, picture, or a top edge of the container). When a substring or sub-substring is the bottommost string in the substring pair and the leftmost point of that substring or sub-substring is further right than a leftmost point of an immediately above substring or sub-substring, the topmost point of its associated vertical line is at the same height as the bottommost point of that immediately above substring or sub-substring. When a substring or sub-substring is the bottommost string in the substring pair and the leftmost point of that substring or sub-substring is as far left as a leftmost point of an immediately above substring or sub-substring, the topmost point of its associated vertical line is at the same height as the bottommost point of that immediately above substring or sub-substring. When a substring or sub-substring is the bottommost string in the substring pair and the leftmost point of that substring or sub-substring is further left than a leftmost point of an immediately above substring or sub-substring, the topmost point of its associated vertical line is at the same height as the topmost point of that substring or sub-substring.

When a rightmost point of a substring or a sub-substring is further left than a leftmost point of all other substrings or sub-substrings in the same substring pair, the topmost point of its associated vertical line is at the same height as an immediately above obstacle (e.g., another text string, picture, or a top edge of the container) and the bottommost point of its associated vertical line is at the same height as an immediately below obstacle (e.g., another text string, picture, or a bottom edge of the container). In some embodiments, this limitation only applies when a substring or sub-substring is on the same line as all other substrings or sub-substrings in the same substring pair.

For the horizontal lines that define the left edge of a substring pair: Horizontal lines connect the bottommost point of a vertical line and the topmost point of an immediately below vertical line. When a vertical line is further left than an immediately below vertical line, the rightmost point of a horizontal line is at the topmost point of the immediately below vertical line and the leftmost point of the horizontal line is at the bottommost point of the vertical line. When a vertical line is as far left as an immediately below vertical line, there is no horizontal line connecting the bottommost point of the vertical line and the topmost point of the immediately below vertical line. When a vertical line is further right than an immediately below vertical line, the rightmost point of a horizontal line is at the bottommost point of the vertical line and the leftmost point of the horizontal line is at the topmost point of the immediately below vertical line.

Figure 2U:
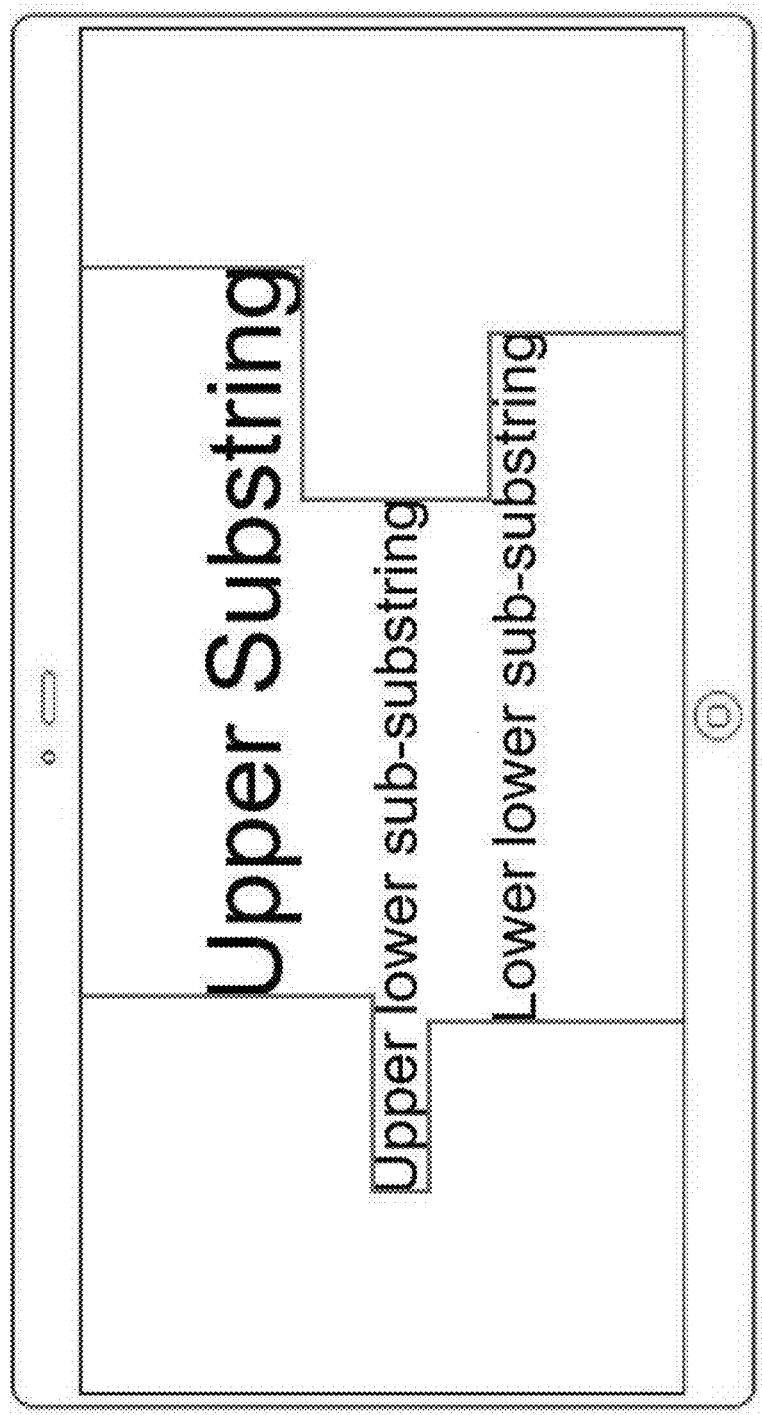

FIGS. 2Q-2U show the left and right edges of various substring pairs, where the left and right edges are highlighted with a gray line. In FIG. 2Q, the upper substring is horizontally offset to the right of the lower substring. In FIG. 2R, the upper substring is horizontally offset to the left of the lower substring. In FIG. 2S, the upper substring is centered above the lower substring, where the upper substring has the same width as the lower substring. In FIG. 2T, the second substring is placed to the right of the first substring in FIG. 2U, where the second substring has the same height as the first substring. In FIG. 2U, the upper substring is horizontally offset to the right of the upper lower sub-substring and the lower lower sub-substring is horizontally offset to the right of the upper lower sub-substring.

It shall be noted that, unless specified otherwise, the following exemplary methods can be applied to characters and texts of any typeface, font, and size. For example, the methods can be applied to characters displayed in 12-point Times New Roman typeface as well as to characters displayed in 10-point Calibri typeface. These examples, as well as all other illustrated and described typefaces, font sizes, and fonts, are not inclusive and shall not be interpreted in any way to limit the scope of the present invention.

Figure 3A:
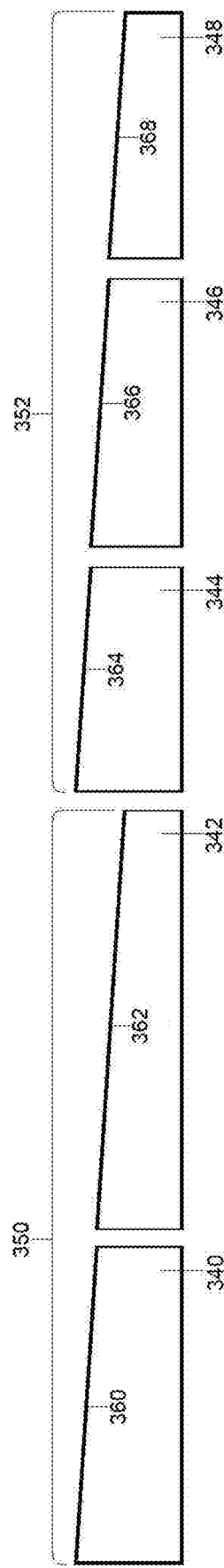
FIG. 3A shows two sets of demarcations, according to an embodiment.

FIG. 3A shows two sets of demarcations, according to an embodiment. The first set of demarcations 350 is comprised of the visually linked first 340 and second 342 demarcations while the second set of demarcations 352 is comprised of visually linked third 344, fourth 346, and fifth 348 demarcations. Visually linked demarcations are discrete such that, when placed proximate to a text string, a reader can differentiate between adjacent demarcations belonging to the same set. Here, the demarcations are hollow enclosing structures.

Adjacent demarcations belonging to the same set are visually linked such that, when the visually linked demarcations are placed proximate to a text string, a reader can see which demarcations belong to the same set. For example, the first set of demarcations 350 are visually linked through the slopes of their top edges 360, 362 and the second set of demarcations 352 are visually linked through the slopes of their top edges 364, 366, 368.

Figure 3B:
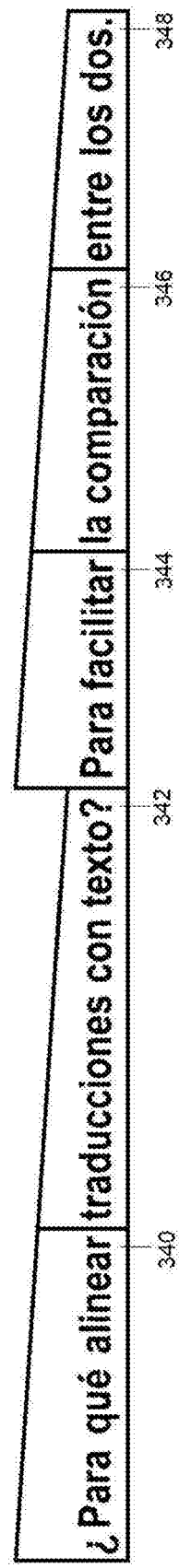
FIG. 3B shows a demarcated Spanish text string with defined substructures and superstructures, according to an embodiment.

FIG. 3B shows a demarcated Spanish text string, according to an embodiment.

The substructures are the phrases of "¿Para qué alinear" "traducciones con texto?" "Para facilitar" "la comparación" and "entre los dos." The substructures are defined by demarcations via a demarcation placed around each substructure. The edges of each demarcation form vertical lines in between adjacent demarcation, where the vertical lines indicate the start of a new substructure. The superstructures are sentences of "¿Para qué alinear traducciones con texto?" and "Para facilitar la comparación entre los dos." The superstructures are defined via a set of demarcations placed around each superstructure. Adjacent demarcations that are not visually linked (e.g., the second demarcation 342 is not visually linked to the third demarcation 344 because there is no continuity between the slope of the top edge 362 of the second demarcation 342 and the slope of the top edge 364 of the third demarcation 344) indicate the start of a new superstructure.

Thus, a preferred method of using demarcations to define substructures and superstructures of a text string requires demarcating the text string with two or more sets of demarcations such that 1) adjacent demarcations belonging to the same superstructure are visually linked and 2) adjacent demarcation belonging to different superstructures are not visually linked. It shall be appreciated that text string substructures may be any smaller portion of a text string, including, but not limited to, words, groups of words, or phrases while text string super structures may be any larger portion of a text string, including, but not limited to, groups of words, phrases, or sentences where at least one of the text string superstructures is comprised of a plurality of text string substructures.

Figure 3C:
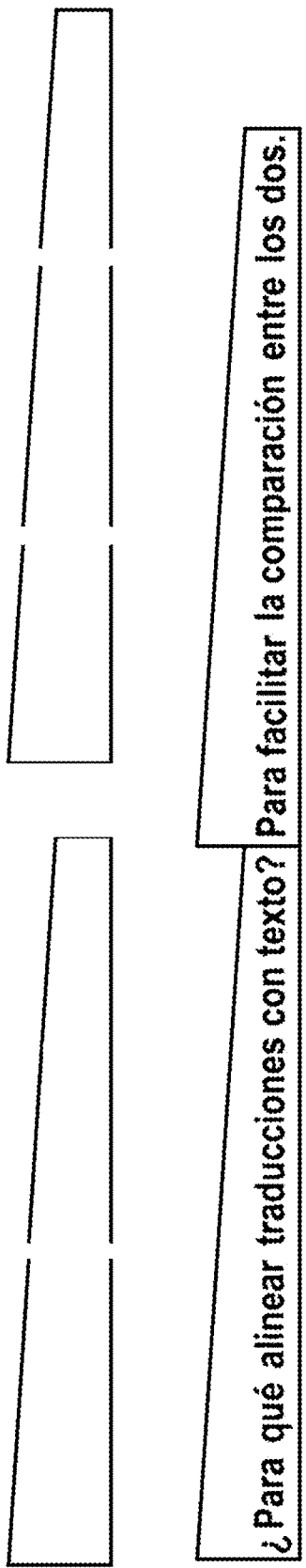
FIG. 3C shows two sets of demarcations (top) and a demarcated Spanish text string (bottom) where adjacent demarcations belonging to the same set of demarcations are not discrete.

FIG. 3C shows two sets of demarcations (top) and a demarcated Spanish text string (bottom) where related demarcations are not discrete. Here, unlike in FIG. 3B, a reader cannot differentiate one demarcation from an adjacent demarcation belonging to the same set of demarcations, and, thus, substructures of the text string are not defined. Adjacent demarcations belonging to the same demarcations must be discrete to allow readers to differentiate one demarcation from adjacent demarcations belonging to the same set of demarcations.

Figure 3D:
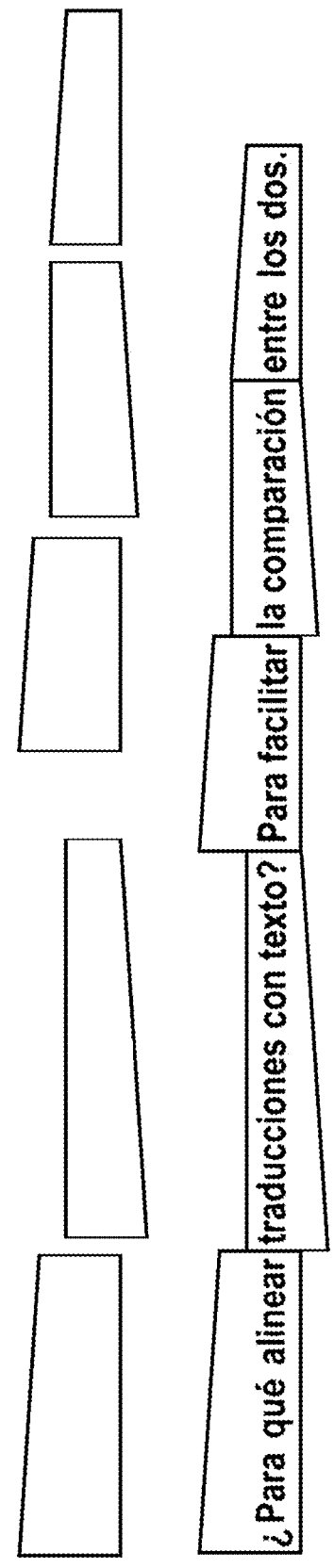
FIG. 3D shows two sets of demarcations (top) and a demarcated Spanish text string (bottom) where adjacent demarcations belonging to the same set of demarcations are not visually linked.

FIG. 3D shows two sets of demarcations (top) and a demarcated Spanish text string (bottom) where adjacent demarcations belonging to the same set of demarcations are not visually linked. Here, unlike in FIG. 3B, a reader cannot see which demarcations belong to the same set of demarcations, and, thus, the super structures of the text string are not defined. Adjacent demarcations that belong to the same set of demarcations must be visually linked to allow readers to see which demarcations belong to the same set of demarcations.

Figure 3E:
FIG. 3E shows two sets of demarcations (top) and a demarcated Spanish text string (bottom) where adjacent demarcations belonging to the same set of demarcations are visually linked.

FIG. 3E shows two sets of demarcations (top) and a demarcated Spanish text string (bottom) where adjacent demarcations belonging to the same set of demarcations are visually linked. Here, unlike in FIG. 3B, adjacent demarcations that belong to different sets of demarcations are visually linked such that a reader cannot differentiate between sets of demarcations, and, thus, the superstructures of the text string are not defined. Thus, adjacent demarcations that belong to different sets of demarcations should not be visually linked.

Figure 3F:
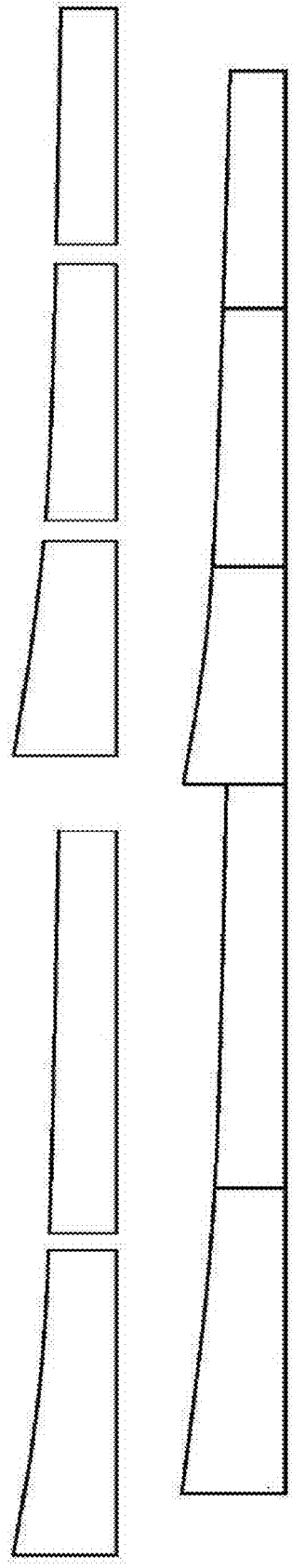
FIGS. 3F-3Y show sets of demarcations (top) and demarcated text strings (bottom) with defined substructures and superstructures, according to various embodiments.

FIGS. 3F-3Y show sets of demarcations where a given demarcation is visually linked to adjacent demarcations belonging to the same set of demarcations and not visually linked to adjacent demarcations belonging to a different set of demarcations. The demarcations define substructures and superstructures of the text string. Such demarcations embody a significant advance over traditional demarcations that cannot define substructures and superstructures of a text string.

FIG. 3F shows two sets of demarcations (top), an equivalent single demarcation (middle), and a demarcated Spanish text string (bottom), according to an embodiment. Here, the demarcations are hollow enclosing structures. Adjacent demarcations belonging to the same set of demarcations are visually linked through the slopes of their top edges, such that, for each set of demarcations, each of the demarcations has a top edge with a non-horizontal slope. Alternatively, for each set of demarcations, at least one of the demarcations has a top edge with a non-horizontal slope. The defined substructures are phrases and the defined superstructures are sentences.

It should be appreciated that receiving and rendering a single demarcation may be considered equivalent to receiving and rendering a plurality of demarcations, so long as the single demarcation, when positioned near one or more text strings (e.g., translated pairs), produces the same display as the plurality of demarcations would when similarly positioned (e.g., the rendered translated pairs and the single demarcation have the same appearance as the rendered translated pairs and the plurality of demarcations).

It should be appreciated that receiving and rendering a single demarcation may be considered equivalent to receiving and rendering a plurality of demarcations, so long as the single demarcation, when positioned near one or more text strings (e.g., translated pairs), produces the same result as the plurality of demarcations would when similarly positioned (e.g., both the single demarcation and the plurality of demarcations, when placed proximate to the translated pairs, define the substructures and superstructures of the first text string).

Figure 3G:
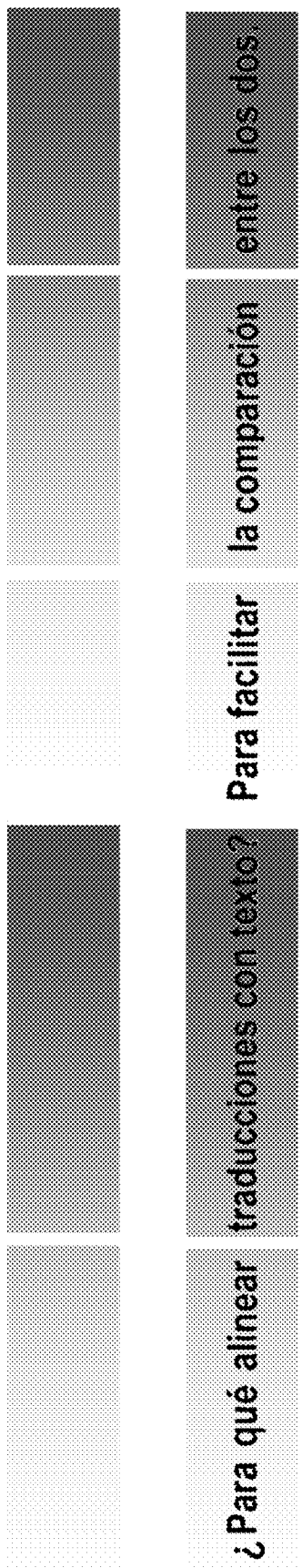

FIG. 3G shows two sets of demarcations (top) and a demarcated Spanish text string (bottom), according to an embodiment. Here, the demarcations are rectangular enclosing structures. Adjacent demarcations belonging to the same set of demarcations are visually linked through a gradual shading gradient such that, for each set of demarcations, each of the demarcations includes a portion of a gradual shading gradient. Alternatively, for each set of demarcations, at least one of the demarcations includes a portion of a gradual shading gradient. The defined substructures are phrases and the defined superstructures are sentences.

Figure 3H:
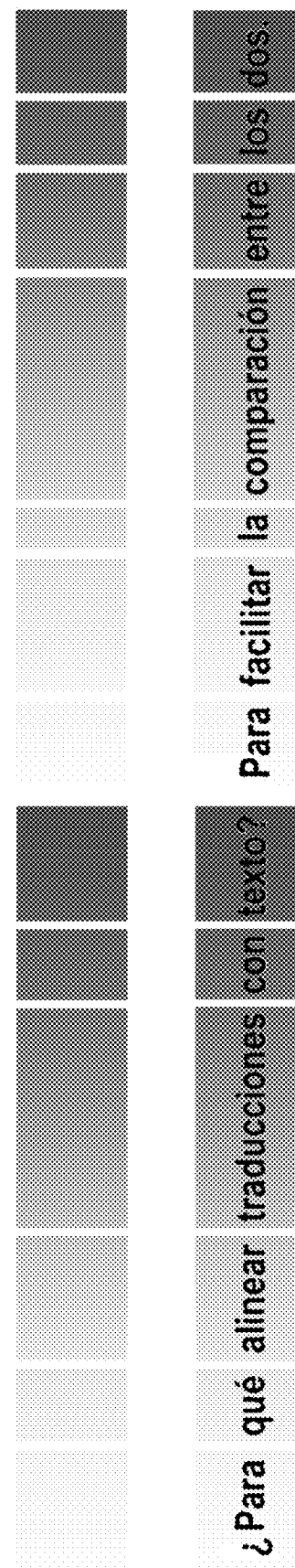

FIG. 3H shows two sets of demarcations (top) and a demarcated Spanish text string (bottom), according to an embodiment. Here, the demarcations are rectangular enclosing structures. Adjacent demarcations belonging to the same set of demarcations are visually linked through a gradual shading gradient such that, for each set of demarcations, each of the demarcations includes a portion of a gradual shading gradient. Alternatively, for each set of demarcations, at least one of the demarcations includes a portion of a gradual shading gradient. The defined substructures are words and the defined superstructures are sentences.

Figure 3I:
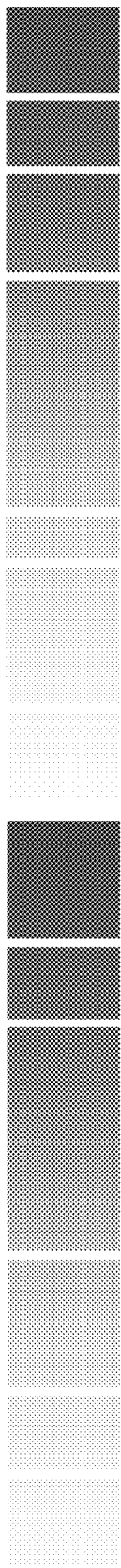

FIG. 3I shows two sets of demarcations (top) and a demarcated Spanish text string (bottom), according to an embodiment. Here, the demarcations are rectangular enclosing structures. Adjacent demarcations belonging to the same set of demarcations are visually linked through a gradual shading gradient such that, for each set of demarcations, each of the demarcations includes a portion of a gradual shading gradient. Alternatively, for each set of demarcations, at least one of the demarcations includes a portion of a gradual shading gradient. The defined substructures are words and the defined superstructures are sentences.

Figure 3J:
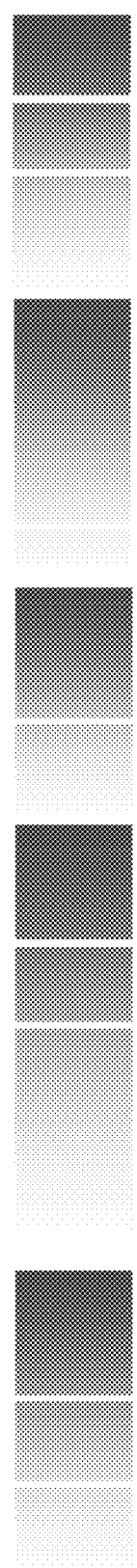

FIG. 3J shows five sets of demarcations (top) and a demarcated Spanish text string (bottom), according to an embodiment. Here, the demarcations are rectangular enclosing structures. Adjacent demarcations belonging to the same set of demarcations are visually linked through a gradual shading gradient such that, for each set of demarcations, each of the demarcations includes a portion of a gradual shading gradient. Alternatively, for each set of demarcations, at least one of the demarcations includes a portion of a gradual shading gradient. The defined substructures are words and the defined superstructures are phrases.

Figure 3K:
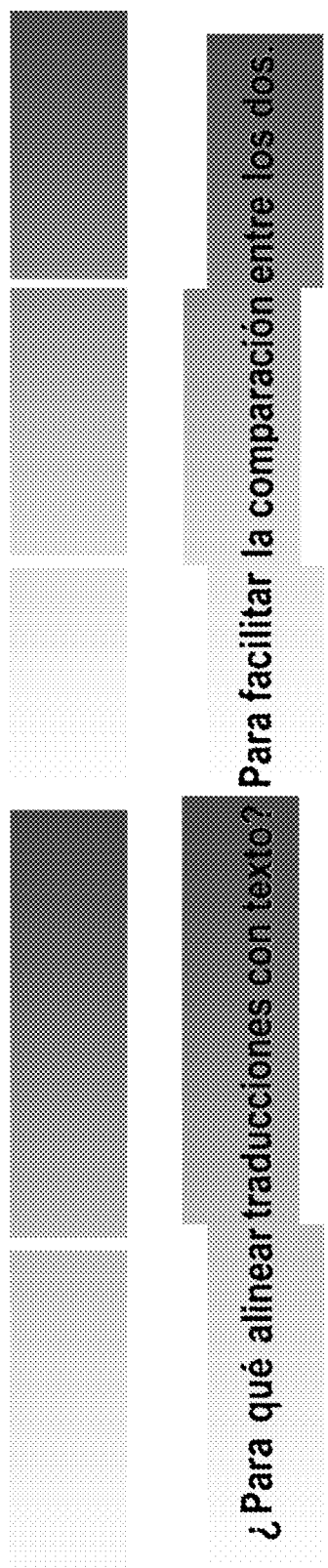

FIG. 3K shows two sets of demarcations (top) and a demarcated Spanish text string (bottom), according to an embodiment. Here, the demarcations are rectangular enclosing structures. Adjacent demarcations belonging to the same set of demarcations are visually linked through a gradual shading gradient such that, for each set of demarcations, each of the demarcations includes a portion of a gradual shading gradient. Alternatively, for each set of demarcations, at least one of the demarcations includes a portion of a gradual shading gradient. The defined substructures are phrases and the defined superstructures are sentences.

Figure 3L:
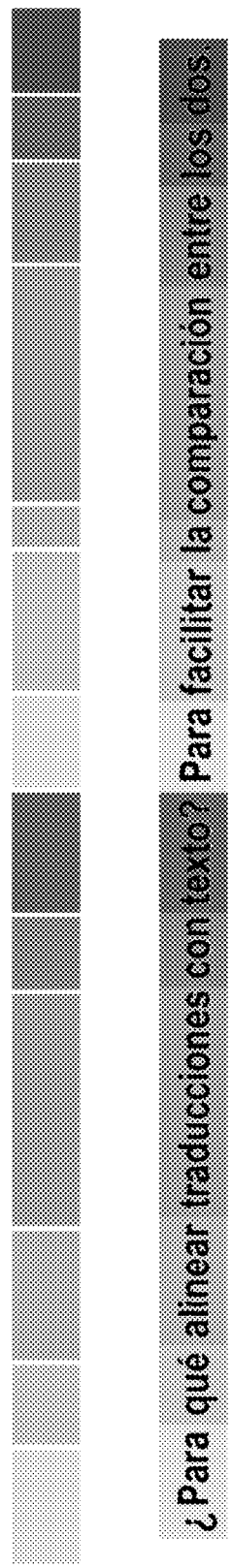

FIG. 3L shows two sets of demarcations (top) and a demarcated Spanish text string (bottom), according to an embodiment. Adjacent demarcations belonging to the same set of demarcations are visually linked through a distinct shading gradient such that, for each set of demarcations, each of the demarcations includes a portion of a distinct shading gradient. Alternatively, for each set of demarcations, at least one of the demarcations includes a portion of a distinct shading gradient. The defined substructures are words and the defined superstructures are sentences.

Figure 3M:

FIG. 3M shows two sets of demarcations (top) and a demarcated Spanish text string (bottom), according to an embodiment. Here, the demarcations are descending lines. Adjacent demarcations belonging to the same set of demarcations are visually linked through the slopes of their top edges, such that, for each set of demarcations, each of the demarcations has a top edge with a non-horizontal slope. Alternatively, for each set of demarcations, at least one of the demarcations has a top edge with a non-horizontal slope. The defined substructures are phrases and the defined superstructures are sentences.

Figure 3N:

FIG. 3N shows two sets of demarcations (top) and a demarcated Spanish text string (bottom), according to an embodiment. Adjacent demarcations belonging to the same set of demarcations are visually linked through the positions of their top edges, such that, for each set of demarcations, each of the demarcations has a top edge at a different position. Alternatively, for each set of demarcations, at least one of the demarcations has a top edge at a different position. The defined substructures are words and the defined superstructures are sentences.

Figures 3O, 3P:
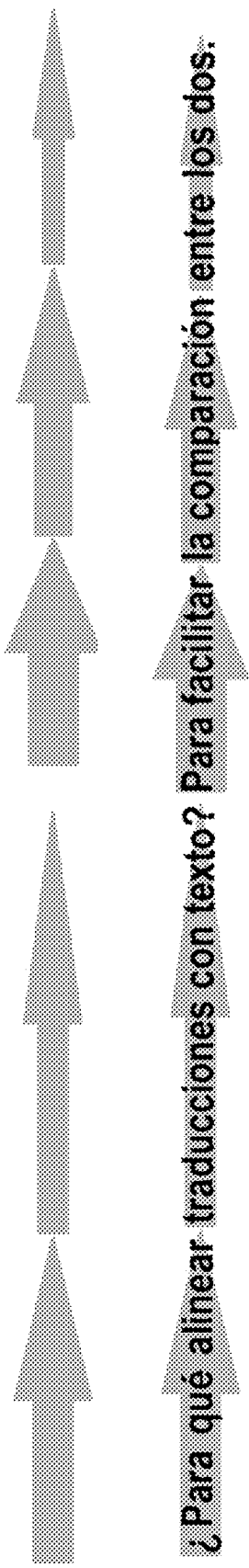

FIG. 3O shows two sets of demarcations (top) and a demarcated Spanish text string (bottom), according to an embodiment. Here, the demarcations are incrementally narrower arrows. Adjacent demarcations belonging to the same set of demarcations are visually linked through a change in the height of the demarcations, such that, for each set of demarcations, each of the demarcations has a different height. Alternatively, for each set of demarcations, at least one of the demarcations has a different height. The defined substructures are phrases and the defined superstructures are sentences.

FIG. 3P shows two sets of demarcations (top) and a demarcated Spanish text string (bottom), according to an embodiment. Here, the demarcations are shaded words of the Spanish text string. Adjacent demarcations belonging to the same set of demarcations are visually linked through a distinct shading gradient such that, for each set of demarcations, each of the demarcations includes a portion of a distinct shading gradient. Alternatively, for each set of demarcations, at least one of the demarcations includes a portion of a distinct shading gradient. The defined substructures are words and the defined superstructures are sentences. Alternatively, distinct color gradients can be any recognizable color gradient including, but not limited to, a rainbow where the demarcations are distinctly red, orange, yellow, green, blue, violet, etc.

Figure 3Q:

FIG. 3Q shows two sets of demarcations (top) and a demarcated Spanish text string (bottom), according to an embodiment. Here, the demarcations are rectangular enclosing structures. Adjacent demarcations belonging to the same set of demarcations are visually linked through a gradual shading gradient such that, for each set of demarcations, each of the demarcations includes a portion of a gradual shading gradient. Alternatively, for each set of demarcations, at least one of the demarcations includes a portion of a gradual shading gradient. Furthermore, each demarcation is placed such that the entire demarcation is between the text string descender line and the text string ascender line. Such demarcation placements allow text strings to be demarcated without interfering with adjacent text strings. The defined substructures are phrases and the defined superstructures are sentences.

Figure 3R:

FIG. 3R shows two sets of demarcations (top) and a demarcated Spanish text string (bottom), according to an embodiment. Here, the demarcations are rectangular structures. Adjacent demarcations belonging to the same set of demarcations are visually linked through a gradual shading gradient such that, for each set of demarcations, each of the demarcations includes a portion of a gradual shading gradient. Alternatively, for each set of demarcations, at least one of the demarcations includes a portion of a gradual shading gradient. Furthermore, each demarcation is placed such that the entire demarcation is between the text string x-height line and the text string ascender line. Such demarcation placements allow text strings to be demarcated without interfering with adjacent text strings, and with minimal harm to the readability of the text string. The defined substructures are phrases and the defined superstructures are sentences.

Figure 3S:

FIG. 3S shows two sets of demarcations (top) and a demarcated Spanish text string (bottom), according to an embodiment. Here, the demarcations are rectangular structures. Adjacent demarcations belonging to the same set of demarcations are visually linked through a gradual shading gradient such that, for each set of demarcations, each of the demarcations includes a portion of a gradual shading gradient. Alternatively, for each set of demarcations, at least one of the demarcations includes a portion of a gradual shading gradient. Furthermore, each demarcation is placed such that the entire demarcation is between the text string descender line and the text string base line. Such demarcation placements allow text strings to be demarcated without interfering with adjacent text strings, and with minimal harm to the readability of the text string. The defined substructures are phrases and the defined superstructures are sentences.

Figure 3T:
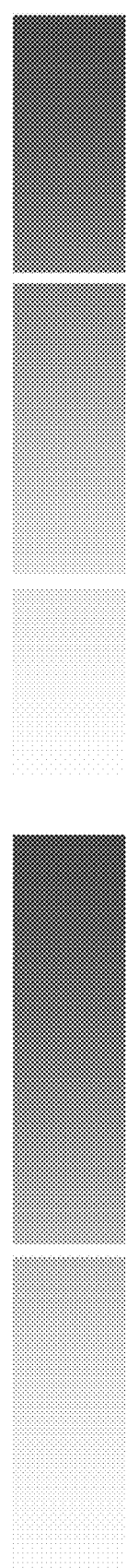

FIG. 3T shows two sets of demarcations (top) and demarcated Spanish and English text strings (bottom), according to an embodiment. Here, the demarcations are rectangular enclosing structures. Adjacent demarcations belonging to the same set of demarcations are visually linked through a gradual shading gradient such that, for each set of demarcations, each of the demarcations includes a portion of a gradual shading gradient. Alternatively, for each set of demarcations, at least one of the demarcations includes a portion of a gradual shading gradient. For both text strings, the defined substructures are phrases and the defined superstructures are sentences. Demarcating two text substrings with the same demarcation strengthens a visual association among text substrings within that demarcation. For example, here, the demarcations strengthen a visual association between "Para qué alinear" and "For what line up", "traducciones con texto?" and "translations with text?," etc.

Figure 3U:
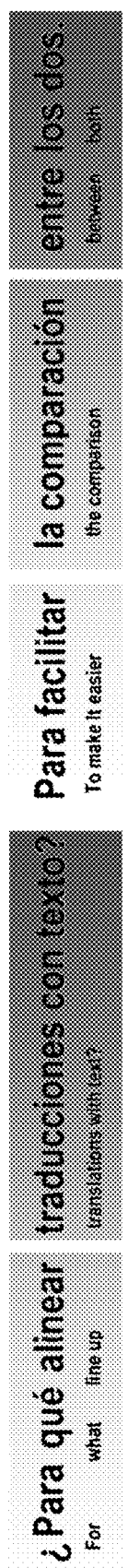

FIG. 3U shows two sets of demarcations (top) and demarcated Spanish and English text strings (bottom), according to an embodiment. Here, the demarcations are rectangular structures. Adjacent demarcations belonging to the same set of demarcations are visually linked through a gradual shading gradient such that, for each set of demarcations, each of the demarcations includes a portion of a gradual shading gradient. Alternatively, for each set of demarcations, at least one of the demarcations includes a portion of a gradual shading gradient. Each demarcation is placed such that the entire demarcation is in between the descender line of the lower text string and the ascender line of the upper text string (e.g, in between the bottommost point of the lower substring and the topmost point of the upper substring). Such demarcation placement allows text strings to be demarcated without interfering with adjacent text strings, and with minimal harm to the readability of the text strings. Furthermore, demarcating two text substrings with the same demarcation strengthens a visual association among text substrings within that demarcation. For both text strings, the defined substructures are phrases and the defined superstructures are sentences.

Figure 3V:

FIG. 3V shows two sets of demarcations (top) and demarcated Spanish and English text strings (bottom), according to an embodiment. Here, the demarcations are rectangular structures. Adjacent demarcations belonging to the same set of demarcations are visually linked through a gradual shading gradient such that, for each set of demarcations, each of the demarcations includes a portion of a gradual shading gradient. Alternatively, for each set of demarcations, at least one of the demarcations includes a portion of a gradual shading gradient. Each demarcation is placed such that the entire demarcation is in between the base line of the lower text string and the x-height line of the upper text string. Such demarcation placement allows text strings to be demarcated without interfering with adjacent text strings, and with minimal harm to the readability of the text string. Furthermore, demarcating two text substrings with the same demarcation strengthens a visual association among text substrings within that demarcation. For both text strings, the defined substructures are phrases and the defined superstructures are sentences.

FIG. 3W shows two sets of demarcations (top) and demarcated Spanish and English text strings (bottom), according to an embodiment. Here, the demarcations are rectangular structures. Adjacent demarcations belonging to the same set of demarcations are visually linked through a gradual shading gradient such that, for each set of demarcations, each of the demarcations includes a portion of a gradual shading gradient. Alternatively, for each set of demarcations, at least one of the demarcations includes a portion of a gradual shading gradient. Each demarcation is placed such that the entire demarcation is in between the mean line of the lower text string and the base line of the upper text string. Such demarcation placement allows text strings to be demarcated without interfering with adjacent text strings, and with minimal harm to the readability of the text string. Furthermore, demarcating two text substrings with the same demarcation strengthens a visual association among text substrings within that demarcation. For both text strings, the defined substructures are phrases and the defined superstructures are sentences.

FIG. 3X shows two sets of demarcations (top) and demarcated Spanish and English text strings (bottom), according to an embodiment. Here, the demarcations are rectangular structures. Adjacent demarcations belonging to the same set of demarcations are visually linked through a gradual shading gradient such that, for each set of demarcations, each of the demarcations includes a portion of a gradual shading gradient. Alternatively, for each set of demarcations, at least one of the demarcations includes a portion of a gradual shading gradient. Each demarcation is placed such that the entire demarcation is in between the ascender line of the lower text string and the descender line of the upper text string (e.g., in between the topmost point of the lower substring and the bottommost point of the upper substring). Such demarcation placement allows text strings to be demarcated without interfering with any text strings, and with no harm to the readability of the text string. Furthermore, demarcating two text substrings with the same demarcation strengthens a visual association among text substrings within that demarcation. For both text strings, the defined substructures are phrases and the defined superstructures are sentences.

FIG. 3Y shoes two sets of demarcations (top) and a demarcated Spanish text string (bottom), according to an embodiment. Here, the demarcations are hollow enclosing structures. Adjacent demarcations belonging to the same set of demarcations are visually linked through the slopes of their top edges, such that, for each set of demarcations, each of the demarcations has a top edge with a non-horizontal slope. Alternatively, for each set of demarcations, at least one of the demarcations has a top edge with a non-horizontal slope. The defined substructures are phrases and the defined superstructures are sentences. Demarcations are placed on the first and last substructure of every superstructure, as well as on every other substructure. Such demarcation placement allows fewer demarcations to be used to define substructures and superstructures of the text string, potentially reducing clutter.

It should be appreciated that adjacent demarcations belonging to the same set of demarcations can be visually linked through any change in appearance, such that, when the demarcations are positioned proximate to the text string, the reader can understand which demarcations belong to which set of demarcations and the reader can differentiate between adjacent demarcations belonging to the same set. The change in appearance can be gradual or distinct.

Figure 4A:
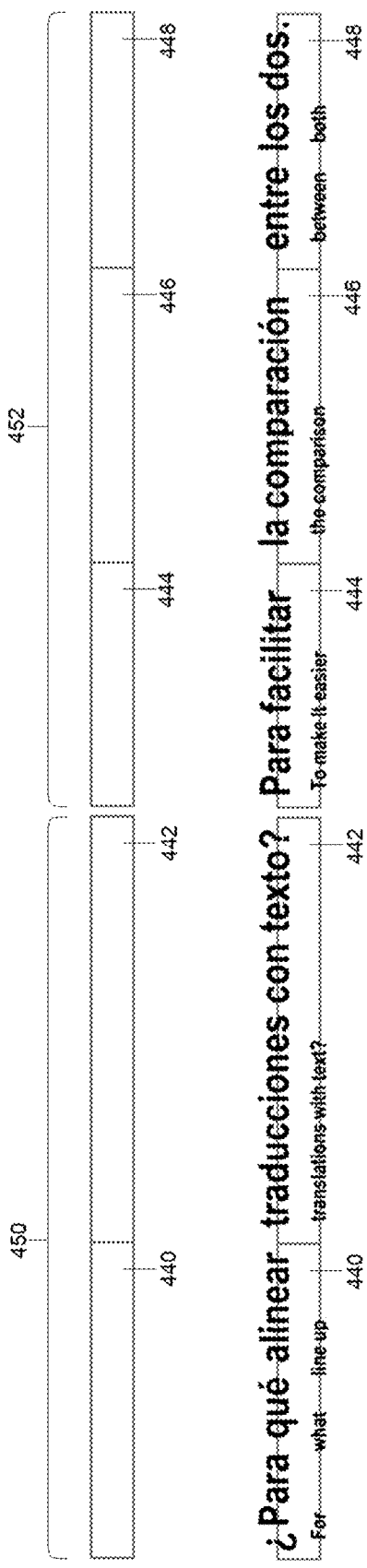

FIG. 4A shows two sets of demarcations (top) and a demarcated Spanish and English text string (bottom), according to an embodiment. The first set of demarcations 450 is comprised of the first 440 and second 442 demarcations while the second set of demarcations 452 is comprised of the third 444, fourth 446, and fifth 448 demarcations. The demarcations are discrete such that, when placed proximate to a text string, a reader can differentiate one demarcation from adjacent demarcations belonging to the same set of demarcations. Here, the demarcations are hollow structures.

When the demarcations are placed proximate to a text string, each demarcation interacts with one or more substrings, defining associations among those text substrings. For example, the first demarcation 440 interacts with the text substrings of "¿Para," "qué," "alinear," "For," "what," and "line up," defining an association among those six text substrings. Here the demarcations define a Spanish phrase and its English translation. Each demarcation is placed such that the entire demarcation is in between the descender line of the lower text string and the ascender line of the upper text string. Such demarcation placement allows text strings to be demarcated without interfering with any text strings, and with no harm to the readability of the text string.

Thus, a preferred method of using sets of demarcations to define an association between text substrings requires each demarcation to 1) be discrete and 2) to interact with one or more text substrings. The demarcations define an association between text substrings. Such demarcations embody a significant advance over traditional demarcations that cannot define an association among text substrings.

Figure 4B:
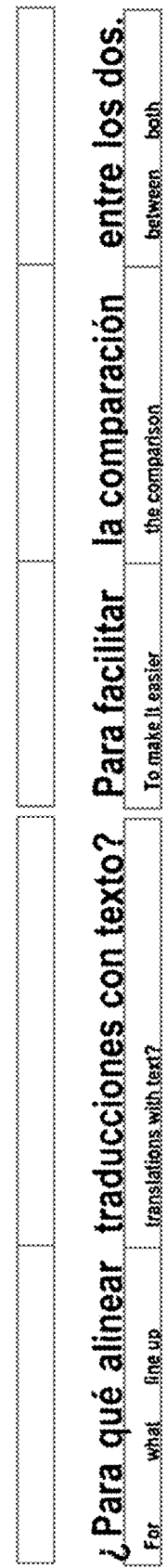

FIGS. 4B-4D show sets of demarcations where each of the demarcations is discrete and interacts with one or more text substrings. The demarcations define associations among the text substrings. Such demarcations embody a significant advance over traditional demarcations that do not define associations without harming the readability of the text strings.

FIG. 4B shows two sets of demarcations (top) and demarcated Spanish and English text strings (bottom), according to an embodiment. Here, the demarcations are hollow structures that define associations between the Spanish phrases and their English translations. Each demarcation is placed such that the bottom edge of the demarcation is at the base line of lower substring and the top edge of the demarcation is at the base line of the upper substring. Such demarcation placement, where the demarcations do not interact with an inner airspace of the text substrings, allows text strings to be demarcated without interfering with any text strings, and with no harm to the readability of the text string.

FIG. 4C shows two sets of demarcations (top) and demarcated Spanish and English text strings (bottom), according to an embodiment. Here, the demarcations are hollow arrow-like structures that define associations between the Spanish phrases and their English translations.

FIG. 4D shows two sets of demarcations (top) and demarcated Spanish and English text string (bottom), according to an embodiment. Here, the demarcations are arrow-like structures with a gradual gradient that define associations between the Spanish phrases and their English translations.

FIG. 5A shows translated pairs, according to an embodiment. Here, each translated pair includes one of the English second substrings centered above its corresponding Spanish first substring. The arrows (the demarcations) are positioned in between edges of adjacent translated pairs. The height of each demarcation is the same or greater than the height of a nearby substring. Alternatively, for at least half of the demarcations, the height of each demarcation is the same or greater than the height of a nearby substring. Yet alternatively, for at least one demarcation, the height of each demarcation is the same or greater than the height of a nearby substring. In some embodiments, demarcations that define the superstructures of the first text string are more emphasized than demarcations that define the substructures of the first text string. In some embodiments, demarcations positioned in between edges of adjacent translated pairs belonging to different superstructures have a different color, design, or pattern than demarcations positioned in between edges of adjacent translated pairs belonging to the same superstructure. In some embodiments, the demarcations can include two sets of demarcations such as those described in this disclosure and illustrated in FIGS. 3G-3Y.

FIG. 5B shows translated pairs, according to an embodiment. Here, each translated pair includes one of the English second substrings centered above its corresponding Spanish first substring. The arrows (the demarcations) are positioned in between edges of adjacent translated pairs. Each demarcation vertically overlaps the first and second substrings in a nearby translated pair. Alternatively, for at least half of the demarcations, each demarcation vertically overlaps the first and second substrings in a nearby translated pair. Yet alternatively, for at least one demarcation, each demarcation vertically overlaps the first and second substrings in a nearby translated pair.

FIG. 5C shows translated pairs, according to an embodiment. Here, each translated pair includes one of the English second substrings centered above its corresponding Spanish first substring. The grid (the demarcation) encloses the translated pairs such that the substructures (phrases) and the superstructures (sentences) of the first substring are defined by the demarcation. The grid's vertical lines are darker than the grid's horizontal lines.

According to an embodiment, at least one of the demarcations is positioned in between adjacent translated pairs such that the demarcation does not horizontally overlap those adjacent translated pairs. Alternatively, at least half of the demarcations are positioned in between adjacent translated pairs such that the demarcations do not horizontally overlap their respective adjacent translated pairs. Yet alternatively, most of the demarcations are positioned in between adjacent translated pairs such that the demarcations do not horizontally overlap their respective adjacent translated pairs. Yet alternatively, each of the demarcations are positioned in between adjacent translated pairs such that each demarcation does not horizontally overlap its respective adjacent translated pairs.

Figure 6:
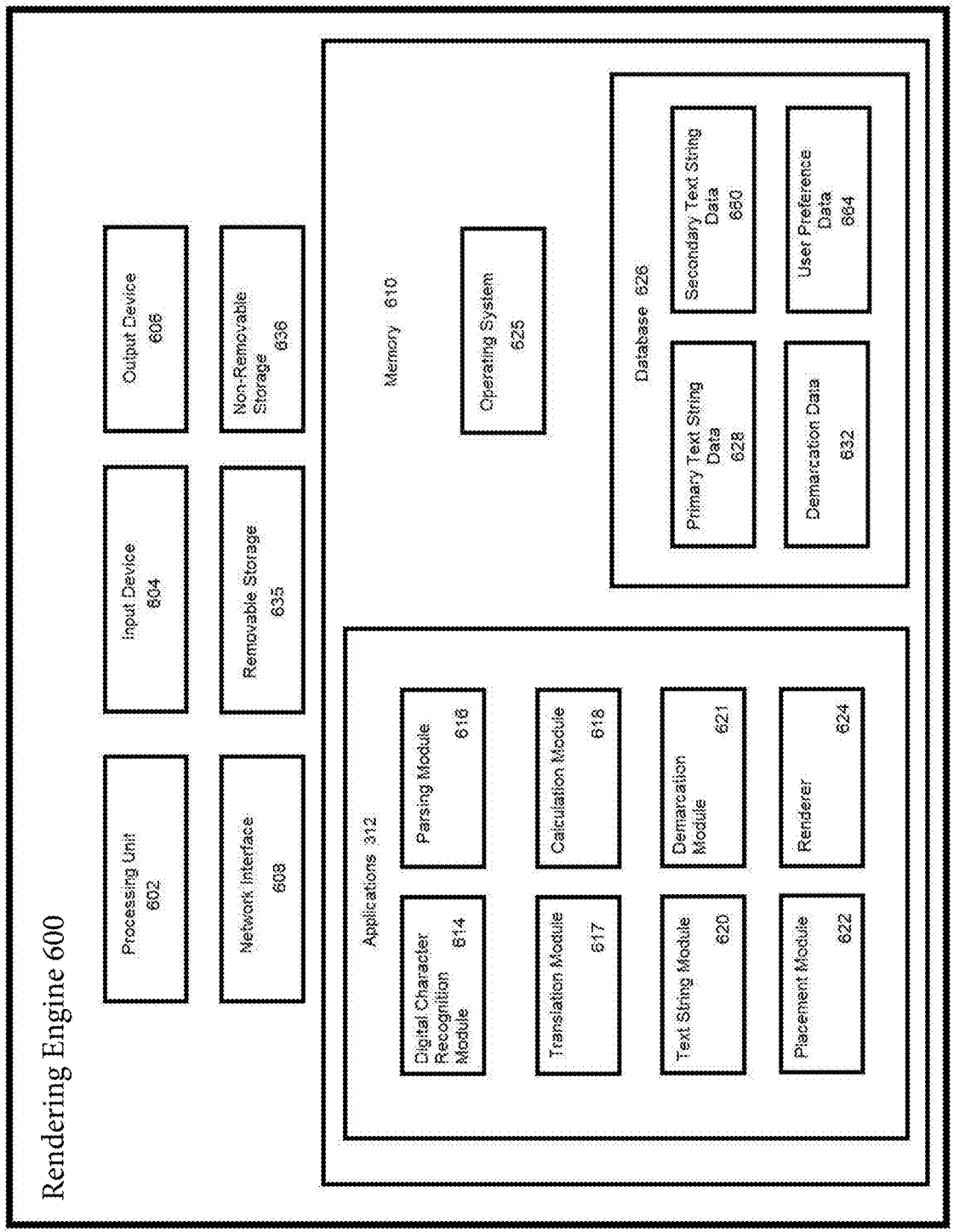
FIG. 6 shows a block diagram illustrating example physical components of a rendering engine with which aspects of the disclosure may be practiced.

FIG. 6 is a block diagram illustrating example physical components (e.g. hardware) of a rendering engine 600 with which aspects of the disclosure may be practiced, the rendering engine 600 comprising at least one processing unit 602 and memory 610. The rendering engine 600 may be referred to as the system.

The processing unit 602 executes commands to perform the functions specified in flowcharts and/or block diagram blocks throughout this disclosure. It should be appreciated that processing may be implemented either locally via the processing unit 602 or remotely via various forms of wireless or wired networking technologies or a combination of both.

The term computer readable media as used herein may include computer storage media. Computer storage media may include volatile and nonvolatile, removable and non-removable media implemented in any method or technology for storage of information, such as computer readable instructions, data structures, or program modules. The memory 610, the removable storage device 635, and the non-removable storage device 636 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the rendering engine 600. In some embodiments, such computer storage media may be part of the rendering engine 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Memory 610 may include various types of short and long-term memory as is known in the art. Memory 610 may be loaded with various applications 612 in the form of computer readable program instructions. These computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Applications 630 may include a digital recognition module 614, a parsing module 616, a translation module 617, a calculation module 618, a text string module 620, a demarcation module 621, a placement module 622, and a renderer 624 as will be further discussed. Accordingly, memory 610 includes all necessary applications per each embodiment.

The digital character recognition module 614 identifies, on display screens, text strings and associated text string meta data. According to an embodiment, the digital character recognition module 614 scans displayed content and uses known character recognition software to identify text strings and associated text string metadata. Metadata (identity, position, typeface, font, size, etc) of each text string may be saved to first text string data 628 or second text string data 630.

The parsing module 616 identifies text strings and associated text string metadata by parsing the tags of HTML content and associated Cascading Style Sheet (CSS) files. According to an embodiment, the parsing module 616 parses the tags of the HTML content to identify text strings as well as associated Cascading Style Sheet (CSS) files to identify associated text string metadata. Metadata (identity, position, typeface, font, size, etc) of each text string may be saved to first text string data 628 or second text string data 630.

The translation module 617 translates various foreign languages into either English or other chosen languages. According to an embodiment, the translation module 617 uses known translation software to perform translations of text strings.

The calculation module 618 defines airspaces of text strings such as airspaces of entire text strings, airspaces of text string substructures, and text string superstructures. Defined text string airspaces may be used for the generation and placement of demarcations, as will be later described. According to an embodiment, the calculation module defines the upper airspace of the text string as the area bounded by the text x-height line, the text ceiling, the leftmost point of the text string, and the rightmost point of the text string. The calculation module defines the inner airspace of the text string as the area bounded by the text base line, the text x-height line, the leftmost point of the text string, and the rightmost point of the text string. The calculation module defines the lower airspace of the text string as the area bounded by the text floor, the text base line, the leftmost point of the string, and the rightmost point of the text string. The calculation module defines the airspace of the text string as the area bounded by the text floor, the text ceiling, the leftmost point of the string, and the rightmost point of the text string.

Alternatively, based on an text string's metadata, the calculation module generates, with the same attributes as the unmodified character, an "x" as well as an exemplary text string of characters with ascenders and descenders such as "pd." The text ceiling is set to the position of the topmost point of the exemplary string, the text floor is set to the position of the bottommost point of the exemplary string, the text base-line is set to the position of the bottommost point of the "x," and the text x-height line is set to the position of the topmost point of the "x." The calculation module defines the upper airspace of the text string as the area bounded by the text x-height line, the text ceiling, the leftmost point of the text string, and the rightmost point of the text string. The calculation module defines the inner airspace of the text string as the area bounded by the text base line, the text x-height line, the leftmost point of the text string, and the rightmost point of the text string. The calculation module defines the lower airspace of the text string as the area bounded by the text floor, the text base line, the leftmost point of the text string, and the rightmost point of the text string. The calculation module defines the airspace of the text string as the area bounded by the text floor, the text ceiling, the leftmost point of the string, and the rightmost point of the text string.

The calculation module 618 can further tokenize text strings to identify the structure of a text string (e.g., the substructures and superstructures of the text string). The structure of the text string can be used for the generation and placement of demarcations, as will be later described. According to an embodiment, the calculation module 618 tokenizes a text string to identify substructures such as words or phrases and superstructures such as phrases or sentences.

The tokenization of text strings to identify the structure of a text string can be performed using sentence segmentation algorithms to identify phrases, sentences, and other structures using punctuation and statistical models. For example, tools like spaCy (doc.sents), NLTK (sent tokenize), and Stanford NLP are commonly used for breaking down paragraphs into manageable units. To identify multi-word expressions, phrase extraction algorithms can be used to detect meaningful phrases such as noun phrases (e.g., "big pine tree") or verb phrases (e.g., "is flying fast"). For example, tools like TextBlob (text.noun_phrases), spaCy (doc.noun_chunks), and NLTK's RegexpParser can be used to extract phrases based on linguistic patterns and part-of-speech tagging.

Alternatively, the tokenization of text strings to identify the structure of a text string can be performed using constituency parsing algorithms to break down a sentence into a hierarchical structure, identifying components like noun phrases (NP), verb phrases (VP), and prepositional phrases (PP). For example, tools such as Benepar (Berkeley Parser for spaCy), Stanford Parser, and Berkeley Neural Parser can be used for grammar correction and machine translation. To identify how text elements are connected grammatically, dependency parsing algorithms can be used to map text elements their relationships in a dependency tree. For example, tools like spaCy (token.dep_) and Stanford NLP (CoreNLPClient) can be used to provide a detailed syntactic analysis of a text string.

Alternatively, the tokenization of text strings to identify the structure of a text string can be performed using Named Entity Recognition (NER) algorithms to identify key named phrases such as people, locations, and organizations. This method classifies proper nouns using pre-trained models such as spaCy (doc.ents) and Stanford NER. NER is particularly useful for extracting company names or locations from news articles.

The text string module 620 receives text strings. According to an embodiment, text strings are received from first text string data 628 or second text string data 630. Alternatively, when there are no text strings with the desired attributes in first text string data 628 or second text string data 630, new text strings may be received when they are input by a user. User preferences for received text strings may be stored in user preference data 634. A Second text string can be received when the translation module translates the first text string.

The demarcation module 621 receives demarcations. According to an embodiment, demarcations are received from demarcation data 632. The received demarcations may, when placed proximate to the text string, define substructures and/or superstructures of the text string. The received demarcations may, when placed proximate to the text string, define associations among text substrings. When there are no demarcations with the desired properties in demarcation data 632, new demarcations may be received when they are generated by the demarcation modules 621 or input by a user. Demarcation generation may comprise steps of 1) selecting a type of demarcation and 2) scaling the demarcations. The generated demarcations may, when placed proximate to the text string, define substructures and superstructures of the text string. The received demarcations may, when placed proximate to the text string, define associations among text substrings. The type of demarcation selected may be based on user preferences stored in user preference data 634. Demarcation scaling may be performed automatically by the calculation module 618.

The placement module 622 places and/or superimposes text strings and demarcations during the rendering processes.

The renderer 624 draws the text strings and demarcations to be displayed on a display scheme. According to an embodiment, the renderer 624, in conjunction with the placement module 622, draws the translated pairs and demarcations to be displayed on the display screen.

Memory 610 may also include an operating system 625 and a database 626. The database 626 may include first text string data 628, second text string data 630, demarcation data 632, and user preference data 634 as will be further discussed. Accordingly, memory 610 includes all necessary applications per each embodiment.

The operating system 625 is suitable for controlling the operation of the rendering engine 600.

First text string data 628 may include all metadata associated with first text strings including, but not limited to, text string typefaces, fonts, point sizes, dimensions, etc. Second text string data 628 may include metadata of second text strings including, but not limited to, text string typefaces, fonts, point sizes, dimensions, etc. Demarcation data 632 may include all metadata associated with demarcations including, but not limited to, demarcation designs, color, dimensions, etc. User preference data 634 may include all data associated with user preferences. In certain embodiments, the database 626 may be implemented locally, whereas in other embodiments, the database 626 may be implemented remotely.

Text string specific values that depend on text string properties including, but not limited to, text ceiling, text floor, text x-height, and text base line, may be stored as part of first text string data 628 or second text string data 630. Accordingly, the database 626 includes all necessary content per each embodiment.

The rendering engine 600 may further comprise an input device 604, and output device 606, and a network interface.

The input device 604 is used to interact with the rendering engine 600. According to an embodiment, the input device 604 may be a touchscreen or keypad. Alternatively, the input device 604 may be a microphone for speech capture, a camera for visual text or motion capture, a keyboard, or any other device or method of receiving user inputs and/or commands.

The output device 606 is used by the rendering engine 600 to interact with a user. According to an embodiment, the output device 606 may be an electronic display screen in any of the various forms associated with smart devices.

To enable the aforementioned functionality, the rendering engine 600 is operative to employ various Natural Language Processing technologies such as Datasaur OCR labeling tool, Google Cloud Natural Language API, and Apache OpenNLP to perform text string tokenization. Furthermore, the rendering engine 600 is operative to employ various font technologies like variable fonts, raster, vector, TrueType, and Microsoft OpenType and the database 626 also includes associated font-resource files.

In an embodiment, the rendering engine is further configured to dynamically adjust rendering based on linguistic complexity. Linguistic complexity refers to structural or semantic differences between the source and target languages that make comprehension difficult. These complexities may arise from sentence constructions such as compound clauses, nested syntax, idiomatic expressions, or grammatical disparities-such as when a source language omits explicit grammatical components (e.g., subjects, objects) that must be present in the target language.

The rendering engine analyzes the received text strings to detect linguistic mismatches or ambiguities and adjusts the rendering accordingly to maintain structural clarity. For example, where the first text string is written in classical Chinese-a language known for omitting explicit grammatical subjects—the second text string may require the insertion of implied subjects or conjunctions to satisfy the grammar rules of English. In such scenarios, the rendering engine dynamically performs one or more of the following:

Inserts typographical indicators, such as brackets, around inferred or implied components in the second text string (e.g., "[it]", "[when]") to visually distinguish them as grammatical insertions rather than direct translations.

Generates and positions visual demarcations proximate to one or more translated pairs to highlight or segment structural components in a manner that aids comprehension of the underlying syntax.

Applies stylized cues, such as overlays, tooltips, font color, or shading, to emphasize portions of the first or second text string where meaning is context-dependent rather than explicitly stated.

For example, when rendering the following classical Chinese sentence: 兵败如山倒

(Literal: Army Defeated Like Mountain Collapse)
The corresponding English translation might be:
"[When] the army is defeated, [it] collapses like a mountain."

In this case, the rendering engine identifies that "when" and "it" are not present in the Chinese sentence but are necessary for grammatical cohesion in English. The engine then renders brackets around these inferred elements and may position demarcations to clarify their relationship with the adjacent Chinese text. This enhances the structural alignment between the two languages and improves the interpretability of the translated pair.

Through such dynamic adjustments, the rendering engine enables a more faithful, structurally-aware presentation of translated content. This feature is particularly useful in translation interfaces, language education tools, or linguistic analysis platforms where maintaining structural fidelity between languages of differing complexity is critical.

In some embodiments, the rendering engine is operatively coupled to an eye tracking system and an artificial intelligence (AI) module configured to optimize the placement and appearance of demarcations based on user reading behavior. The eye tracking system may include one or more cameras, image sensors, infrared detectors, or wearable devices configured to capture real-time gaze data while the user interacts with the rendered translated pairs and associated demarcations.

The eye tracking system may detect a variety of gaze-related metrics, including but not limited to: gaze position, fixation durations, pupil dilation, blink rates, and saccadic movements. As the user reads the rendered text, this gaze data provides insights into cognitive processing, such as which substrings the user fixates on, how often regressions occur, and which areas are skipped or reread.

The AI module may receive the gaze data in real time and analyze it to identify signals indicative of reduced reading fluency or comprehension difficulty. In a real-time feedback configuration, the AI module processes the incoming eye tracking data during the reading session and dynamically adjusts one or more demarcations. For example, if a user demonstrates prolonged fixations at a boundary between translated pairs, the rendering engine may respond by modifying the placement, size, or visual characteristics of a nearby demarcation to enhance structural clarity. In some embodiments, demarcations may be repositioned, visually softened, or styled differently based on real-time user interaction.

In other embodiments, the rendering engine operates in a batch improvement mode. In this configuration, eye tracking data is collected over time from one or more users and analyzed asynchronously. The AI module performs aggregate analysis to identify general patterns in gaze behavior that correlate with effective or ineffective demarcation strategies. For instance, the AI module may identify specific demarcation styles or positions that consistently lead to smooth, uninterrupted gaze flow versus those that lead to frequent regressions or user confusion.

Using this batch analysis, the AI module may generate improved demarcation rules, segmentation heuristics, or visual formatting guidelines that can be applied to subsequent rendering operations. These optimized demarcation strategies may be stored in memory and used by the rendering engine to enhance future renderings, even in the absence of live gaze data.

In some implementations, a hybrid approach may be employed. In such embodiments, the rendering engine initializes with demarcation strategies informed by batch-trained models and refines them during active use by applying real-time adjustments based on the current user's eye tracking behavior. This allows the system to benefit from both population-level insights and individualized adaptation, thereby improving structural comprehension across a wide range of users and content types.

By integrating real-time and/or batch-driven feedback mechanisms into the rendering process, the system can intelligently optimize demarcation placement and appearance to better reflect the structural features of the first and second text strings, ultimately facilitating improved user comprehension of translated pairs.

Methods in this document are illustrated as blocks in a logical flow graph. Note that the order in which the processes are described is not intended to be construed as a limitation, and any number of the described method blocks can be combined in any order to implement the illustrated method, or alternate methods. Additionally, individual blocks may be deleted from the methods without departing from the spirit and scope of the subject matter described herein. All method steps described within this document may be performed automatically in real-time or near-real-time by a processer or processors of the rendering engine 600.

Figure 7:
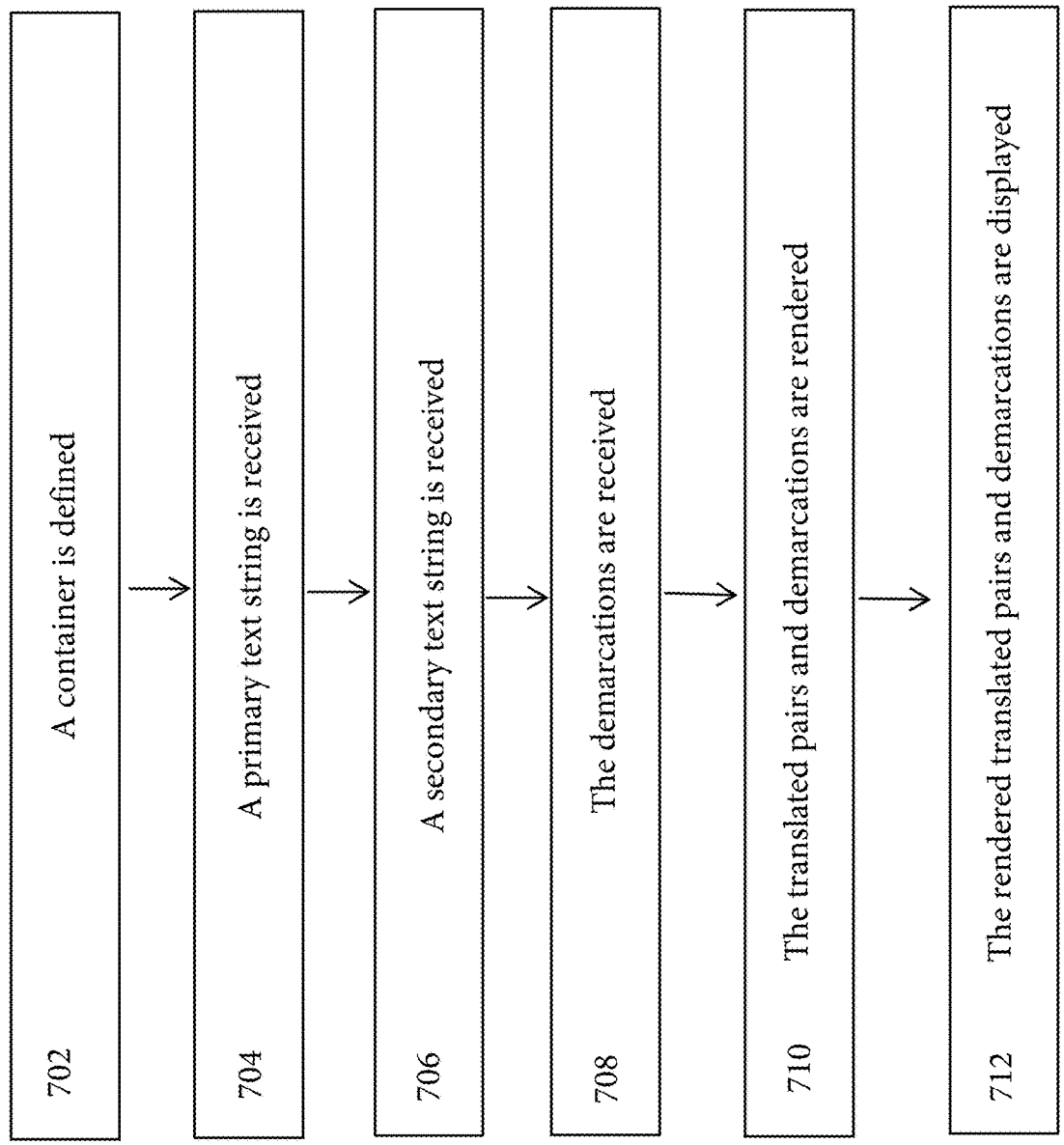
FIG. 7 shows a method of rendering translated pairs and demarcations, where the translated pairs have improved structure comprehension, according to an embodiment.

FIG. 7 shows a method 700 of rendering translated pairs and demarcations, where the translated pairs have enhanced structural comprehension, according to an embodiment.

In optional step 702, a container is defined. This container sets boundaries for rendered text and demarcations, ensuring that the rendered text and demarcations fit within a specified area. The container can further handle issues like wrapping, clipping, and alignment.

In step 704, a first text string is received. According to an embodiment, the text string is received when the digital character recognition module scans content on an electronic display to identify the first text string. Alternatively, the first text string is received when the parsing module parses HTML content and associated CSS files to identify the first text string. Yet alternatively, the first text string is received when a user inputs a first text string. It should be appreciated that receiving the first text string includes any method of capturing, obtaining, or extracting the first text string from any source such that it can be used for further processing via a rendering engine.

The first text string can be comprised of a plurality of first substrings. The first substrings can be identified using the calculation module 618. Alternatively, the first substrings can be defined by the user.

The structure of the first text string can be comprised of two or more superstructures where at least one of superstructures is comprised of two or more substructures. For example, the first text string is comprised of two sentences where one of the sentences is comprised of two phrases. Alternatively, the structure of the first text string is comprised of two or more superstructures where each superstructure is comprised of two or more substructures. For example, the second text string is comprised of two sentences where each of the sentences is comprised of two phrases. Structural elements of the first text string can be defined using the calculation module 618. Alternatively, structural elements of the first text string can be defined by the user.

In step 706, a second text string is received. According to an embodiment, the second text string is received when the digital character recognition module scans content on an electronic display to identify the second text string. Alternatively, the second text string is received when the parsing module parses HTML content and associated CSS files to identify the second text string. Yet alternatively, the second text string is received when a user inputs a second text string. Yet alternatively, the second text string is received when the translation module 617 generates the second text string as a translation of the first text string. It should be appreciated that receiving the second text string includes any method of capturing, obtaining, or extracting the second text string from any source such that it can be used for further processing via a rendering engine.

The second text string can be comprised of a plurality of second substrings. The second substrings can be identified using the calculation module 618. Alternatively, the second substrings can be generated as translations of the first substrings. Yet alternatively, the second substrings can be defined by the user.

The structure of the second text string is comprised of two or more superstructures where at least one of superstructures is comprised of two or more substructures. For example, the second text string is comprised of two sentences where one of the sentences is comprised of two phrases. Alternatively, the structure of the second text string is comprised of two or more superstructures where each superstructure is comprised of two or more substructures. For example, the second text string is comprised of two sentences where each sentence is comprised of two phrases. Structural elements of the second text string can be defined using the calculation module 618. Alternatively, structural elements of the first text string can be defined by the user.

At step 708, the demarcations are received. According to an embodiment, the demarcations are received when the demarcation module 621 retrieves demarcations from demarcation data 632.

Alternatively, the demarcations are received when the demarcation module 621 generates the demarcations.

Yet alternatively, the demarcations are received as part of the first or second text string. For example, the first text string is comprised of underlined phrases, where the underlines are the demarcations. Strikethroughs can be used as demarcations such as in "My name is Bob and I live in Boston". These strikethroughs can be positioned behind the substrings and can have a lighter shade than the substrings.

The properties of the received demarcations (e.g., type, width, height, proportions, color, shade, gradient, etc.) can be based on user preference. Alternatively, the properties of the received demarcations can be based on formatting requirements.

At step 710, the translated pairs and the demarcations are rendered using the renderer 624.

According to an embodiment, each of the first and second substrings are placed to form translated pairs, where each of the translated pairs include one of the second substrings placed next to its corresponding first substring. It should be appreciated that the received first and second substrings can inherently possess the necessary properties (e.g. font, size, position) to form translated pairs when rendered according to their inherent properties.

According to an embodiment, each of the demarcations is placed proximate to one or more translated pairs. It should be appreciated that the received demarcations can inherently possess the necessary properties (e.g., shape, size, position) to define the substructures and/or superstructures of the first text string when placed proximate to the translated pairs.

The received demarcations can inherently possess the necessary properties to define the substructures and/or superstructures of the first text string when the translated pairs and the demarcations are rendered. If the received demarcations do not inherently possess these properties, one or more properties of the received first substrings, the received second substrings, and/or the received demarcations can be adjusted such that the received demarcations define the substructures and/or superstructures of the first text string when the translated pairs and the demarcations are rendered. For example, the received demarcations are all rectangular enclosing structures, where each rectangular closing structure is placed around one of the substructures of the first text string. The received demarcations do not define the superstructures of the first text string when the translated pairs and the demarcations are rendered. To address this issue, the widths of the rectangular enclosing structures are adjusted such that a spacing in between the rectangular enclosing structures defines the superstructures of the first text string.

According to an embodiment, when the substructures of the first text string are not defined by the demarcations, the substructures of the first text string are defined by a first-substring spacing scheme, a second-substring spacing scheme, a translated pair spacing scheme, ordinary punctuation, or any other method of defining substructures. When the superstructures of the first text string are not defined by the demarcations, the superstructures of the first text string are defined by a first substring spacing scheme, a second substring spacing scheme, a translated pair spacing scheme, ordinary punctuation, or any other method of defining superstructures. Alternatively, the substructures and superstructures of the first text string are both defined by the demarcations.

According to an embodiment, at least one demarcation is partially or entirely in between the left and right edges of its nearest translated pair. Alternatively, at least half of the demarcations are partially or entirely in between the left and right edges of their respective nearest translated pairs. Yet alternatively, most of the demarcations are partially or entirely in between the left and right edges of their respective nearest translated pairs. Yet alternatively, each of the demarcations is partially or entirely in between the left and right edges of its respective nearest translated pair. If a given demarcation is equidistant, or approximately equidistant, to two translated pairs (e.g., centered in between two adjacent translated pairs), either of the two translated pairs may be considered its nearest translated pair. If a given demarcation overlaps the airspace of two or more translated pairs, any of those two or more translated pairs may be considered its nearest translated pair.

According to an embodiment, at least one demarcation is entirely above the topmost point of a lower substring in its nearest translated pair and horizontally overlaps at least two consecutive characters of the lower substring in its nearest translated pair. Alternatively, at least half of the demarcations are entirely above the topmost point of a lower substring in their respective nearest translated pairs and horizontally overlap at least two consecutive characters of the lower substring in their respective nearest translated pairs. Yet alternatively, most of the demarcations are entirely above the topmost point of a lower substring in their respective nearest translated pairs and horizontally overlaps at least two consecutive characters of the lower substring in their respective nearest translated pairs. Yet alternatively, each of the demarcations is entirely above the topmost point of a lower substring in its respective nearest translated pair and horizontally overlaps at least two consecutive characters of the lower substring in its respective nearest translated pair. It should be appreciated that in some embodiments, a demarcation must horizontally overlap at least one, two, three, four, five, six, seven, or eight or more consecutive characters in a lower substring of its nearest translated pair.

According to an embodiment, at least one demarcation is entirely below the bottommost point of an upper substring in its nearest translated pair and horizontally overlaps at least two consecutive characters of the upper substring in its nearest translated pair. Alternatively, at least half of the demarcations are entirely below the bottommost point of an upper substring in their respective nearest translated pairs and horizontally overlap at least two consecutive characters of the upper substring in their respective nearest translated pairs. Yet alternatively, most of the demarcations are entirely below the bottommost point of an upper substring in their respective nearest translated pairs and horizontally overlaps at least two consecutive characters of the upper substring in their respective nearest translated pairs. Yet alternatively, each of the demarcations is entirely below the bottommost point of an upper substring in its respective nearest translated pair and horizontally overlaps at least two consecutive characters of the upper substring in its respective nearest translated pair. It should be appreciated that in some embodiments, a demarcation must horizontally overlap at least one, two, three, four, five, six, seven, or eight or more consecutive characters in an upper substring of its nearest translated pair.

It should be appreciated that any claim limitation requiring "at least one of A and B" should be interpreted to mean that satisfaction of any one of the listed elements—A or B—is sufficient. Such limitations do not require that all two elements be met, nor that more than one be present. Rather, the presence of any single one of the listed alternatives fulfills the requirement of the limitation.

It should be appreciated that any claim limitation requiring "at least one of A, B, and C" should be interpreted to mean that satisfaction of any one of the listed elements—A, B, or C—is sufficient. Such limitations do not require that all three elements be met, nor that more than one be present. Rather, the presence of any single one of the listed alternatives fulfills the requirement of the limitation. For example, claim limitation reciting that "the plurality of translated pairs and the plurality of demarcations are rendered such that at least one of the plurality of demarcations is at least one of . . . " does not require that one or more demarcations satisfy all three of the subsequently recited positional conditions. Rather, in accordance with various embodiments, it is sufficient that one or more demarcations satisfy any one of the following conditions: (i) the demarcation is partially or entirely between the left and right edges of its nearest translated pair; (ii) the demarcation is entirely above a topmost point of a lower substring in its nearest translated pair and horizontally overlaps at least two consecutive characters of the lower substring; or (iii) the demarcation is entirely below a bottommost point of an upper substring in its nearest translated pair and horizontally overlaps at least two consecutive characters of the upper substring.

According to an embodiment, the received demarcations define the substructures of the first text string and the superstructures of the second text string when the translated pairs and the demarcations are rendered. Alternatively, the received demarcations define the substructures of the second text string and the superstructures of the first text string when the translated pairs and the demarcations are rendered.

According to an embodiment, the substructures of the first text string and the superstructures of the second text string are defined when the translated pairs and the demarcations are rendered. Alternatively, the substructures of the second text string and the superstructures of the first text string are defined when the translated pairs and the demarcations are rendered.

Preferably, all of the translated pairs and the demarcations are rendered together at the same time or approximately the same time. Alternatively, a first portion of the translated pairs and demarcations are rendered at a first time (e.g., the translated pairs and demarcations associated with a first superstructure are rendered at a first time) and a second portion of the translated pairs and demarcations are rendered at a second time (e.g., the translated pairs and demarcations associated with a second superstructure are rendered at a second time after the first time). It should be appreciated that the translated pairs and demarcations can be rendered as needed. Rendering the translated pairs and demarcations as needed offers several practical advantages. It improves efficiency by processing and displaying only the necessary data at any given time, reducing the overall computational load. This approach also enables faster initial rendering, as the system does not need to wait for all elements to be rendered before displaying content. Additionally, it minimizes memory usage by avoiding the simultaneous rendering of all translated pairs and demarcations. From a user perspective, rendering content progressively enhances responsiveness and interactivity, especially in applications involving complex or layered structures. Finally, this method supports better scalability, allowing the system to handle increasing volumes of data more effectively over time.

At step 712, the rendered translated pairs and demarcations are displayed on an electronic display. Preferably, all of the rendered translated pairs and the demarcations are displayed together at the same time. Alternatively, a first portion of the rendered translated pairs and demarcations are displayed at a first time (e.g., the rendered translated pairs and demarcations associated with a first superstructure are displayed at a first time) and a second portion of the rendered translated pairs and demarcations are rendered at a second time (e.g., the rendered translated pairs and demarcations associated with a second superstructure are displayed at a second time after the first time). It should be appreciated that the rendered translated pairs and demarcations can be displayed as needed. For example, if an electronic display can only display one superstructure at a time, then only the rendered translated pairs and demarcations associated with a first superstructure are displayed on the electronic display. When the user indicates that they want to see the second superstructure (e.g., by scrolling down or tapping the screen of a smartphone), the rendered translated pairs and demarcations associated with the first superstructure are removed and the rendered translated pairs and demarcations associated with the second superstructure are displayed on the electronic display.

FIGS. 8A-8F show the method of FIG. 7, according to an embodiment.

FIG. 8A shows step 702 in which a container is defined. Here, the container 803 (outlined with a dashed line) is a portion of the electronic display 805.

FIG. 8B shows step 704 in which the first text string is received. Here, the first text string of "Para qué alinear traducciones con texto? Para facilitar la comparación entre los dos." is received from first text string data 628. The first text string has phrases (substructures) of "¿Para qué alinear," "traducciones con texto?" "Para facilitar," "la comparación," and "entre los dos," and sentences (superstructures) of "¿Para qué alinear traducciones con texto?" and "Para facilitar la comparación entre los dos."

FIG. 8C shows step 706 in which the second text string is received. Here, the second text string of "Why align translations with text? To facilitate comparison between the two." is received from second text string data 628. The second text string has phrases (substructures) of "Why align," "translations with text?" "To facilitate," "comparison," and "between the two," and sentences (superstructures) of "Why align translations with text?" and "To facilitate comparison between the two."

FIG. 8D shows step 708 in which the demarcations are received. Here, the demarcations are hollow rectangles received from demarcation data 362.

FIG. 8E shows step 710 in which the translated pairs and the demarcations are rendered. Here, each translated pair includes one of the second substrings centered above its corresponding first substring. The translated pairs are demarcated by the demarcations such that the substructures and superstructures of the first text string are defined by the demarcations. Specifically, the phrases (substructures) of the first text string are defined by the demarcations via a demarcation placed around each phrase. The edges of each demarcation form one or more vertical lines in between each phrase, where the vertical lines indicate the start of a new phrase. The sentences (superstructures) are defined by the demarcations via a demarcation spacing scheme. The spacing 'a' in between adjacent demarcations associated with adjacent translated pairs belonging to different sentences is greater than the spacing 'b' in between adjacent demarcations associated with adjacent translated pairs belonging to the same sentence, where the increased spacing indicates the start of a new sentence.

FIG. 8F shows step 712 in which the rendered translated pairs and demarcations are displayed on an electronic display.

Figure 9A:
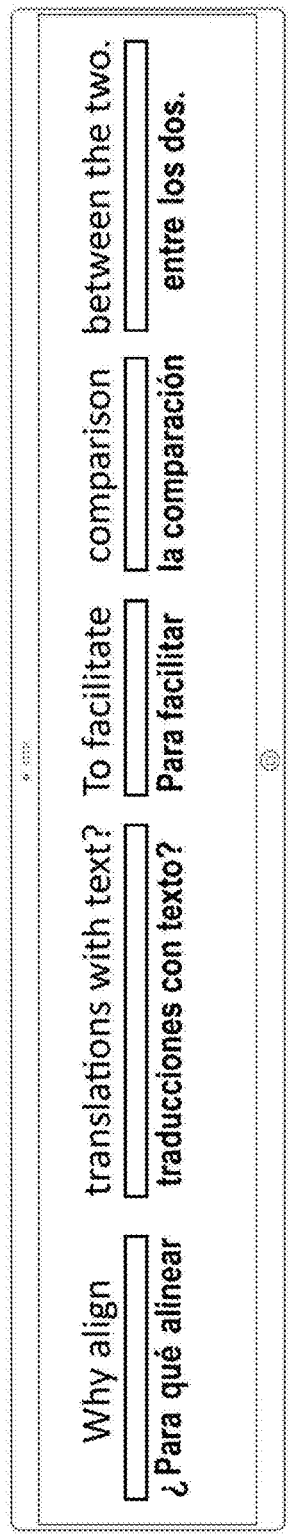
FIGS. 9A-9P show translated pairs displayed on an electronic display, according to various embodiments.

FIG. 9A shows translated pairs displayed on an electronic display, according to an embodiment. Here, each translated pair includes one of the English second substrings centered above its corresponding Spanish first substring. The translated pairs are demarcated by the demarcations such that the substructures of the first text string are defined by the demarcations and the superstructures of the first text string are defined by ordinary punctuation. Specifically, the phrases (substructures) of the first text string are defined by the demarcations via a demarcation placed above one or more first substrings belonging to the same phrase. The width of each demarcation visually indicates the extent of each phrase with a new demarcation marking the start of a new phrase. The sentences (superstructures) are defined by the question marks and periods of the first text string. The appearance of question marks and periods indicates the end of a sentence and the start of a new sentence.

Further, in FIG. 9A, the translated pairs are demarcated by the demarcations such that the substructures of the first text string are defined by the demarcations and the superstructures of the first text string are defined by ordinary capitalization. Specifically, the phrases (substructures) of the first text string are defined by the demarcations via a demarcation placed above one or more first substrings belonging to the same phrase. The width of each demarcation visually indicates the extent of each phrase with a new demarcation marking the start of a new phrase. The sentences (superstructures) are defined by using a capital letter for the first character of each sentence of the first text string. The appearance of a capital letter indicates the start of a new sentence.

Figure 9B:
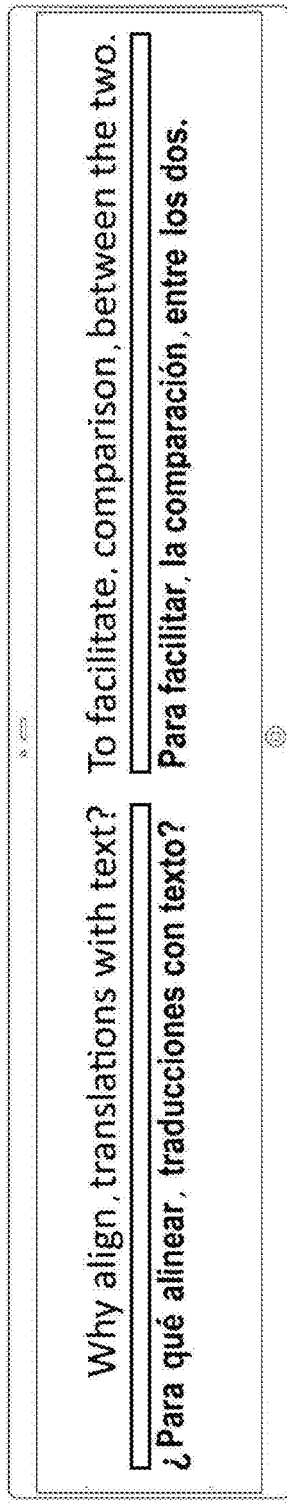

FIG. 9B shows translated pairs displayed on an electronic display, according to another embodiment. Here, each translated pair includes one of the English second substrings placed over its corresponding Spanish first substring. The translated pairs are demarcated by the demarcations such that the substructures of the first text string are defined by ordinary punctuation and the superstructures of the first text string are defined by the demarcations. Specifically, the phrases (substructures) of the first text string are defined by the commas of the first text string. The commas indicate the start of a new phrase. The sentences (superstructures) are defined by the demarcations via a demarcation placed above one or more first substrings belonging to the same sentence. The width of each demarcation visually indicates the extent of each sentence with a new demarcation marking the start of a new phrase.

Figure 9C:
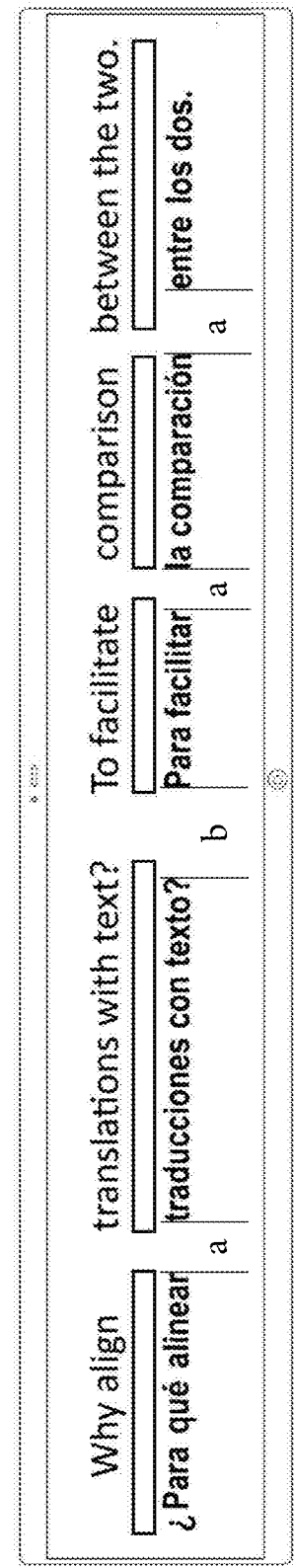

FIG. 9C shows translated pairs displayed on an electronic display, according to another embodiment. Here, each translated pair includes one of the English second substrings centered above its corresponding Spanish first substring. The translated pairs are demarcated by the demarcations such that the substructures of the first text string are defined by the demarcations and the superstructures of the first text string are defined by a first substring spacing scheme. Specifically, the phrases (substructures) of the first text string are defined by the demarcations via a demarcation placed above one or more first substrings belonging to the same phrase. The width of each demarcation visually indicates the extent of each phrase with a new demarcation marking the start of a new phrase. The sentences (superstructures) are defined via a first substring spacing scheme. In the translated pairs, the spacing 'b' in between adjacent first substrings belonging to different sentences is greater than the spacing 'a' in between adjacent first substrings belonging to the same sentence, where the increased spacing indicates the start of a new sentence.

FIG. 9D shows translated pairs displayed on an electronic display, according to another embodiment. Here, each translated pair includes one of the English second substrings placed above its corresponding Spanish first substring. The translated pairs are demarcated by the demarcations such that the substructures of the first text string are defined by a first substring spacing scheme and the superstructures of the first text string are defined by the demarcations. Specifically, the phrases (substructures) are defined via a first substring spacing scheme. In the translated pairs, the spacing 'b' in between adjacent first substrings is greater than the spacing 'a' in between the words within each first substring, where the increased spacing indicates the start of a new phrase. The sentences (superstructures) are defined by the demarcations via a demarcation placed above one or more first substrings belonging to the same sentence. The width of each demarcation visually indicates the extent of each sentence with a new demarcation marking the start of a new sentence.

FIG. 9E shows translated pairs displayed on an electronic display, according to an embodiment. Here, each translated pair includes one of the second substrings placed above its corresponding first substring. The translated pairs are demarcated by the demarcations such that the substructures of the first text string are defined by the demarcations and the superstructures of the first text string are defined by a translated pair placement scheme. Specifically, the phrases (substructures) of the first text string are defined by the demarcations via a demarcation placed above one or more first substrings belonging to the same phrase. The width of each demarcation visually indicates the extent of each phrase with a new demarcation marking the start of a new phrase. The sentences (superstructures) are defined via a translated pair placement scheme. The last translated pair in each sentence is positioned higher than the immediately previous translated pair, where the higher placement of the last translated pair in each sentence indicates the end of that sentence and the start of a new sentence.

FIG. 9F shows translated pairs displayed on an electronic display, according to an embodiment. Here, each translated pair includes one of the second English substrings centered above its corresponding Spanish first substring. The translated pairs are demarcated by the demarcations such that the substructures of the first text string are defined by a translated pair placement scheme and the superstructures of the first text string are defined by the demarcations. Specifically, the phrases (substructures) of the first text string are defined via a translated pair placement scheme. For each translated pair, the first word in the first substring is positioned lower than the next word in that first substring and the first word in the second substring is positioned higher than the next word in that second substring, where the higher and lower placements of the first words indicate the start of a new phrase. The sentences (superstructures) are defined by the demarcations via a demarcation placed above one or more first substrings belonging to the same sentence. The width of each demarcation visually indicates the extent of each sentence with a new demarcation marking the start of a new sentence.

Figure 9H:
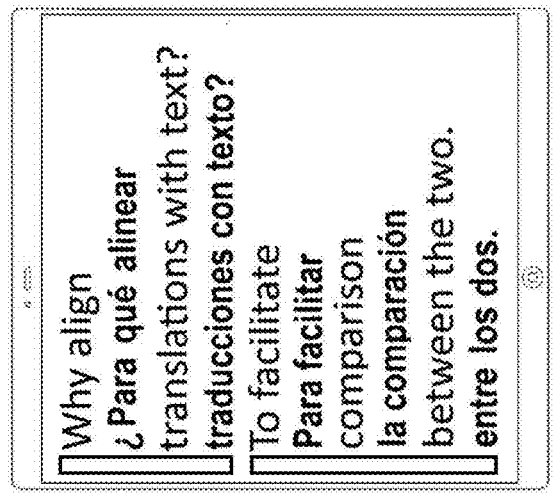
Figure 9G:
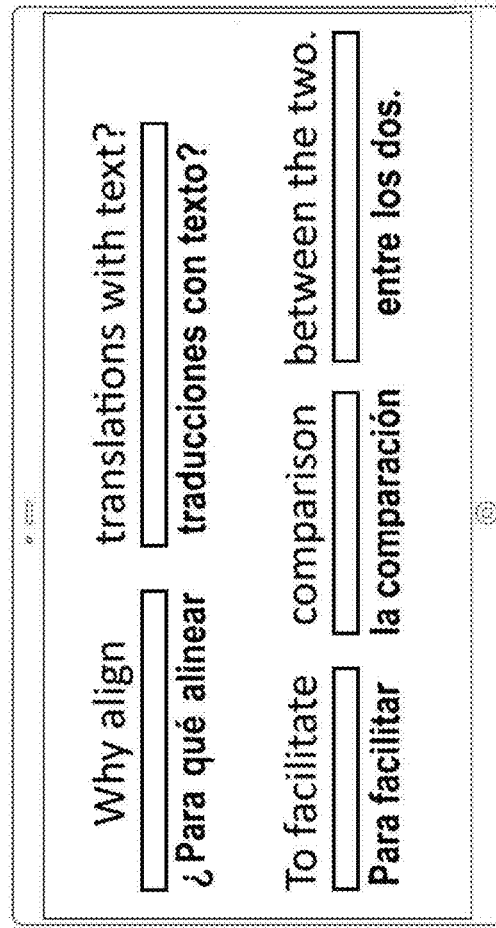

FIG. 9G shows translated pairs displayed on an electronic display, according to another embodiment. Here, each translated pair includes one of the second English substrings centered above its corresponding Spanish first substring. The translated pairs are demarcated by the demarcations such that the substructures of the first text string are defined by the demarcations and the superstructures of the first text string are defined by a superstructure line placement scheme. Specifically, the phrases (substructures) of the first text string are defined by the demarcations via a demarcation placed above one or more first substrings belonging to the same phrase. The width of each demarcation visually indicates the extent of each phrase with a new demarcation marking the start of a new phrase. The sentences (superstructures) are defined via a line placement scheme. In the translated pairs, first substrings belonging to different sentences are placed on different lines (e.g., each line within the container includes only one sentence of the first text string), where the placement of first substrings on a new line indicates the start of a new sentence.

FIG. 9H shows translated pairs displayed on an electronic display, according to another embodiment. Here, each translated pair includes one of the English second substrings placed above its corresponding Spanish first substring. The translated pairs are demarcated by the demarcations such that the substructures of the first text string are defined by a line placement scheme and the superstructures of the first text string are defined by the demarcations. Specifically, the phrases (substructures) are defined via a substructure line placement scheme. In the translated pairs, first substrings belonging to different phrases are placed on different lines (e.g., each line within the container includes only one phrase of the first text string), where the placement of first substrings on a new line indicates the start of a new phrase. The sentences (superstructures) are defined by the demarcations via a demarcation placed above one or more first substrings belonging to the same sentence. The width of each demarcation visually indicates the extent of each sentence with a new demarcation marking the start of a new sentence.

FIG. 9I shows translated pairs displayed on an electronic display, according to another embodiment. Here, each translated pair includes one of the English second substrings centered above its corresponding Spanish first substring. The translated pairs are demarcated by the demarcations such that the substructures and superstructures of the first text string are defined by the demarcations. Specifically, the phrases (substructures) of the first text string are defined by the demarcations via a demarcation (an underline) placed below one or more second substrings belonging to the same phrase. The width of each demarcation visually indicates the extent of each phrase with a new demarcation (a new underline) marking the start of a new phrase. It should be appreciated that the demarcations (the underlines) are received as part of the second text string. The sentences (superstructures) of the first text string are defined by the demarcations via a demarcation (an underline) placed below one or more first substrings belonging to the same sentence. The width of each demarcation visually indicates the extent of each sentence with a new demarcation (a new underline) marking the start of a new sentence. It should be appreciated that the demarcations (the underlines) are received as part of the first text string.

FIG. 9J shows translated pairs displayed on an electronic display, according to another embodiment. Here, each translated pair includes one of the English second substrings centered above its corresponding Spanish first substring. The translated pairs are demarcated by the demarcations such that the substructures and superstructures of the first text string are defined by the demarcations. Specifically, the phrases (substructures) of the first text string are defined by the demarcations via a demarcation (a smile emoji) placed in between adjacent first substrings belonging to different phrases (substructures). Demarcations (the smile emojis) do not have to be placed in between adjacent first substrings belonging to different sentences (superstructures). The appearance of each demarcation visually indicates the start of a new phrase. It should be appreciated that the demarcations (the smile emojis) are received as part of the first text string. The sentences (superstructures) of the first text string are defined by the demarcations via a demarcation (a laugh emoji) placed in between adjacent first substrings belonging to different sentences (superstructures). The appearance of each demarcation visually indicates the start of a new sentence. It should be appreciated that the demarcations (the laugh emojis) are received as part of the first text string.

FIG. 9K shows translated pairs displayed on an electronic display, according to another embodiment. Here, each translated pair includes one of the English second substrings centered above its corresponding Spanish first substring. The translated pairs are demarcated by the demarcations such that the substructures and superstructures of the first text string are defined by the demarcations. Specifically, the phrases (substructures) of the first text string are defined by the demarcations via demarcations (tildes) placed in between adjacent first substrings belonging to different phrases (substructures). Demarcations (the tildes) do not have to be placed in between adjacent first substrings belonging to different sentences (superstructures). The appearance of the demarcations visually indicates the start of a new phrase. It should be appreciated that the demarcations (the tildes) are received as part of the first text string. The sentences (superstructures) of the first text string are defined by the demarcations via demarcations (three exclamation marks) placed in between adjacent first substrings belonging to different sentences (superstructures). The appearance of the demarcations visually indicates the start of a new sentence. It should be appreciated that the demarcations (the explanation points) are received as part of the first text string.

Figures 9L, 9M, 9N:
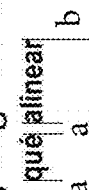

FIG. 9L shows translated pairs displayed on an electronic display, according to another embodiment. Here, each translated pair includes one of the English second substrings centered above its corresponding Spanish first substring. The translated pairs are demarcated by the demarcations such that the substructures and superstructures of the first text string are defined by the demarcations. Specifically, the phrases (substructures) of the first text string are defined by the demarcations via the use of grey shaded letters for the last letter of each phrase. Demarcations (the grey shaded letters) do not have to be used for the last letter of each sentence. The appearance of such demarcations visually indicates the end of a phrase and the start of a new phrase. It should be appreciated that the demarcations (the grey shaded letters) are received as part of the first text string. The sentences (superstructures) of the first text string are defined by the demarcations via the use of hollowed-out letters for the last letter of each sentence. The appearance of such demarcations visually indicates the end of a sentence and the start of a new sentence. It should be appreciated that the demarcations (the hollowed-out letters) are received as part of the first text string.

FIG. 9M shows translated pairs displayed on an electronic display, according to another embodiment. Here, each translated pair includes one of the English second substrings centered above its corresponding Spanish first substring. The translated pairs are demarcated by the demarcations such that the substructures of the first text string are defined by a first substring spacing scheme and the superstructures of the first text string are defined by the demarcations. Specifically, the phrases (substructures) are defined via a first substring spacing scheme. In the translated pairs, the spacing 'b' in between adjacent first substrings is greater than the spacing 'a' in between the words within each first substring, where the increased spacing indicates the start of a new phrase. The sentences (superstructures) of the first text string are defined by the demarcations via the use of modified questions marks and periods (e.g., the question marks and periods are large and gray). The appearance of such demarcations visually indicates the end of a sentence and the start of a new sentence. It should be appreciated that such demarcations can be received as part of the first or second text string. It should be appreciated that demarcations include punctuation marks that have a different style than the style of the words in first text string. For example, if the words in the first text string are written in 12-point Times New Roman, a question mark written in 20-point Times New Roman is considered a demarcation.

FIG. 9N shows translated pairs displayed on an electronic display, according to another embodiment. Here, each translated pair includes one of the English second substrings centered above its corresponding Spanish first substring. The translated pairs are demarcated by the demarcations such that the substructures and superstructures of the first text string are defined by the demarcations.

FIG. 9O shows translated pairs displayed on an electronic display, according to an embodiment. Here, each translated pair includes one of the English second substrings centered above its corresponding Spanish first substring. The translated pairs are demarcated by the demarcations such that the substructures of the first text string are defined by the demarcations and the superstructures of the first text string are defined by a time-based display scheme. Specifically, the phrases (substructures) of the first text string are defined by the demarcations via a demarcation placed above one or more first substrings belonging to the same phrase. The width of each demarcation visually indicates the extent of each phrase with a new demarcation marking the start of a new phrase. The sentences (superstructures) are defined by displaying only one superstructure at a time. The disappearance of a sentence indicates the end of the sentence and the appearance of a new sentence indicates the start of a new sentence. It should be appreciated that the translated pairs and the demarcations associated with a first sentence (a first superstructure) are rendered at a first time and the translated pairs and the demarcations associated with a second sentence (a second superstructure) are rendered at a second time after the first time. Alternatively, the translated pairs and the demarcations associated with the first sentence (a first superstructure) are rendered at the same time as the translated pairs and the demarcations associated with the second sentence (a second superstructure).

FIG. 9P shows translated pairs displayed on an electronic display, according to an embodiment. Here, each translated pair includes one of the English second substrings above its corresponding Spanish first substring, where each English second substring is horizontally offset to the right of its corresponding Spanish first substring. Grey lines are used to highlight the left edge 902 and right edge 904 of a translated pair ("Why align" and "Para que alinear"). A first demarcation (the black bar 906) is partially in between the left edge 902 and right edge 904 of the nearest translated pair ("Why align" and "Para qué alinear"). A second demarcation (the black bar 908) is not in between the left edge 902 and right edge 904 of the nearest translated pair ("Why align" and "Para qué alinear"). A third demarcation (the black bar 910) is entirely in between the left edge 902 and right edge 904 of the nearest translated pair ("Why align" and "Para qué alinear"). A fourth demarcation (the black bar 912) is entirely below a bottommost point of an upper substring ("translations with text?") in the nearest translated pair ("translations with text?" and "traducciones con texto?") where the demarcation (the black bar 912) horizontally overlaps at least two consecutive characters ("h text") of the upper substring ("translations with text?") in the nearest translated pair ("translations with text?" and "traducciones con texto?"). A fifth demarcation (the black bar 914) is entirely above a topmost point of a lower substring ("la comparicion") in the nearest translated pair ("comparison" and "la comparación") where the demarcation (the black bar 914) horizontally overlaps at least two consecutive characters ("la") of the lower substring ("la comparación") in the nearest translated pair ("comparison" and "la comparación").

According to an embodiment, a portion of the first superstructure is on the same line as a portion of the second superstructure. For example, in FIG. 8F, the phrase "traducciones con texto?" is on the same line as phrase "Para facilitar", where both phrases are parts of different sentences.

According to an embodiment, for at least one demarcation, a portion of each demarcation is below the topmost point of its respective nearest substring pair and above the bottommost point of its respective nearest substring pair. For example, in FIG. 8F, a portion of the third hollow enclosing structure is below the topmost point of "To facilitate" and above the bottommost point of "Para facilitar". Alternatively, for at least half of the demarcations, a portion of each demarcation is below the topmost point of its respective nearest substring pair and above the bottommost point of its respective nearest substring pair. Yet alternatively, for each demarcation, a portion of the demarcation is below the topmost point of its respective nearest substring pair and above the bottommost point of its respective nearest substring pair.

According to an embodiment, for at least one demarcation, each demarcation is entirely below the topmost point of its respective nearest substring pair and entirely above the bottommost point of its nearest respective substring pair. For example, in FIG. 9A, the third hollow bar demarcation is entirely below the topmost point of "To facilitate" and entirely above the bottommost point of "Para facilitar". Alternatively, for at least half of the demarcations, each demarcation is entirely below the topmost point of its respective nearest substring pair and entirely above the bottommost point of its respective nearest substring pair. Yet alternatively, for each demarcation, the demarcation is entirely below the topmost point of its respective nearest substring pair and entirely above the bottommost point of its respective nearest substring pair.

According to an embodiment, each of the demarcations is associated with one of the substructures of the first text string. For example, in FIG. 9A, each of the hollow bar demarcations is associated with the Spanish phrase below it. Alternatively, each of the demarcations is associated with one of the translated pairs.

According to an embodiment, each demarcation is associated with one of the substructures of the first text string where the first set of demarcations is associated with the first superstructure of the first text string and the second set of demarcations is associated with a second superstructure of the first text string. For example, in FIG. 3T, each rectangular enclosing structure is associated with one of the Spanish phrases where the first set of demarcations (the first two rectangular enclosing structures) is associated with the first Spanish sentence and the second set of demarcations (the last three rectangular enclosing structures) is associated with the second Spanish sentence.

According to an embodiment, each of the first set of demarcations are laterally adjoined and each of the second set of demarcations are laterally adjoined. For example, in FIG. 8F, the first two hollow enclosing structures (the first set of demarcations) are laterally adjoined and the last three hollow enclosing structures (the second set of demarcations) are laterally adjoined.

According to an embodiment, for a given line of translated pairs, each demarcation is laterally adjoined. For example, in FIG. 9N, each quadrilateral enclosing structure is laterally adjoined.

According to an embodiment, each of the demarcations is associated with one of the first substrings of the first text string and spaces in between adjacent demarcations associated with adjacent first substrings belonging to different superstructures are greater than spaces in between adjacent demarcations associated with adjacent first substrings belonging to the same superstructure. For example, in FIG. 8F, each hollow enclosing structure is associated with one of the Spanish substrings where the space in between the second and third hollow enclosing structure is greater than the space in between the first and second hollow enclosing structures, the space in between third and fourth hollow enclosing structures, and the space in between the fourth and fifth hollow enclosing structures.

According to an embodiment, at least one of the first substrings is split between two lines or at least one of the second substrings is split between two lines.

According to an embodiment, no demarcation is vertically adjoined to another demarcation. Alternatively, the demarcations that define the substructures and/or superstructures of the first text string are not vertically adjoined to each other.

According to an embodiment, for a given first substring, there is no transliteration, translation, and/or commentary of the given first substring, except for its corresponding second substring, in the container and for a given second substring, there is no transliteration, translation, and/or commentary of the given second substring, except for its corresponding first substring, in the container. Reducing the amount of displayed text reduces visual clutter.

According to an embodiment, each of the demarcations is associated with one of the first substrings of the first text string and each of the demarcations is at least as wide as the narrower substring in its associated substring pair. For example, in FIG. 9G, each of the hollow bar demarcations is at least as wide as the narrower substring in its associated substring pair.

According to an embodiment, each of the demarcations is associated with one of the first substrings of the first text string and each of the demarcations is at least as wide as the narrower substring in its associated substring pair. For example, in FIG. 9G, each of the hollow bar demarcations is at least as wide as the wide substring in its associated substring pair.

According to an embodiment, each of the demarcations is associated with one of the first substrings of the first text string, the leftmost point of each demarcation is at or to the left of the leftmost point of its associated substring pair, the rightmost point of each demarcation is at or to the right of the rightmost point of its associated substring pair.

According to an embodiment, the demarcations include first-type demarcations and second-type demarcations where the substructures of the first text string are defined by first-type demarcations and the superstructures of the first text string are defined by the second-type demarcations. For example, in FIG. 9I, the substructures of the first text string are defined by narrower underlines positioned under each second substring and the superstructures of the first text string are defined by wider underlines positioned under groups of first substrings. The second-type demarcations can be generally wider than the first-type demarcations.

According to an embodiment, for at least one of the demarcations, each demarcation is a lighter shade than the first substring and/or the second substring in its respective nearest translated pair. For example, in FIG. 9M, the modified question mark is a lighter shade than the Spanish phrase "traducciones con texto". Alternatively, for at least half of the demarcations, each demarcation is a lighter shade than the first substring and/or the second substring in the nearest translated pair. Yet alternatively, each demarcation is a lighter shade than the first substring and/or the second substring in its respective nearest translated pair. Yet alternatively, for at least one of the demarcations, each demarcation is a lighter shade than both the first and second text substrings in its respective nearest translated pair. Yet alternatively, for at least half of the demarcations, each demarcation is a lighter shade than both the first and second substrings in its respective nearest translated pair. Yet alternatively, each demarcation is a lighter shade than both the first and second substrings in its respective nearest translated pair.

According to an embodiment, for each demarcation having a horizontal portion (a portion with a width greater than its height), the height (vertical thickness) of the horizontal portion is greater than one-fifth of the shorter of the height of the first substring in its respective nearest translated pair and the height of the second substring in its respective nearest translated pair. For example, in FIG. 9G, the height of the horizontal portion (the entirety) of each rectangular enclosing structure is greater than one-fifth of the height of any substring, so the demarcations meet this limitation. Alternatively, in FIG. 9I, the height of the horizontal portion (the entirety) of each rectangular enclosing structure is less than one-fifth the height of any substring so the demarcations do not meet this limitation. Alternatively, the height of the horizontal portion is greater than one-fourth, one-third, one-half, or two-thirds of the shorter of the height of the first substring in the nearest translated pair and the height of the second substring in the nearest translated pair. Yet alternatively, the height of the horizontal portion is greater than one-fifth, one-fourth, one-third, one-half, or two-thirds of the taller of the height of the first substring in the nearest translated pair and the height of the second substring in the nearest translated pair. In some embodiments, these limitations can apply to at least one of the demarcations having a horizontal portion or at least half of the demarcations having a horizontal portion.

According to an embodiment, the height (vertical thickness) of each demarcation is greater than one-fifth of the shorter of the height of the first substring in its respective nearest translated pair and the height of the second substring in its respective nearest translated pair. For example, in FIG. 9G, the height of each rectangular enclosing structure is greater than one-fifth of the height of any substring, so the demarcations meet this limitation. Alternatively, in FIG. 9I, the height of the horizontal portion (the entirety) of each rectangular enclosing structure is less than one-fifth the height of any substring so the demarcations do not meet this limitation. Alternatively, the height of each demarcation is greater than one-fourth, one-third, one-half, or two-thirds of the shorter of the height of the first substring in the nearest translated pair and the height of the second substring in the nearest translated pair. Yet alternatively, the height of each demarcation is greater than one-fifth, one-fourth, one-third, one-half, or two-thirds of the taller of the height of the first substring in its respective nearest translated pair and the height of the second substring in its respective nearest translated pair. In some embodiments, these limitations can apply to at least one of the demarcations or at least half of the demarcations.

According to an embodiment, the height (vertical thickness) of each demarcation is greater than one-fifth of the height of its respective nearest translated pair. Alternatively, the height of each demarcation is greater than one-fourth, one-third, one-half, or two-thirds of the shorter of the height of its respective nearest translated pair. Yet alternatively, the height of each demarcation is greater than one-fifth, one-fourth, one-third, one-half, or two-thirds of the taller of the height of its respective nearest translated pair. In some embodiments, these limitations can apply to at least one of the demarcations or at least half of the demarcations.

According to an embodiment, the majority of the bottom edge of each demarcation is below the topmost point of its respective nearest substring pair and the majority of the top edge of each demarcation is above the bottommost point of its respective nearest substring pair. Alternatively, for at least half of the demarcations, the bottom edge of each demarcation is below the topmost point of its respective nearest substring pair and the majority of the top edge of each demarcation is above the bottommost point of its respective nearest substring pair. Alternatively, for at least one of the demarcations, the bottom edge of each demarcation is below the topmost point of its respective nearest substring pair and the majority of the top edge of each demarcation is above the bottommost point of its respective nearest substring pair.

According to an embodiment, each demarcation is positioned entirely below the bottommost point of the upper substring in its respective nearest substring pair and entirely above the topmost point of the lower substring in its respective nearest substring pair. Alternatively, for at least half of the demarcations, each demarcation is positioned entirely below the bottommost point of the upper substring in its respective nearest substring pair and entirely above the topmost point of the lower substring in its respective nearest substring pair. Alternatively, for at least one of the demarcations, each demarcation is positioned entirely below the bottommost point of the upper substring in its respective nearest substring pair and entirely above the topmost point of the lower substring in its respective nearest substring pair.

According to an embodiment, each demarcation is entirely above the majority of the letters of the lower substring in its respective nearest substring pair. Alternatively, for at least half of the demarcations, each demarcation is entirely above the majority of the letters of the lower substring in its respective nearest substring pair. Yet alternatively, for at least one of the demarcations, each demarcation is entirely above the majority of the letters of the lower substring in its respective nearest substring pair.

According to an embodiment, each demarcation is at least as wide as three letters of a substring in its respective nearest substring pair. Alternatively, each demarcation is at least as wide as one, two, four, five, or six letters of a substring in its respective nearest substring pair. Yet alternatively, for at least half of the demarcations, each demarcation is at least as wide as one, two, four, five, or six letters of a substring in its respective nearest substring pair. Yet alternatively, for at least one of the demarcations, each demarcation is at least as wide as one, two, four, five, or six letters of a substring in its respective nearest substring pair.

According to an embodiment, the demarcations that define the superstructures of the first text string are at least 10% wider than the demarcations that define the substructures of the first text string. Alternatively, the demarcations that define the superstructures of the first text string are at least 25%, 50%, 75%, 100%, and 150% wider than the demarcations that define the substructures of the first text string.

According to an embodiment, for a line of translated pairs, the sum of the widths of the demarcations positioned along the line is at least ⅓ of the horizontal distance between the leftmost point of the leftmost translated pair positioned along the line and the rightmost point of the rightmost translated pair on positioned along the line. Alternatively, the sum of the widths of the demarcations positioned along the line is at least ½, ⅔, or ¾ of the horizontal distance between the leftmost point of the leftmost translated pair positioned along the line and the rightmost point of the rightmost translated pair on positioned along the line.

According to an embodiment, a portion of each demarcation is above the ascender line of the lower substring in its respective nearest substring pair or below the descender line of the lower substring in its respective nearest substring pair. Alternatively, for at least half of the demarcations, a portion of each demarcation is above the ascender line of the lower substring in its respective nearest substring pair or below the descender line of the lower substring in its respective nearest substring pair. Yet alternatively, for at least one of the demarcations, a portion of each demarcation is above the ascender line of the lower substring in its respective nearest substring pair or below the descender line of the lower substring in its respective nearest substring pair.

According to an embodiment, each demarcation is positioned in between the edges of adjacent substring pairs and does not horizontally overlap any substring pairs on the same line as the demarcation. Alternatively, for at least half of the demarcations, each demarcation is positioned in between the edges of adjacent substring pairs and does not horizontally overlap any substring pairs on the same line as the demarcation. Yet alternatively, for at least one of the demarcations, each demarcation is positioned in between the edges of adjacent substring pairs and does not horizontally overlap any substring pairs on the same line as the demarcation.

According to an embodiment, each demarcation is positioned equidistant in between the edges of adjacent substring pairs. Alternatively, for at least half of the demarcations, each demarcation is positioned equidistant in between the edges of adjacent substring pairs. Yet alternatively, for at least one of the demarcations, each demarcation is positioned equidistant in between the edges of adjacent substring pairs.

According to an embodiment, each demarcation is positioned equidistant in between the first substrings of adjacent substring pairs. Alternatively, for at least half of the demarcations, each demarcation is positioned equidistant in between the first substrings of adjacent substring pairs. Yet alternatively, for at least one of the demarcations, each demarcation is positioned equidistant in between the first substrings of adjacent substring pairs.

According to an embodiment, each demarcation is positioned equidistant in between the second substrings of adjacent substring pairs. Alternatively, for at least half of the demarcations, each demarcation is positioned equidistant in between the second substrings of adjacent substring pairs. Yet alternatively, for at least one of the demarcations, each demarcation is positioned equidistant in between the second substrings of adjacent substring pairs.

According to an embodiment, in the first substring pair of a sentence, the second substring is horizontally offset to the left of its corresponding first substring, in a middle substring pair of the sentence, the second substring is not horizontally offset from its corresponding first substring, and in the last substring pair of the sentence, the second substring is horizontally offset to the right of its corresponding first substring.

According to an embodiment, articles or other common words in the second text string are deemphasized relative to the remainder of words in the second text string. This allows the uncommon words to be more visible, improving readability. For example, common words such as "was, is, he, what, I, the, and, then, etc" are deemphasized.

According to an embodiment, uncommon words or verbs in the second text string are emphasized relative to the remainder of words in the second text string (e.g., articles or other common words). This allows the uncommon words or verbs to be more visible, improving readability.

Figure 10C:
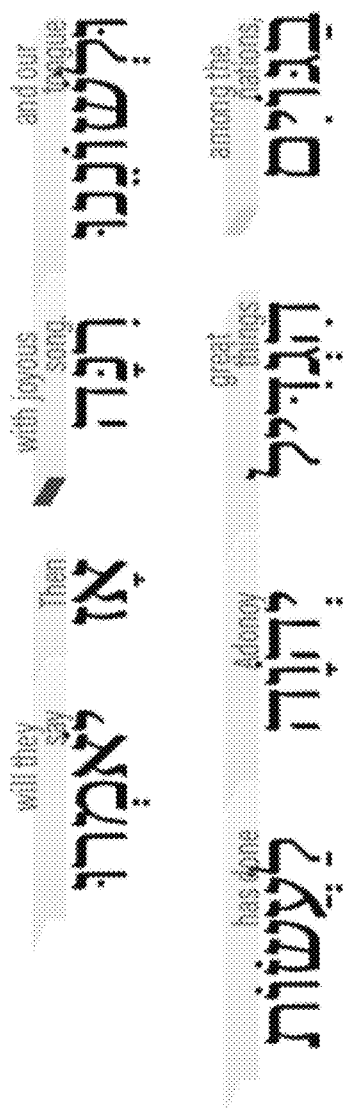
Figure 10D:
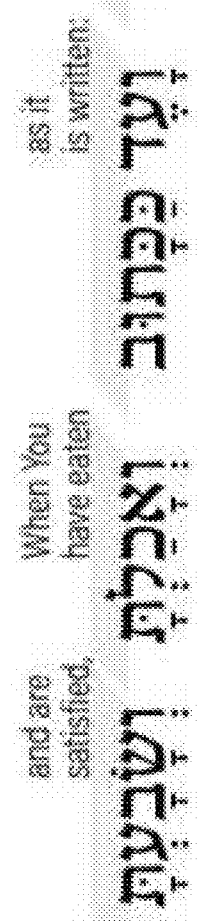

FIGS. 10A-10E show translated pairs, according to various embodiments. Here, each demarcation (grey parallelogram) associated with the last translated pair in each superstructure (sentence) has a different appearance. Namely, in FIGS. 10A-10C, their left edges are darkened such that the appearance of a darkened left edge indicates that the next translated pair belongs to a new superstructure (sentence). In FIG. 10D, the Hebrew first substrings are right-aligned with the bottom right corner of the demarcations (grey parallelograms), the English lower second sub-substrings are right-aligned with the top right corner of the demarcations (grey parallelograms), and the English upper second sub-substrings are left-aligned with the English lower second sub-substrings.

Figure 10E:
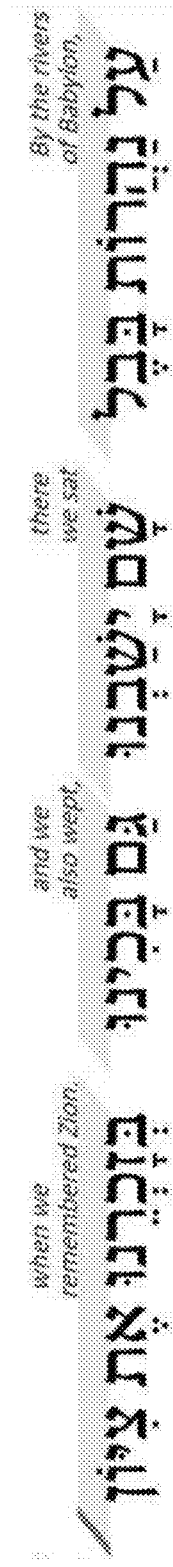

In FIG. 10E, the top of each demarcation is approximately flush with the baseline of the upper substring of its associated translated pair and the bottom of each demarcation is approximately flush with the x-height line of the lower substring of its associated translated pair. Alternatively, the top of each demarcation is flush with the x-height line of the upper substring of its associated translated pair, in between the x-height line and base line of the upper substring of its associated translated pair, in between the base line and descender line of the upper substring of its associated translated pair, flush with the descender line of the upper substring of its associated translated pair, or below the descender line of the upper substring of its associated translated pair. Alternatively, the bottom of each demarcation is flush with the base line of the lower substring of its associated translated pair, in between the base line and x-height line of the lower substring of its associated translated pair, in between the x-height line and ascender line of the lower substring of its associated translated pair, flush with the ascender line of the upper substring of its associated translated pair, or above the ascender line of the upper substring of its associated translated pair.

According to an embodiment, second substrings are positioned below their corresponding first substrings. When a width of a second substring exceeds a predetermined width, the second substring can be split into two or more second sub-substrings, where each of the second sub-substrings is positioned on a different line. Each of the second sub-substrings can be positioned such that the majority of the width of each second sub-substring horizontally overlaps a left half or right half of its corresponding first substring. Alternatively, at least ⅔, ¾, or ⅘ of the width of each second sub-substring horizontally overlaps a left half or right half of its corresponding first substring. Yet alternatively, each second sub-substring is horizontally offset from its corresponding first substring.

Figure 11A:
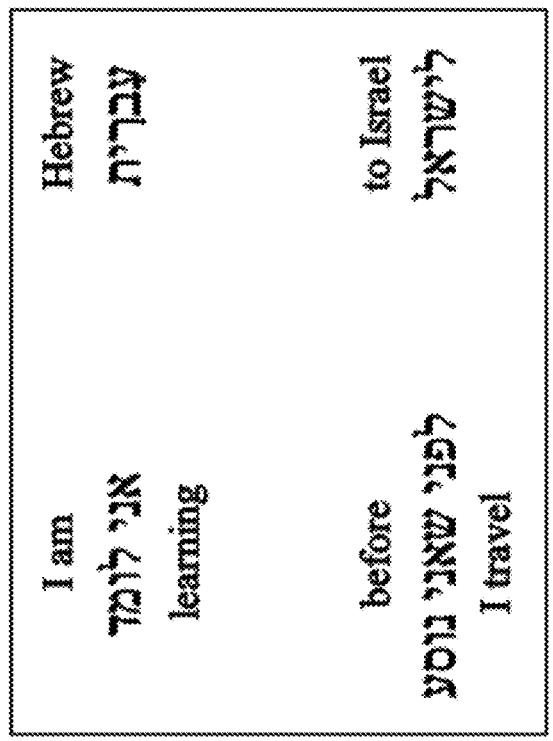
FIGS. 11A-11B show translated pairs, according to various embodiments.

According to an embodiment, a first second sub-substring is positioned above its corresponding first substring and a second sub-substring is positioned below its corresponding first substring (e.g., FIG. 11A shows English substrings positioned above and below their corresponding Hebrew substrings).

Figure 11B:
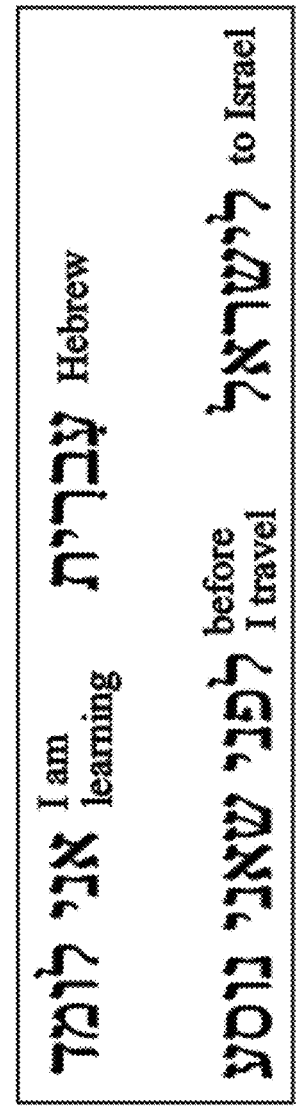

According to an embodiment, the second sub-substrings are positioned to the right of their corresponding first substring or to the left of their corresponding first substring (e.g., FIG. 11B shows English substrings positioned to the right of their corresponding Hebrew substrings).

According to an embodiment, three types of structures are defined for a first text string. For example, substructures, superstructures, and super-superstructures (e.g., the super-superstructures comprising two or more superstructures) are defined for the first text string by any combination of demarcations, ordinary punctuation, capitalization, spacing schemes, placement schemes, etc.

According to an embodiment, a method of rendering translated pairs and demarcations includes steps of: defining a container; receiving a first text string comprised of a plurality of first substrings; appending the first substrings to the container where the first substrings are placed along one or more lines; receiving a second text string comprised of a plurality of second substrings, where each second substring is a translation of one of the first text substrings; appending the second substrings to the container, where each of the second substrings is placed next to its corresponding first substring to create translated pairs; receiving a plurality of demarcations; appending the demarcations to the container, where each demarcation is placed proximate to one or more of the translated pairs; determining if the substructures and/or the superstructures of the first text string are defined by the demarcations; if the that the substructures and/or the superstructures of the first text string are not defined by the demarcations: adjusting properties of the first substrings, the second substrings, and/or the demarcations such that the substructures and/or the superstructures of the first text string are defined by the demarcations.

Adjusting properties of the first substrings, the second substrings, and/or the demarcations such that the substructures and/or the superstructures of the first text string are defined by the demarcations includes steps of: identifying a structure (e.g., superstructures and substructures) of the first text string; and adjusting an appearance of one or more demarcations such that adjacent translated pairs belonging to the same superstructure are visually linked and adjacent translated pairs belonging to different superstructures are not visually linked.

Alternatively, adjusting properties of the first substrings, the second substrings, and/or the demarcations such that the substructures and/or the superstructures of the first text string are defined by the demarcations includes steps of: identifying a structure (e.g., superstructures and substructures) of the first text string; identifying which demarcation is associated with which translated pair; and adjusting the position and/or width of one or more of the demarcations such that the substructures and/or superstructures are defined by a demarcation spacing scheme.

Alternatively, adjusting properties of the first substrings, the second substrings, and/or the demarcations such that the substructures and/or the superstructures of the first text string are defined by the demarcations includes steps of: identifying a structure (e.g., superstructures and substructures) of the first text string; if the superstructures of the first text string are defined by the demarcations: adjusting the position and/or width of one or more first substrings such that substructures of the first text string are identified by a first substring spacing scheme; if the substructures of the first text string are defined by the demarcations: adjusting the position and/or width of one or more first substrings such that superstructures of the first text string are identified by a first substring spacing scheme.

Figure 12A:

In FIG. 12A, a sample text document is shown, with comments from various editors. The comments are displayed in smaller text, perhaps in a different color, with the editor's initials in a circle. The comments alternate above and below the primary text string of the original document. In some embodiments, the primary text upon which the comment relates is highlighted. In other embodiments, the primary text related to the comment could be in a different color, underlined, bolded, set in italics, or formatted differently to indicate that the text relates to the comment. In some embodiments, a comment may run from above the primary text and continue below the primary text.

In some situations, the comments may exceed the space above or below the primary text available to display the entire comment. In some embodiments, only the first few words of the comment are displayed, with a symbolic indication that there is more to the comment. The user may click on the comment to expand the comment to see the additional text. When the user expands an alternating note, the software determines which side of the page to place the note and the note expands in the margin on that side of the page. In some embodiments, this determination is made be determining which margin is proximate to the partial comment. In other embodiments, one margin or the other is chosen for all expanded comments. In still another embodiment, the space in the margins is managed by an algorithm that evaluates other comments in each of the margin and places the expanded comment in a location closest to the partial comment. This situation occurs when one comment is extensive and consumes much space in one of the margins.

In some embodiments, the software constantly decides (as comments are added, subtracted, etc.) which comment should be above and which should be below depending on whether the comment interferes with comments from the text above and/or below (and even the comments on the same row).

Color can also be used in some embodiments to coordinate the comments and avoid interference or clutter with other comments. In some embodiments, the primary text related to the comment is highlighted in the same color as the comment in order to allow the user to easily match the comment with the primary text.

FIG. 12B shows a primary document with edits and markups. The first line of markups in this document is shown below the primary text, and the second line is shown above the next line of primary text, with the markup text alternating above and below the primary text lines.

In one embodiment, when the final drafts of a document are assembled, instead of having two separate documents to view on a screen, one clean copy and one marked up, both the clean copy and the markup copy may be displayed on a single screen (or window) with one line having the strikethroughs and the line below it having the clean copy. For the next line of strikethroughs, the clean copy may be above the clean copy. The screen will contain two lines of clean copy, one above the other which is much easier to read, followed by two lines of markup. Translations can be displayed in a similar fashion, as seen in FIG. 12C. This technique could also be used for grammar correction.

According to an embodiment, the rendering engine 600 is configured to process a text string and modify the visual presentation of punctuation marks to increase their prominence relative to the surrounding textual content. The rendering engine 600 can parse the text string to identify punctuation characters (e.g., periods, commas, semicolons, colons, exclamation points, question marks, quotation marks, parentheses, etc.) and applies one or more visual modifications to these characters to distinguish them from the non-punctuation characters.

Distinguishing the punctuation characters can involve increasing the font size of the punctuation characters relative to the surrounding text. In other embodiments, the rendering engine 600 may also or alternatively apply other forms of emphasis, such as bolding, color changes, outline effects, or spacing adjustments, to draw attention to the punctuation. These modifications can be applied dynamically during rendering, allowing the rendering engine 600 to maintain the original semantic content and character sequence of the text while enhancing the perceptual impact of the punctuation.

The rendering engine 600 may operate in real-time or near real-time, such as in a web browser, mobile app, or text editor. It can be configured to selectively emphasize only certain types of punctuation or to apply different levels or styles of emphasis based on punctuation type, position, or frequency.

I claim:

1. A rendering engine configured to render substring pairs having defined substructures and superstructures, the rendering engine comprising:
    memory storing executable instructions; and
    a processing device executing the executable instructions, wherein the executable instructions, when executed by the processing device, configure the rendering engine to:
        receive a first text string comprised of a plurality of first substrings, wherein
            a structure of the first text string includes a plurality of superstructures;
            each of the plurality of superstructures is a sentence of the first text string;
            at least one of the plurality of superstructures comprises a plurality of substructures;
            each of the plurality of substructures is a word or phrase of the first text string;
        receive a second text string comprised of a plurality of second substrings, wherein
            each of the plurality of second substrings is a translation of one of the plurality of first substrings;
        receive a plurality of demarcations;
        render the plurality of first substrings, the plurality of second substrings, and the plurality of demarcations;
    wherein
        the plurality of first substrings, the plurality of second substrings, and the plurality of demarcations are rendered such that the plurality of first substrings and the plurality of second substrings are arranged into a plurality of substring pairs, wherein each of the substring pairs in the plurality of substring pairs comprises one of the plurality of second substrings placed next to its corresponding first substring;
        the plurality of first substrings, the plurality of second substrings, and the plurality of demarcations are rendered such that each of the plurality of demarcations is placed proximate to one or more substring pairs in the plurality of substring pairs;
        the plurality of first substrings, the plurality of second substrings, and the plurality of demarcations are rendered such that the plurality of substructures and/or the plurality of superstructures of the first text string are defined by the plurality of demarcations;
        the plurality of first substrings, the plurality of second substrings, and the plurality of demarcations are rendered such that the plurality of substructures and the plurality of superstructures of the first text string are defined;
        the plurality of first substrings, the plurality of second substrings, and the plurality of demarcations are rendered such at least one of the plurality of demarcations is at least one of:
            partially or entirely in between left and right edges of a nearest substring pair in the plurality of substring pairs;
            entirely above a topmost point of a lower substring in the nearest substring pair in the plurality of substring pairs and horizontally overlapping at least two consecutive characters of the lower substring in the nearest substring pair in the plurality of substring pairs; and
            entirely below a bottommost point of an upper substring in the nearest substring pair in the plurality of substring pairs and horizontally overlapping at least two consecutive characters of the upper substring in the nearest substring pair in the plurality of substring pairs.

2. The rendering engine of claim 1, wherein
the plurality of first substrings, the plurality of second substrings, and the plurality of demarcations are rendered such that a first portion of a first superstructure in the plurality of superstructures is on a same line as a second portion of a second superstructure in the plurality of superstructures.

3. The rendering engine of claim 1, wherein
the plurality of first substrings, the plurality of second substrings, and the plurality of demarcations are rendered such that the plurality of substructures of the first text string are defined by the plurality of demarcations;
the plurality of first substrings, the plurality of second substrings, and the plurality of demarcations are rendered such that the plurality of superstructures of the first text string are defined by at least one of:
    a first spacing between adjacent first substrings that belong to different superstructures, wherein the first spacing is greater than a second spacing between adjacent first substrings that belong to the same superstructure;
    a third spacing between adjacent second substrings that belong to different superstructures, wherein the third spacing is greater than a fourth spacing between adjacent second substrings that belong to the same superstructure;
    punctuation in between the adjacent first substrings belonging to the different superstructures; and
    punctuation in between the adjacent second substrings belonging to the different superstructures.

4. The rendering engine of claim 1, wherein
the plurality of first substrings, the plurality of second substrings, and the plurality of demarcations are rendered such that the plurality of substructures of the first text string are defined by at least one of:
   a first spacing between adjacent first substrings that belong to a same superstructure, wherein the first spacing is greater than a second spacing between words of each first substring;
   third first spacing between adjacent first substrings that belong to a same superstructure, wherein the third spacing is greater than a fourth spacing between words of each second substring;
   punctuation in between the adjacent first substrings belonging to the same superstructure;
   punctuation in between the adjacent second substrings belonging the same superstructure;
the plurality of first substrings, the plurality of second substrings, and the plurality of demarcations are rendered such that the plurality of superstructures of the first text string are defined by the plurality of demarcations.

5. The rendering engine of claim 1, wherein
the plurality of first substrings, the plurality of second substrings, and the plurality of demarcations are rendered such that the plurality of substructures of the first text string are defined by the plurality of demarcations; and
the plurality of first substrings, the plurality of second substrings, and the plurality of demarcations are rendered such that the plurality of superstructures of the first text string are defined by the plurality of demarcations.

6. The rendering engine of claim 1, wherein
the plurality of first substrings, the plurality of second substrings, and the plurality of demarcations are rendered such that a portion of at least one demarcation in the plurality of demarcations is below a topmost point of a nearest substring pair; and
the plurality of first substrings, the plurality of second substrings, and the plurality of demarcations are rendered such that the portion of the at least one demarcation in the plurality of demarcations is above a bottommost point of the nearest substring pair; and
the plurality of first substrings, the plurality of second substrings, and the plurality of demarcations are rendered such that, for at least one demarcation that defines a superstructure in the plurality of superstructures:
   a topmost point of the at least one demarcation that defines the superstructure in the plurality of superstructures is flush with or below a topmost point of the nearest substring pair; and
   the at least one demarcation that defines the superstructure in the plurality of superstructures is at least one of:
      partially or entirely in between the left and right edges of the nearest substring pair in the plurality of substring pairs;
      entirely above the topmost point of the lower substring in the nearest substring pair in the plurality of substring pairs and horizontally overlapping the at least two consecutive characters of the lower substring in the nearest substring pair in the plurality of substring pairs; and
      entirely below the bottommost point of the upper substring in the nearest substring pair in the plurality of substring pairs and horizontally overlapping the at least two consecutive characters of the upper substring in the nearest substring pair in the plurality of substring pairs.

7. The rendering engine of claim 1, wherein
the plurality of first substrings, the plurality of second substrings, and the plurality of demarcations are rendered such that the plurality of substructures and the plurality of superstructures of the first text string are defined by the plurality of demarcations;
the plurality of demarcations includes at least a first set of demarcations and a second set of demarcations, wherein
   at least one of the first set of demarcations and the second set of demarcations comprises a plurality of demarcations;
wherein
   the plurality of demarcations is rendered such that adjacent demarcations belonging to a same set of demarcations are visually linked such that a reader can discern which adjacent demarcations belong to the same set of demarcations; and
   the plurality of demarcations rendered such that adjacent demarcations belonging to different sets of demarcations are not visually linked such that a reader can discern which adjacent demarcations belong to the different sets of demarcations.

8. The rendering engine of claim 7, wherein
the plurality of first substrings, the plurality of second substrings, and the plurality of demarcations are rendered such that each of the plurality of demarcations is associated with one of the substructures of the first text string;
the plurality of first substrings, the plurality of second substrings, and the plurality of demarcations are rendered such that the first set of demarcations is associated with a first superstructure of the first text string; and
the plurality of first substrings, the plurality of second substrings, and the plurality of demarcations are rendered such that the second set of demarcations is associated with a second superstructure of the first text string.

9. The rendering engine of claim 7, wherein
the plurality of demarcations is rendered such that the adjacent demarcations belonging to the same set of demarcations are visually linked through at least one of:
   positions of top edges of the adjacent demarcations belonging to the same set of demarcations;
   positions of bottom edges of the adjacent demarcations belonging to the same set of demarcations;
   slopes of the top edges of the adjacent demarcations belonging to the same set of demarcations, where at least one of the slopes of the top edges is not horizontal; and
   slopes of the bottom edges of the adjacent demarcations belonging to the same set of demarcations, where at least one of the slopes of the bottom edges is not horizontal.

10. The rendering engine of claim 7, wherein
the plurality of demarcations is rendered such that adjacent demarcations belonging to the same set of demarcations are visually linked through a shading gradient or color gradient.

11. The rendering engine of claim 7, wherein
the plurality of demarcations is rendered such that adjacent demarcations belonging to the same set of demarcations are visually linked through a gradual change in appearance.

12. The rendering engine of claim 7, wherein
the plurality of demarcations is rendered such that each of the first set of demarcations are laterally adjoined; and
the plurality of demarcations is rendered such that each of the second set of demarcations are laterally adjoined.

13. The rendering engine of claim 7, wherein
the plurality of first substrings, the plurality of second substrings, and the plurality of demarcations are rendered such that, for a given line of the plurality of substring pairs, each demarcation is laterally adjoined.

14. The rendering engine of claim 1, wherein
the plurality of first substrings, the plurality of second substrings, and the plurality of demarcations are rendered such that each of the plurality of demarcations is associated with one of the first substrings of the first text string; and
the plurality of first substrings, the plurality of second substrings, and the plurality of demarcations are rendered such that spaces in between adjacent demarcations associated with adjacent first substrings belonging to different superstructures are greater than spaces in between adjacent demarcations associated with adjacent first substrings belonging to a same superstructure.

15. The rendering engine of claim 1, wherein
the plurality of first substrings, the plurality of second substrings, and the plurality of demarcations are rendered such that at least one of the second substrings is split into two or more second sub-substrings;
the plurality of first substrings, the plurality of second substrings, and the plurality of demarcations are rendered such that second sub-substrings belonging to the same second string are positioned on different lines;
the plurality of first substrings, the plurality of second substrings, and the plurality of demarcations are rendered such that, for a given second sub-substring:
  at least two-thirds of a width of the given second sub-substring horizontally overlaps a left half or right half of its corresponding first substring; or
  the given second sub-substring is horizontally offset from its corresponding first substring;
the plurality of first substrings, the plurality of second substrings, and the plurality of demarcations are rendered such that each of the second sub-substrings horizontally overlaps its corresponding first substring.

16. The rendering engine of claim 1, wherein
the plurality of first substrings, the plurality of second substrings, and the plurality of demarcations are rendered such that the plurality of superstructures of the first text string are defined by demarcations in the plurality of demarcations; and
the demarcations that define the plurality of superstructures of the first text string are not vertically adjoined to each other.

17. The rendering engine of claim 1, wherein
the plurality of first substrings, the plurality of second substrings, and the plurality of demarcations are rendered such that, for a given first substring, there is no transliteration, translation, and/or commentary of the given first substring, except for its corresponding second substring, in a same container as the plurality of substring pairs; and
the plurality of first substrings, the plurality of second substrings, and the plurality of demarcations are rendered such that, for a given second substring, there is no transliteration, translation, and/or commentary of the given second substring, except for its corresponding first substring, in the same container as the plurality of substring pairs.

18. The rendering engine of claim 1, wherein
the plurality of first substrings, the plurality of second substrings, and the plurality of demarcations are rendered such that each of the plurality of demarcations is associated with one of the first substrings of the first text string; and
the plurality of first substrings, the plurality of second substrings, and the plurality of demarcations are rendered such that each of the plurality of demarcations is at least as wide as a narrower substring in the nearest substring pair.

19. The rendering engine of claim 1, wherein
the first substrings, second substrings, and demarcations associated with a first superstructure in the plurality of superstructures are rendered at a first time and the first substrings, second substrings, and demarcations associated with a second superstructure in the plurality of superstructures are rendered at a second time.

20. The rendering engine of claim 1, wherein
the plurality of demarcations include first-type demarcations and second-type demarcations;
the plurality of first substrings, the plurality of second substrings, and the plurality of demarcations are rendered such that the plurality of substructures of the first text string are defined by first-type demarcations; and
the plurality of first substrings, the plurality of second substrings, and the plurality of demarcations are rendered such that the plurality of superstructures of the first text string are defined by the second-type demarcations.

21. The rendering engine of claim 1, wherein
the plurality of first substrings, the plurality of second substrings, and the plurality of demarcations are rendered such that each of the plurality of demarcations is a lighter shade than at least one of the first and second text strings in the nearest substring pair.

22. The rendering engine of claim 1, wherein
the plurality of first substrings, the plurality of second substrings, and the plurality of demarcations are rendered such that a vertical thickness of at least one horizontal portion of each of the plurality of demarcations is greater than one-fifth of the smaller of a height of the first substring in the nearest substring pair and a height of the second substring in the nearest substring pair.

23. The rendering engine of claim 1, wherein
receiving the plurality of demarcations includes steps of:
  receiving a set of the substructures and/or superstructures of the first text string to be defined by the plurality of demarcations;
  receiving, based on the set of the substructures and/or superstructures of the first text string to be defined by the demarcations, the plurality of demarcations;
rendering the plurality of first substrings, the plurality of second substrings, and the plurality of demarcations includes steps of:
  adjusting one or more properties of at least one of the plurality of demarcations, the first substrings, and the second substrings such that the plurality of demarcations define each of the substructures and/or superstructures in the set of the substructures and/or superstructures.

24. The rendering engine of claim 1, wherein the structure of the first text string is determined by a natural language processing module.

25. The rendering engine of claim 1, wherein receiving the plurality of demarcations includes steps of:
receiving a set of the substructures and/or superstructures of the first text string to be defined by the demarcations;
receiving a preferred type or types for the demarcations;
receiving, based on the preferred type or types for the demarcations, the plurality of demarcations;
rendering the plurality of first substrings, the plurality of second substrings, and the plurality of demarcations includes steps of:
adjusting one or more properties of at least one of the plurality of demarcations, the first substrings, and the second substrings such that the plurality of demarcations define each of the substructures and/or superstructures in the set of the substructures and/or superstructures.

26. The rendering engine of claim 1, wherein rendering the plurality of first substrings, the plurality of second substrings, and the plurality of demarcations includes steps of:
appending the first substrings to a container;
appending the second substrings to the container, wherein
each of the second substrings is positioned next to its corresponding first substring;
appending the plurality of demarcations to the container;
adjusting one or more properties of at least one of the plurality of demarcations, the first substrings, and the second substrings such that the plurality of demarcations define each of the substructures and/or superstructures;
wherein
a determination for a row placement for each of the plurality of substring pairs is based on an order of the plurality of substring pairs, widths of the plurality of substring pairs, and a width of the container.

27. The rendering engine of claim 1, wherein rendering the plurality of first substrings, the plurality of second substrings, and the plurality of demarcations includes steps of:
appending the first substrings to the container;
appending the second substrings to the container, wherein
each of the second substrings is positioned next to its corresponding first substring;
appending the plurality of demarcations to the container;
adjusting one or more properties of at least one of the first substrings and/or at least one of the second substrings such that the substructures or superstructures of the first text string are defined by at least one of a spacing in between adjacent first substrings, a spacing in between adjacent second substrings, a difference in a vertical placement of adjacent first substrings, and a difference in a vertical placement of adjacent second substrings;
wherein
a determination for a row placement for each of the plurality of substring pairs is based on an order of the plurality of substring pairs, widths of the plurality of substring pairs, and a width of the container.

28. The rendering engine of claim 1, wherein at least one of demarcations has an appearance of a modified punctuation mark.

29. A method of rendering substring pairs having defined substructures and superstructures, the method comprising:
receiving a first text string comprised of a plurality of first substrings, wherein a structure of the first text string includes a plurality of superstructures;
each of the plurality of superstructures is a sentence of the first text string;
at least one of the plurality of superstructures comprises a plurality of substructures;
each of the plurality of substructures is a word or phrase of the first text string;
receiving a second text string comprised of a plurality of second substrings, wherein each of the plurality of second substrings is a translation of one of the plurality of first substrings;
receiving a plurality of demarcations;
rendering the plurality of first substrings, the plurality of second substrings, and the plurality of demarcations;
wherein
the plurality of first substrings, the plurality of second substrings, and the plurality of demarcations are rendered such that the plurality of first substrings and the plurality of second substrings are arranged into a plurality of substring pairs, wherein each of the substring pairs in the plurality of substring pairs comprises one of the plurality of second substrings placed next to its corresponding first substring;
the plurality of first substrings, the plurality of second substrings, and the plurality of demarcations are rendered such that each of the plurality of demarcations is placed proximate to one or more substring pairs in the plurality of substring pairs;
the plurality of first substrings, the plurality of second substrings, and the plurality of demarcations are rendered such that the plurality of substructures and/or the plurality of superstructures of the first text string are defined by the plurality of demarcations;
the plurality of first substrings, the plurality of second substrings, and the plurality of demarcations are rendered such that the plurality of substructures and the plurality of superstructures of the first text string are defined;
the plurality of first substrings, the plurality of second substrings, and the plurality of demarcations are rendered such at least one of the plurality of demarcations is at least one of:
partially or entirely in between left and right edges of a nearest substring pair in the plurality of substring pairs;
entirely above a topmost point of a lower substring in the nearest substring pair in the plurality of substring pairs and horizontally overlapping at least two consecutive characters of the lower substring in the nearest substring pair in the plurality of substring pairs; and
entirely below a bottommost point of an upper substring in the nearest substring pair in the plurality of substring pairs and horizontally overlapping at least two consecutive characters of the upper substring in the nearest substring pair in the plurality of substring pairs.

30. Non-transitory computer readable media containing instructions, that, when executed by a processing device, configure a system to:
receive a first text string comprised of a plurality of first substrings, wherein
a structure of the first text string includes a plurality of superstructures;
each of the plurality of superstructures is a sentence of the first text string;
at least one of the plurality of superstructures comprises a plurality of substructures;
each of the plurality of substructures is a word or phrase of the first text string;
receive a second text string comprised of a plurality of second substrings, wherein
each of the plurality of second substrings is a translation of one of the plurality of first substrings;
receive a plurality of demarcations;
render the plurality of first substrings, the plurality of second substrings, and the plurality of demarcations;
wherein
the plurality of first substrings, the plurality of second substrings, and the plurality of demarcations are rendered such that the plurality of first substrings and the plurality of second substrings are arranged into a plurality of substring pairs, wherein each of the substring pairs in the plurality of substring pairs comprises one of the plurality of second substrings placed next to its corresponding first substring;
the plurality of first substrings, the plurality of second substrings, and the plurality of demarcations are rendered such that each of the plurality of demarcations is placed proximate to one or more substring pairs in the plurality of substring pairs;
the plurality of first substrings, the plurality of second substrings, and the plurality of demarcations are rendered such that the plurality of substructures and/or the plurality of superstructures of the first text string are defined by the plurality of demarcations;
the plurality of first substrings, the plurality of second substrings, and the plurality of demarcations are rendered such that the plurality of substructures and the plurality of superstructures of the first text string are defined;
the plurality of first substrings, the plurality of second substrings, and the plurality of demarcations are rendered such at least one of the plurality of demarcations is at least one of:
partially or entirely in between left and right edges of a nearest substring pair in the plurality of substring pairs;
entirely above a topmost point of a lower substring in the nearest substring pair in the plurality of substring pairs and horizontally overlapping at least two consecutive characters of the lower substring in the nearest substring pair in the plurality of substring pairs; and
entirely below a bottommost point of an upper substring in the nearest substring pair in the plurality of substring pairs and horizontally overlapping at least two consecutive characters of the upper substring in the nearest substring pair in the plurality of substring pairs.

* * * * *